(12) United States Patent
Le Gal

(10) Patent No.: US 7,578,898 B2
(45) Date of Patent: Aug. 25, 2009

(54) ARCHITECTURE OF A WINDING DEVICE FOR AN ELECTRIC ENERGY STORAGE UNIT

(75) Inventor: Guy Le Gal, Quimper (FR)

(73) Assignee: Batscap, Ergue Gaberic (FR)

( * ) Notice: Subject to any disclaimer, the term of this patent is extended or adjusted under 35 U.S.C. 154(b) by 537 days.

(21) Appl. No.: 10/541,046

(22) PCT Filed: Dec. 19, 2003

(86) PCT No.: PCT/FR03/03822

§ 371 (c)(1),
(2), (4) Date: Jan. 23, 2006

(87) PCT Pub. No.: WO2004/059773

PCT Pub. Date: Jul. 15, 2004

(65) Prior Publication Data

US 2006/0123622 A1   Jun. 15, 2006

(30) Foreign Application Priority Data

Dec. 23, 2002   (FR) .................................. 02 16507

(51) Int. Cl.
   *B32B 37/00*   (2006.01)
(52) U.S. Cl. .................... 156/192; 156/184; 156/189; 156/191; 156/194; 156/425; 156/429; 156/430; 29/623.1
(58) Field of Classification Search .................. 156/184, 156/189, 191, 192, 194, 425, 429, 430; 29/623.1
See application file for complete search history.

(56) References Cited

U.S. PATENT DOCUMENTS

| 1,789,451 | A |   | 1/1931 | Rosaire et al. |
| 3,395,044 | A | * | 7/1968 | Shoeld ........................ 429/94 |
| 3,432,901 | A |   | 3/1969 | Fanning |
| 4,099,401 | A | * | 7/1978 | Hug et al. ..................... 72/147 |
| 4,975,095 | A | * | 12/1990 | Strickland et al. .......... 29/623.1 |
| 5,486,215 | A | * | 1/1996 | Kelm et al. ................ 29/623.1 |
| 5,700,299 | A | * | 12/1997 | Clark ........................ 29/623.1 |
| 6,051,038 | A | * | 4/2000 | Howard et al. ............. 29/623.1 |
| 6,444,351 | B1 | * | 9/2002 | Goto ............................ 429/94 |

FOREIGN PATENT DOCUMENTS

| EP | 0746048 | 12/1996 |
| JP | 2002 128336 | 9/2002 |
| WO | WO-01/84659 A1 * | 11/2001 |

* cited by examiner

*Primary Examiner*—Jeff H Aftergut
(74) *Attorney, Agent, or Firm*—Blakely, Sokoloff, Taylor & Zafman LLP

(57) ABSTRACT

The present invention relates to a device for making electric energy storage assemblies the device including multiple feed means for feeding sheet structures, means for laminating sheet structures received from the various feed means, winder means for winding the resulting laminate, and control means for controlling continuously and in controlled synchronous the feed means, the laminator means, and the winder means.

75 Claims, 43 Drawing Sheets

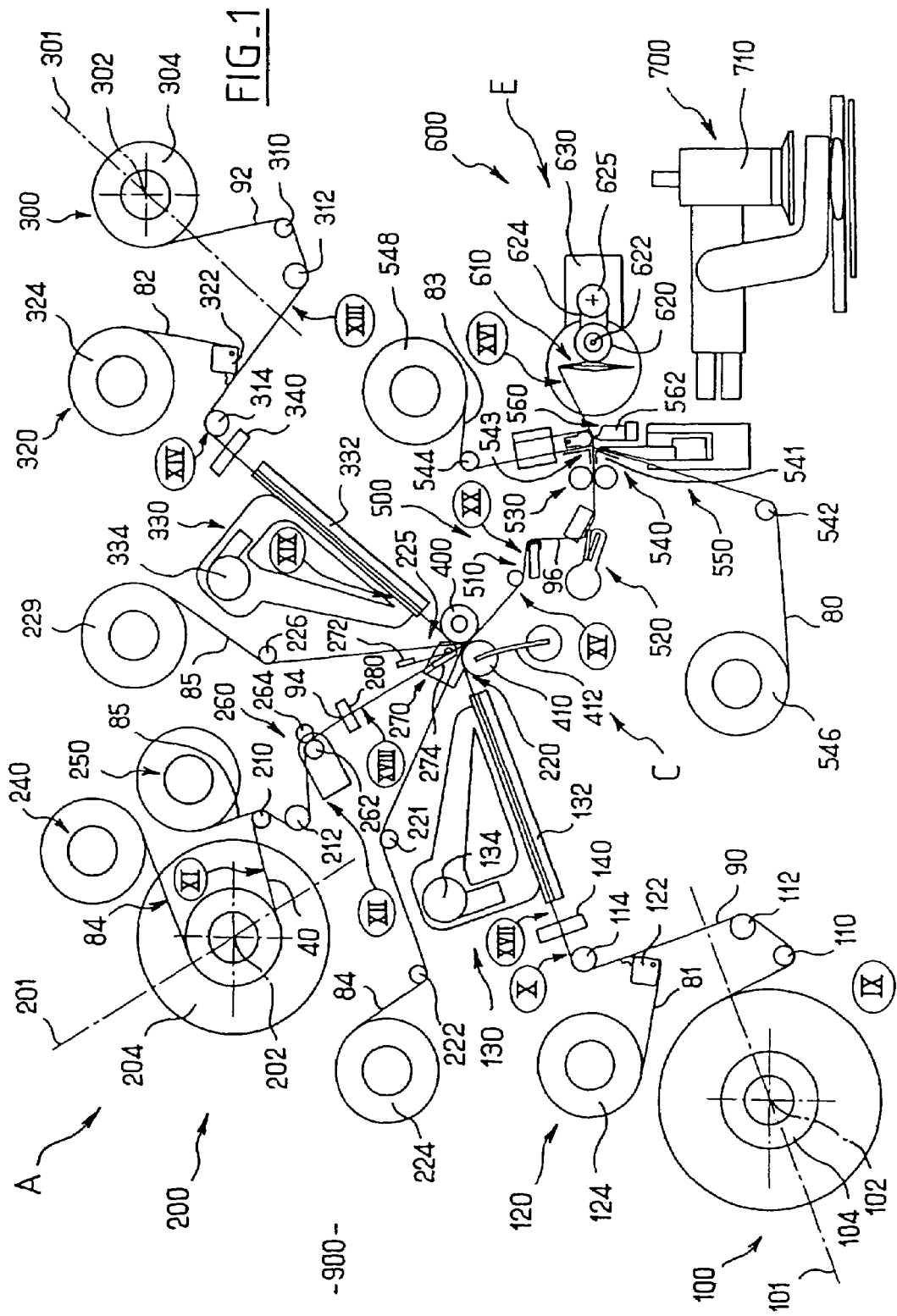
FIG_1

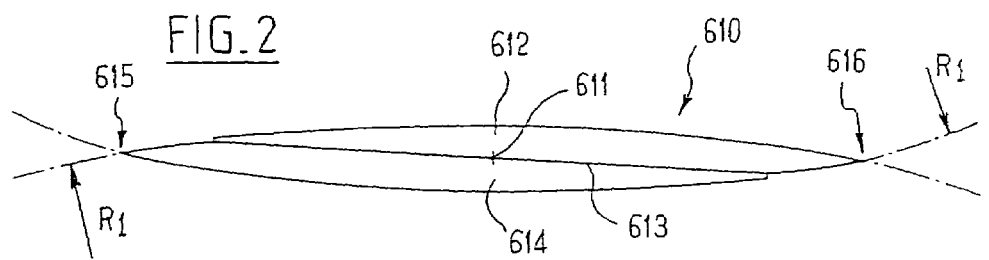
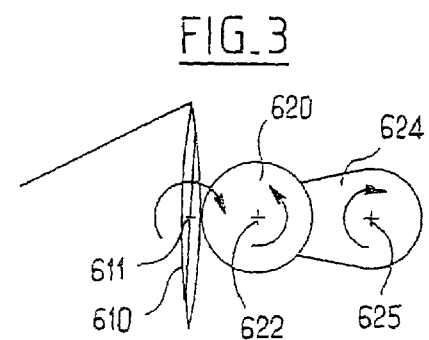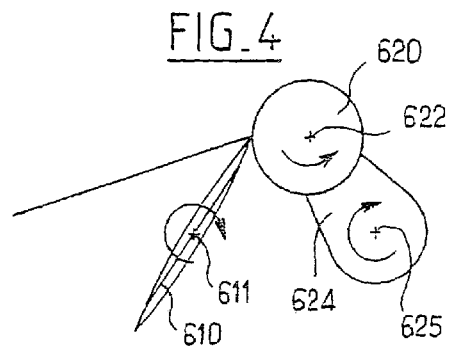
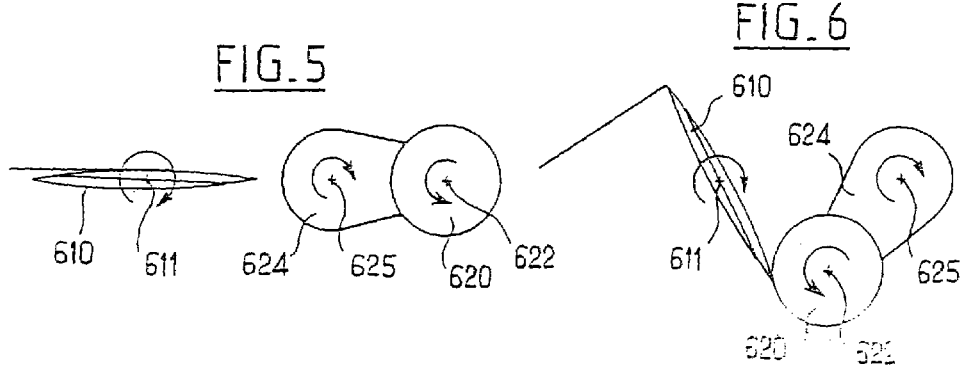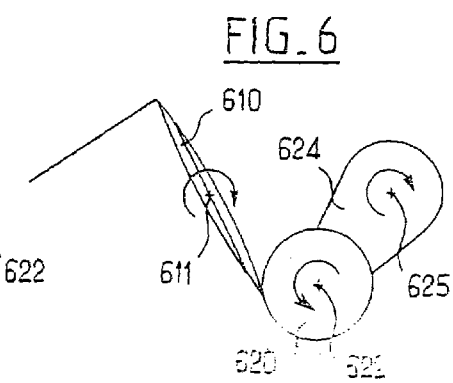
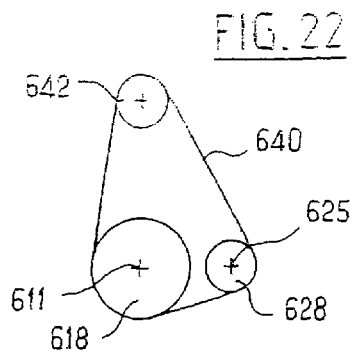

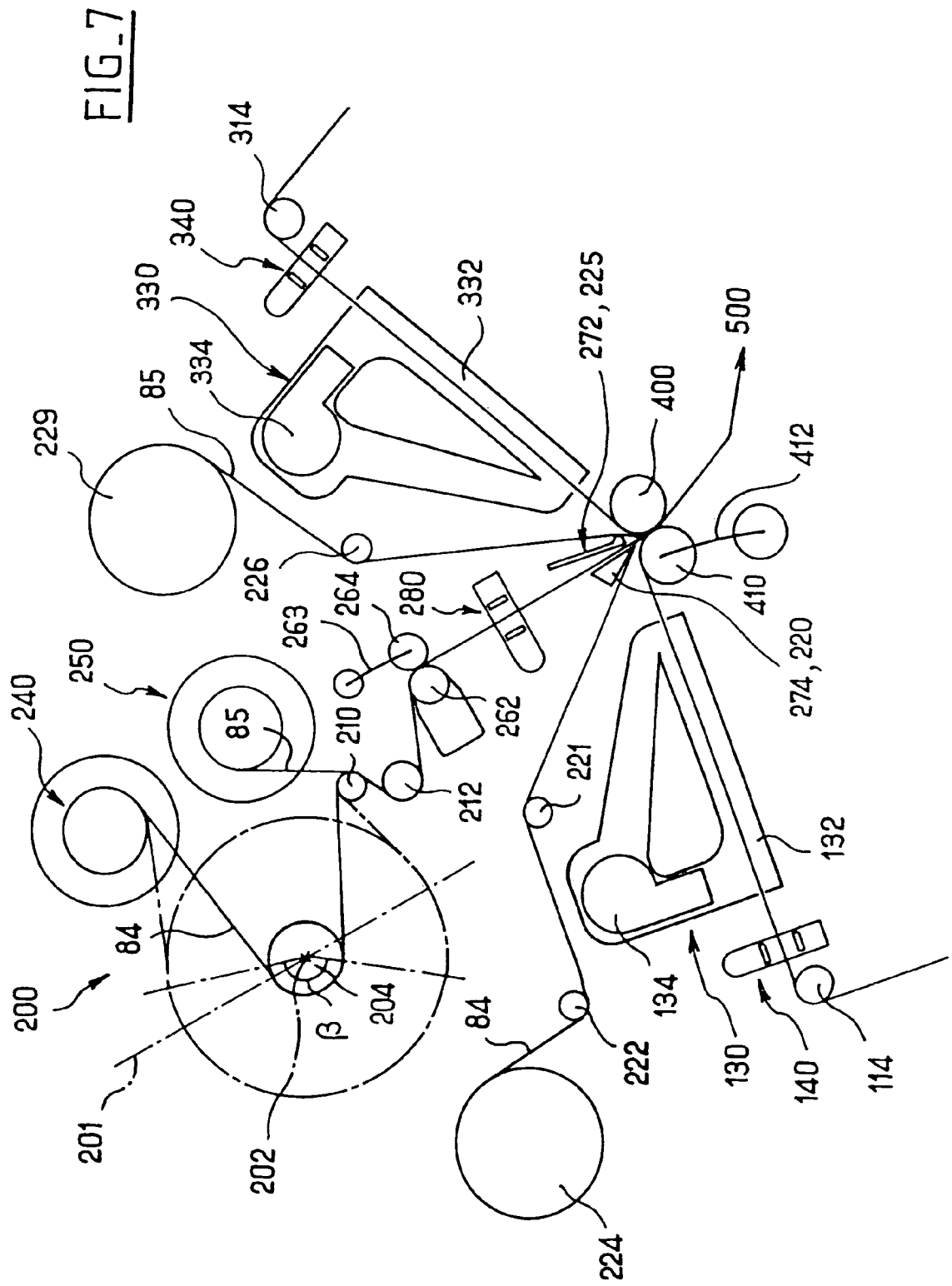

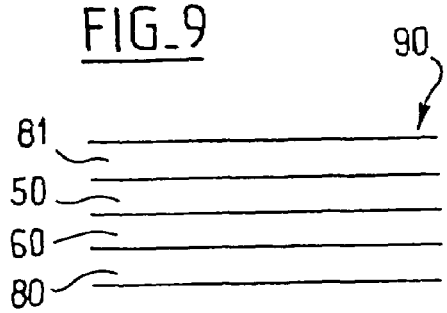
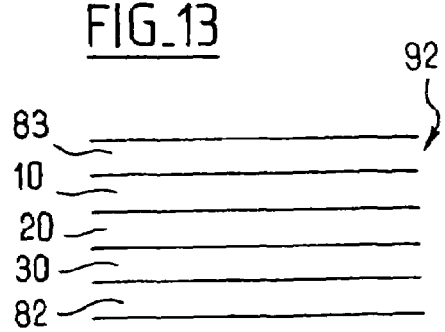
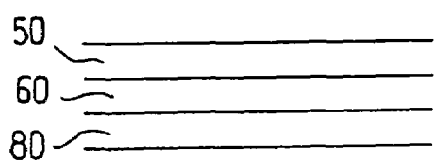
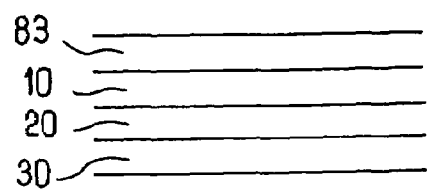
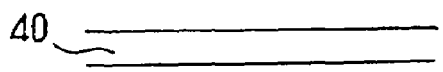
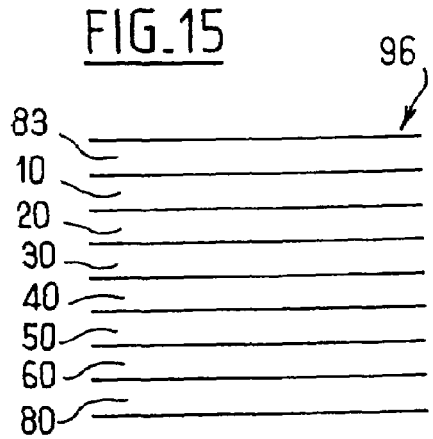
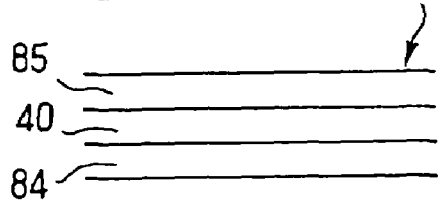
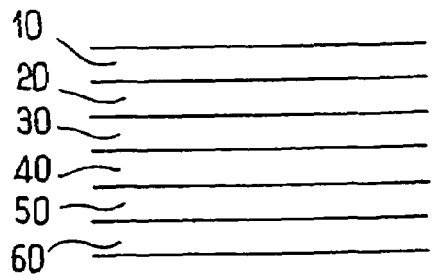

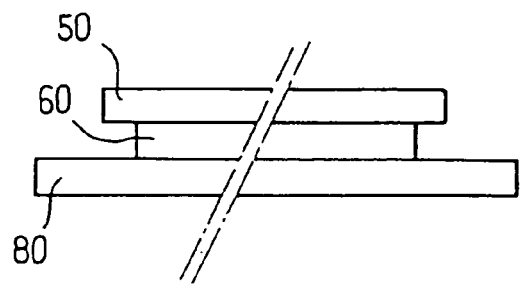
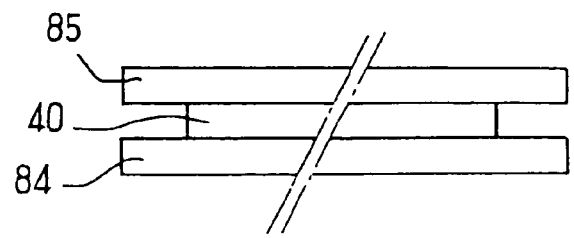
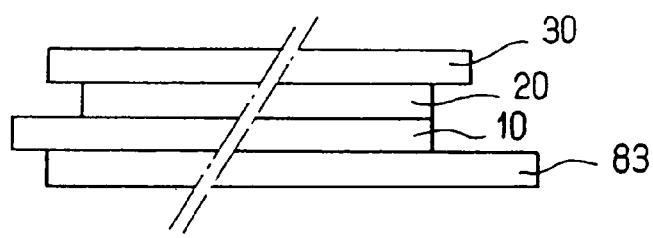
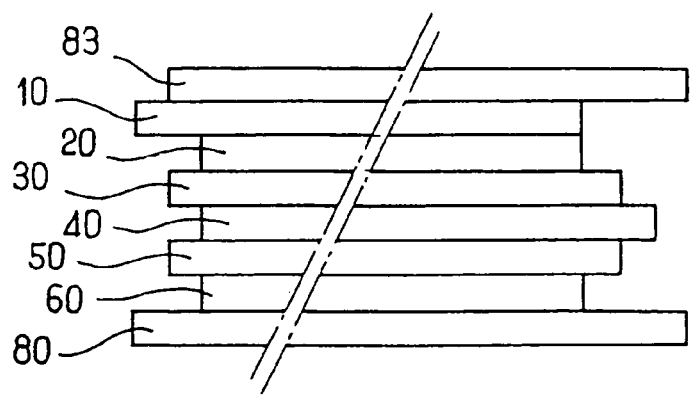

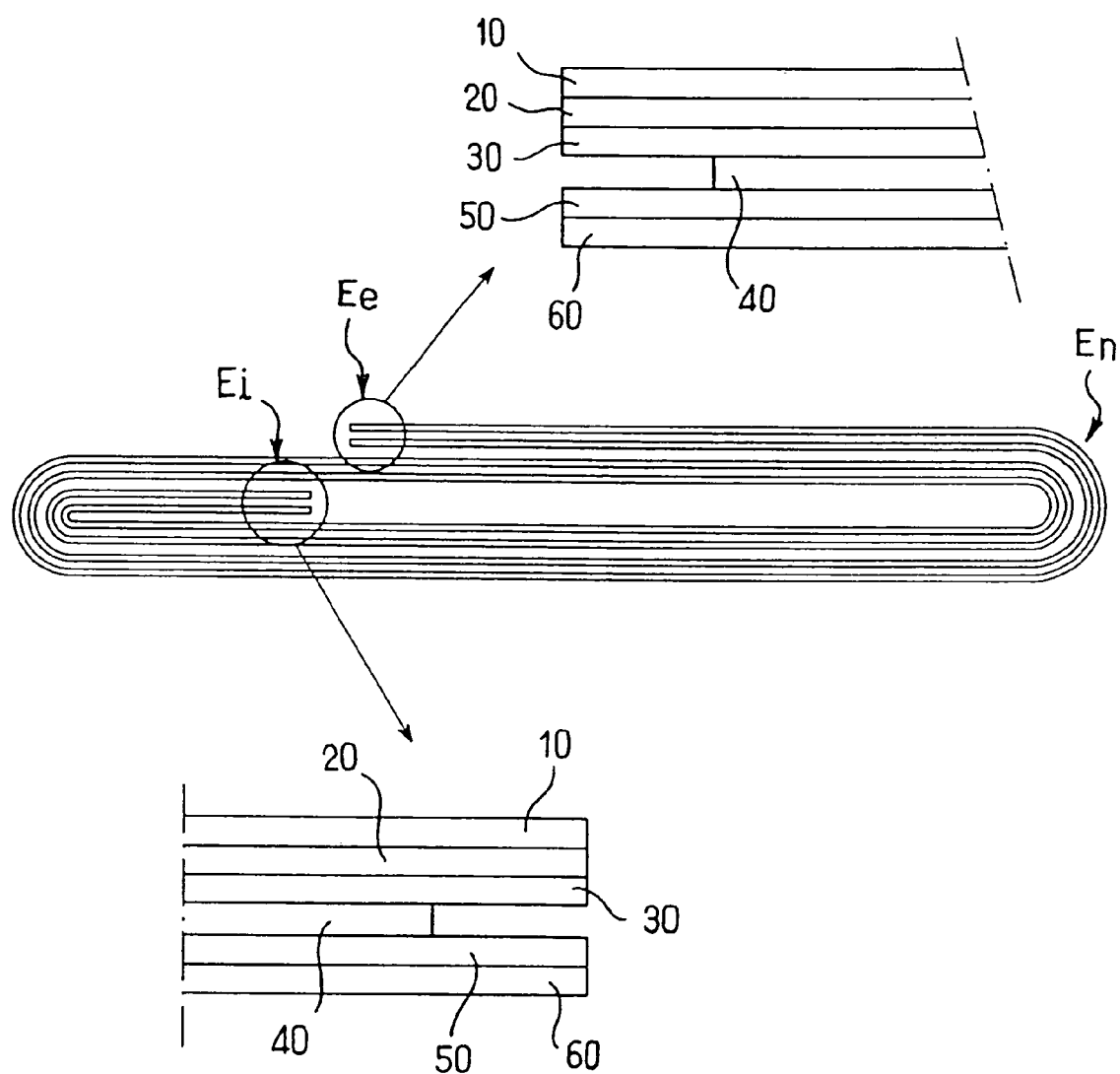

FIG. 30

| Angle in ° | Winding radius | Correction factor | 1st turn | | 2nd turn | | ... | 10th turn | | ... | 23rd turn | |
|---|---|---|---|---|---|---|---|---|---|---|---|---|
| | | | r | N | r | N | | r | N | | r | N |
| 0 | 180 | 5.00 | 5.22 | 182.87 | 5.44 | 175.41 | | 7.22 | 132.26 | | 10.11 | 94.49 |
| 1 | 181 | 1.109980 | 5.30 | 180.17 | 5.54 | 172.36 | | 7.46 | 127.98 | | 10.58 | 90.23 |
| 2 | 182 | 1.200700 | 5.50 | 173.50 | 5.77 | 165.57 | | 7.88 | 121.21 | | 11.31 | 84.45 |
| 3 | 183 | 1.319033 | 5.87 | 162.77 | 6.16 | 154.93 | | 8.54 | 111.85 | | 12.39 | 77.04 |
| ... | ... | 1.483629 | | | | ... | | | | | | |
| 80 | 260 | | 54.46 | 17.53 | 54.62 | 17.48 | | 55.89 | 17.09 | | 57.96 | 16.47 |
| 85 | 265 | 0.796343 | 52.97 | 18.03 | 53.13 | 17.97 | | 54.37 | 17.56 | | 56.38 | 16.94 |
| ... | ... | 0.774575 | | | | ... | | | | | | |
| 178 | 358 | | 5.39 | 177.31 | 5.58 | 171.10 | | 7.15 | 133.65 | | 9.69 | 98.58 |
| 179 | 359 | 0.977600 | 5.26 | 181.63 | 5.46 | 174.74 | | 7.12 | 134.03 | | 9.82 | 97.22 |
| 180 | 360 | 1.037420 | 5.22 | 182.87 | 5.44 | 175.41 | | 7.22 | 132.26 | | 10.11 | 94.49 |
| | | 1.109980 | | | | | | | | | | |

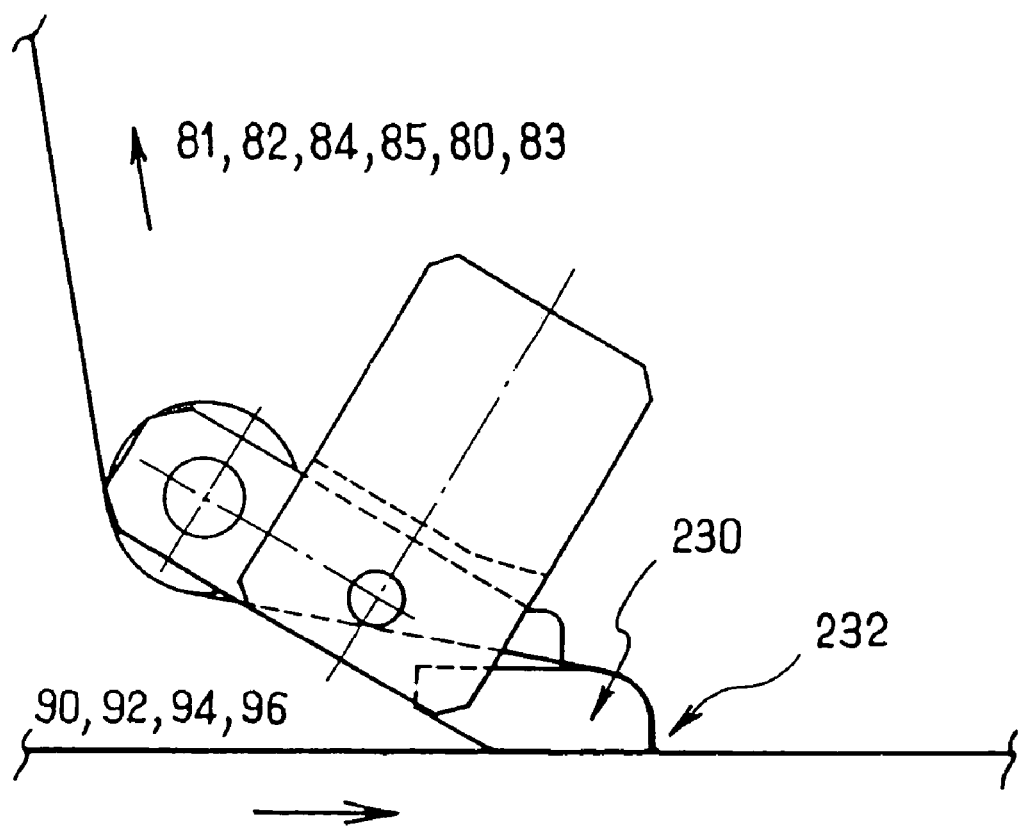
FIG_32

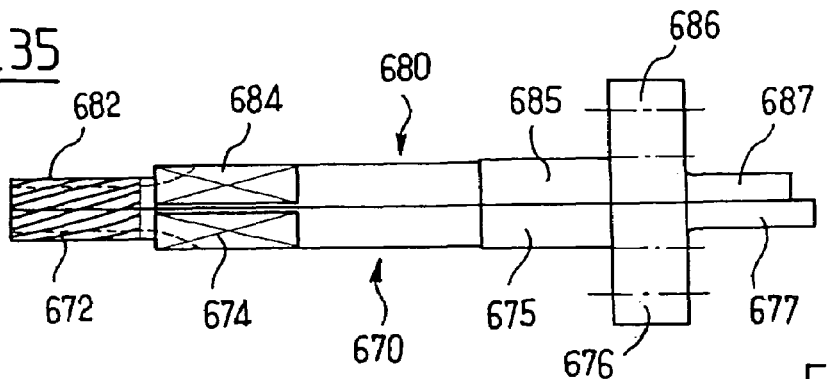
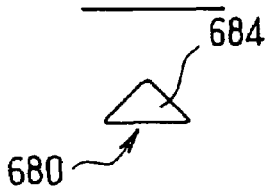
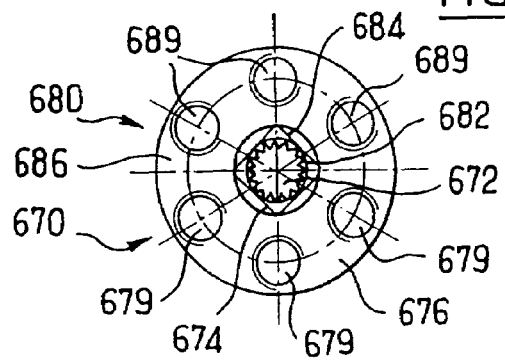
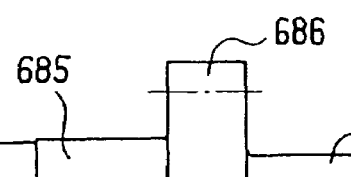
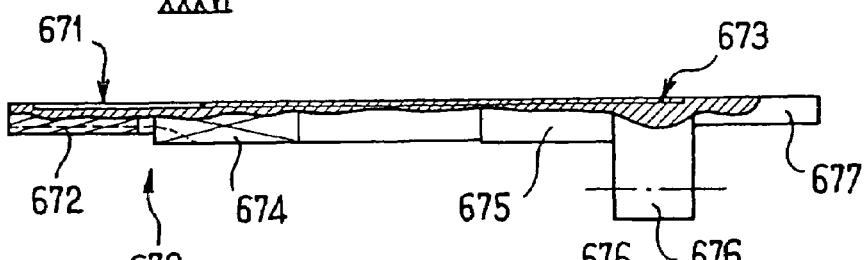
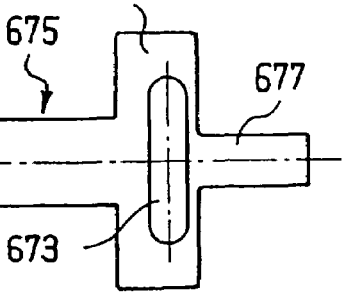

FIG_42

FIG_44A
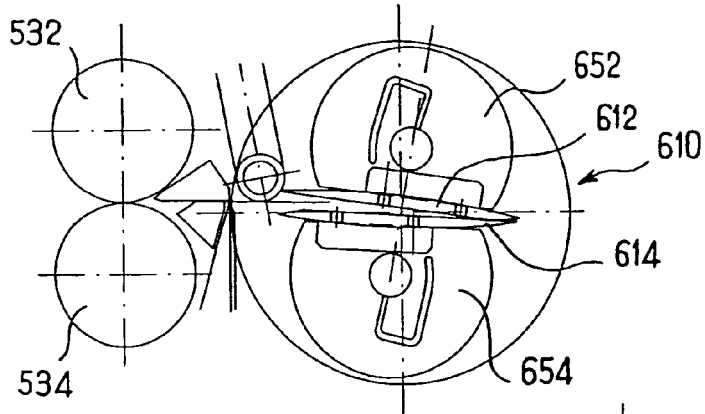
FIG_44B
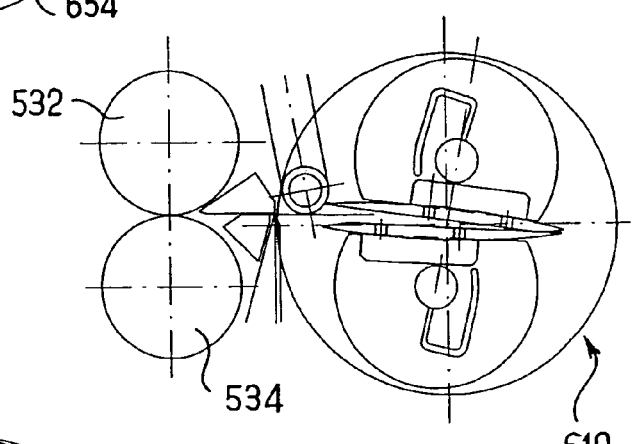
FIG_44C
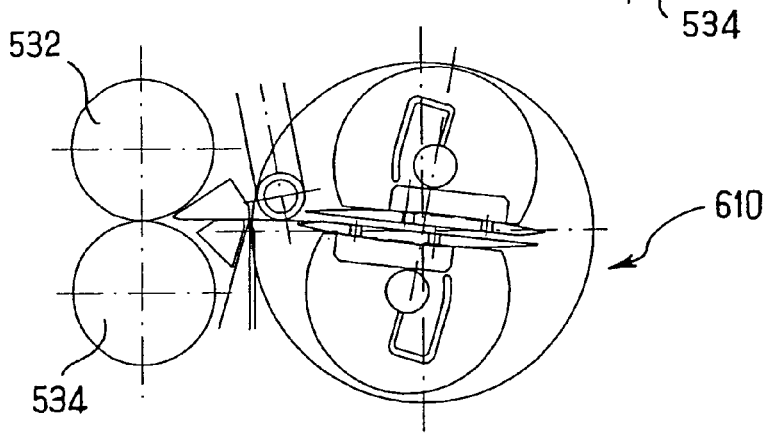
FIG_44D
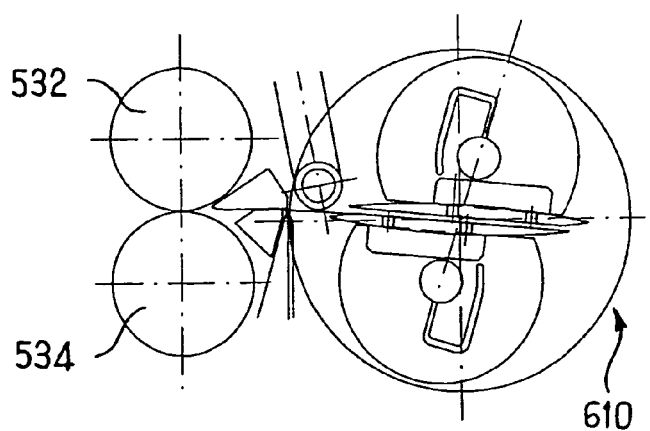

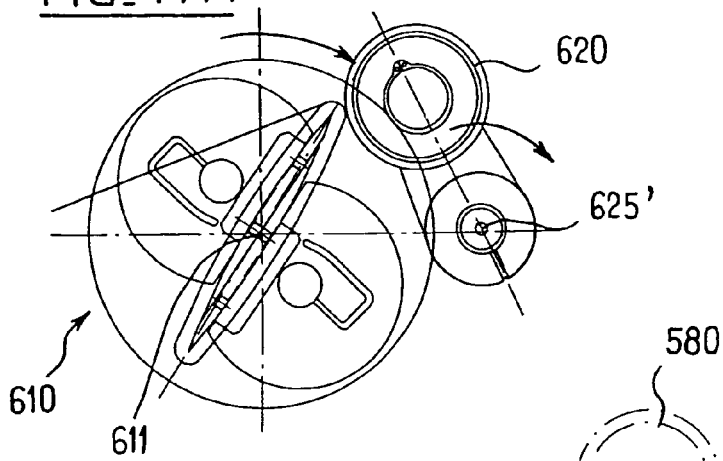
FIG_47A
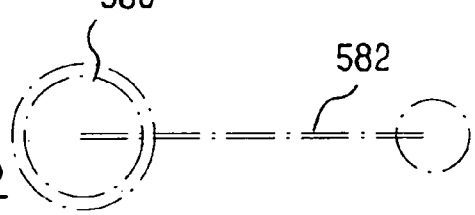
FIG_47B
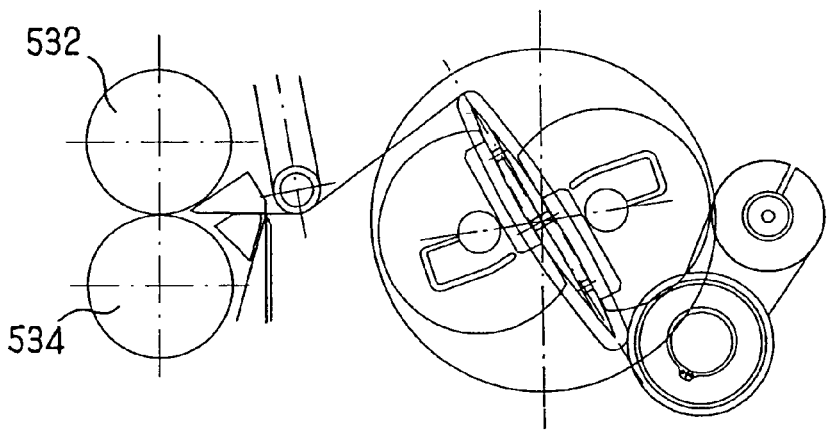
FIG_47C
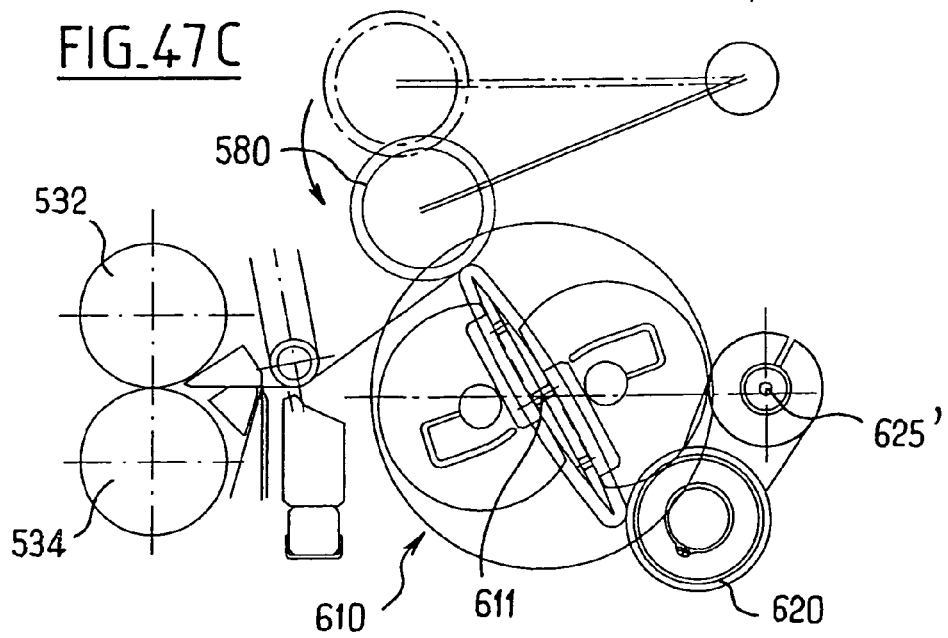

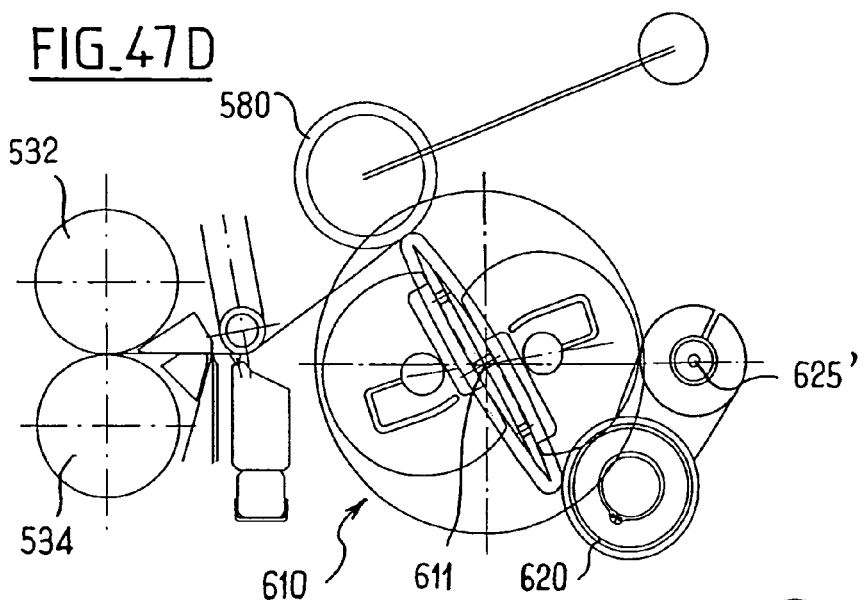
FIG_47D
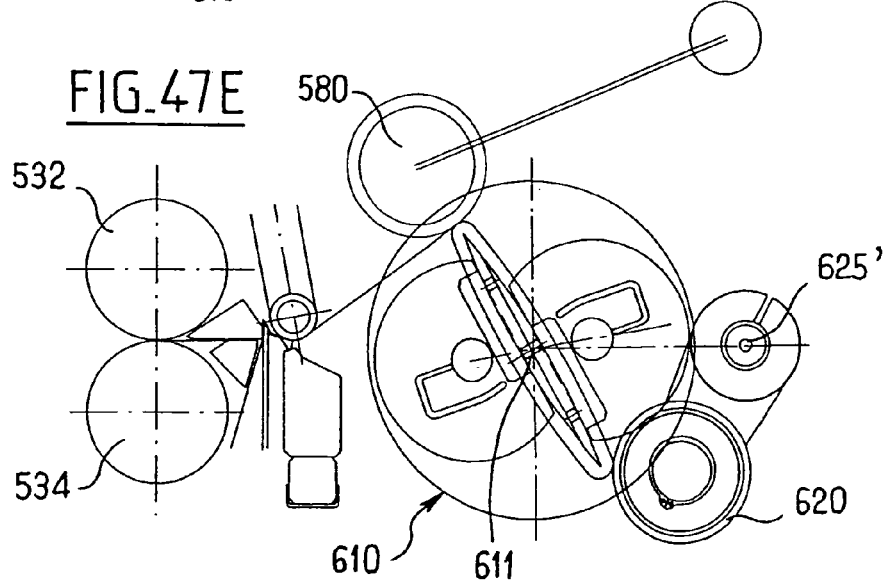
FIG_47E
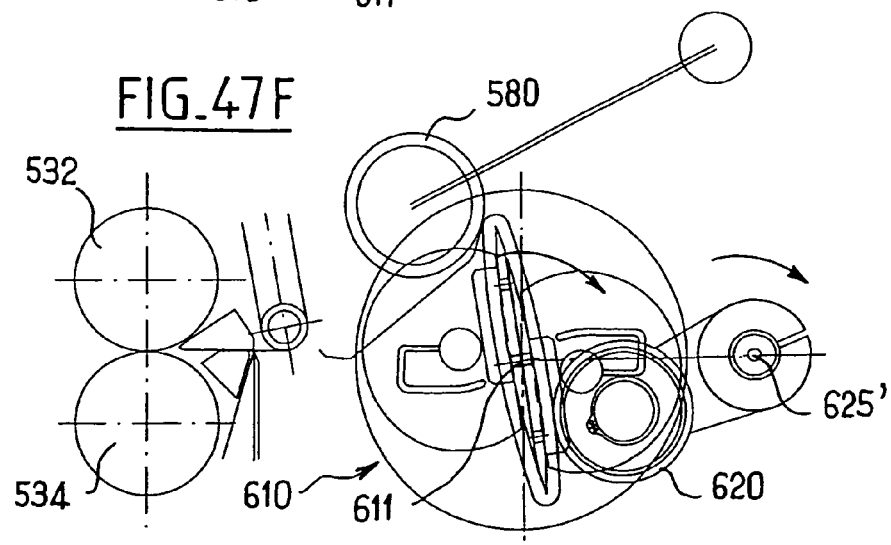
FIG_47F

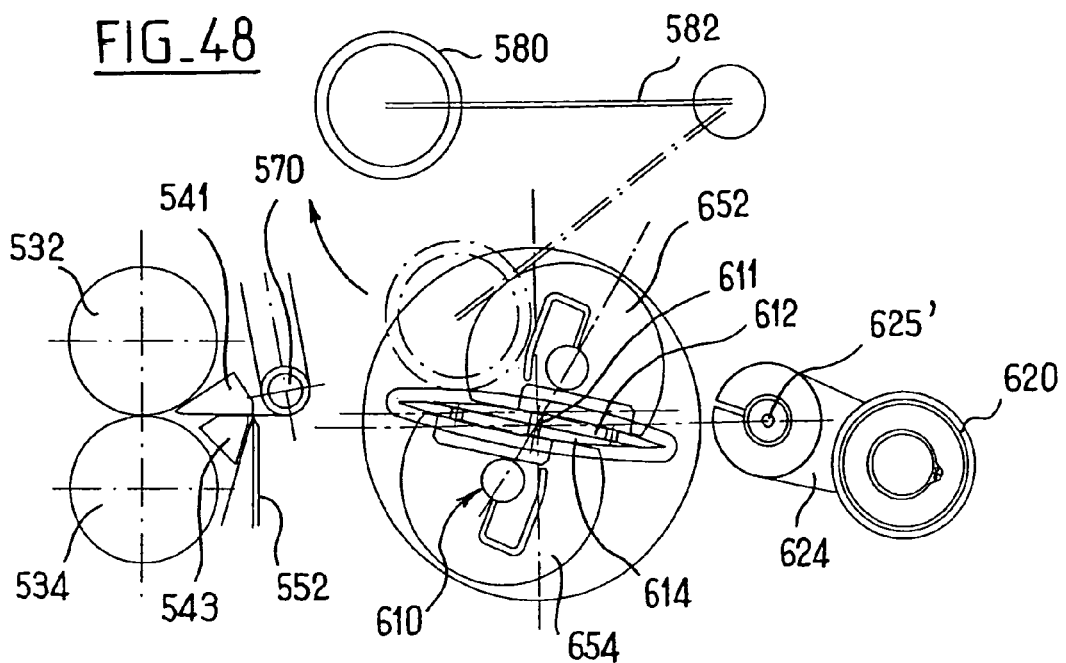
FIG_48
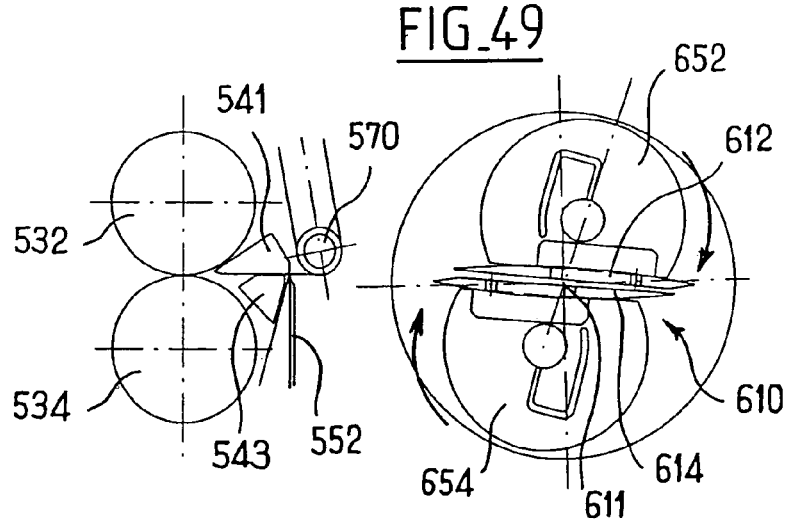
FIG_49
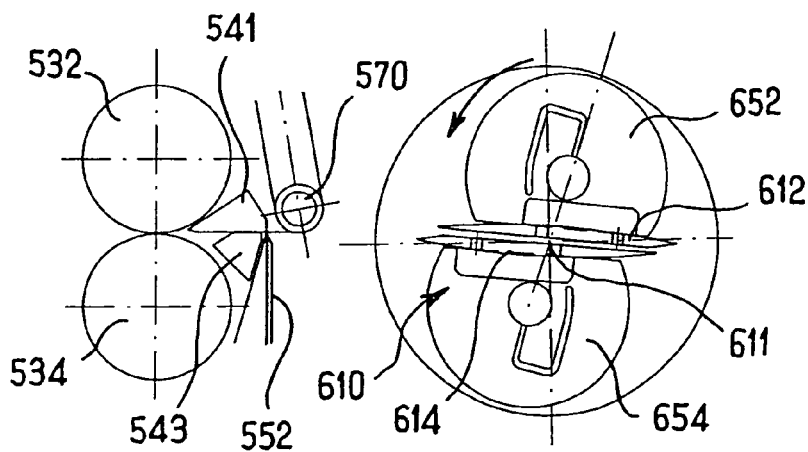
FIG_50

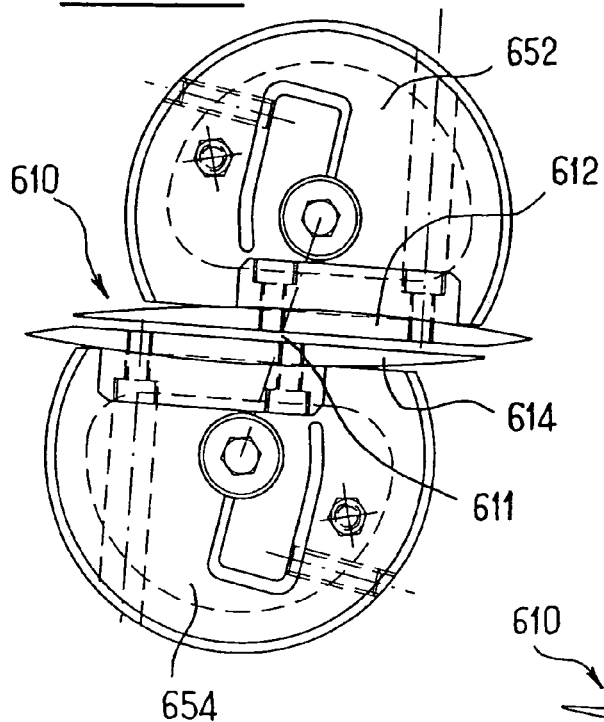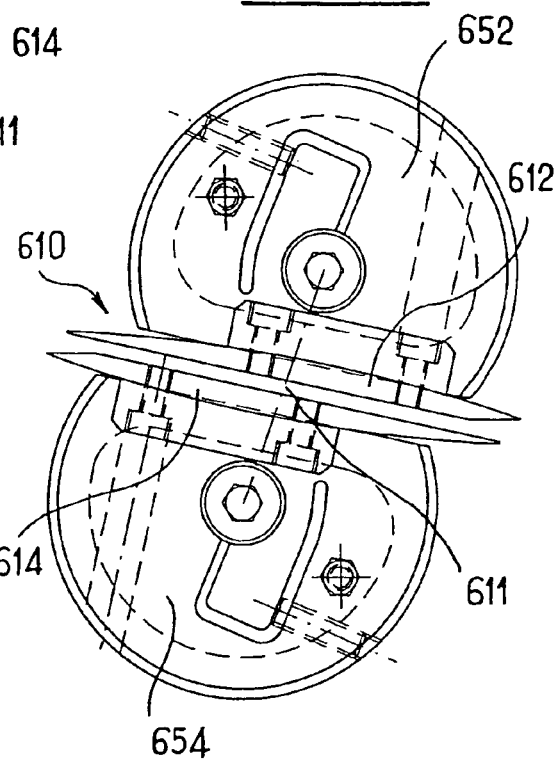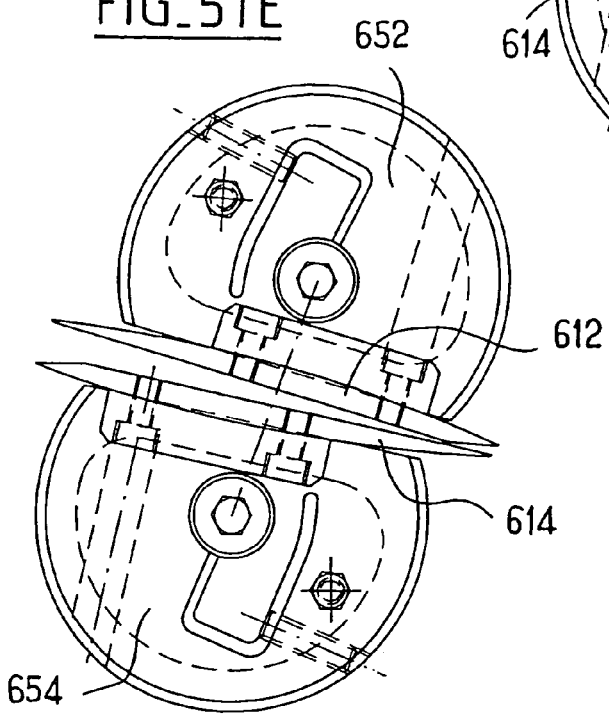

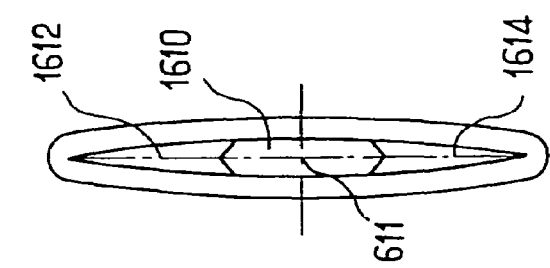
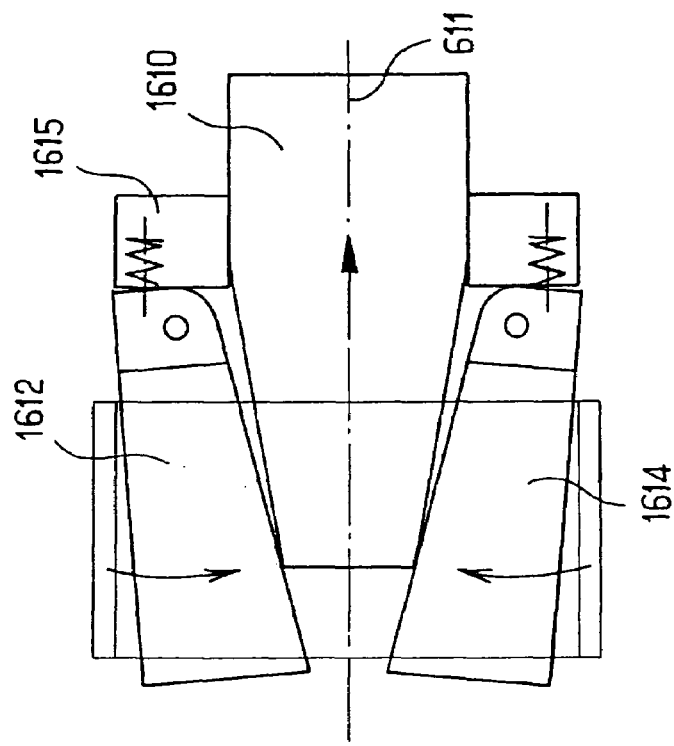
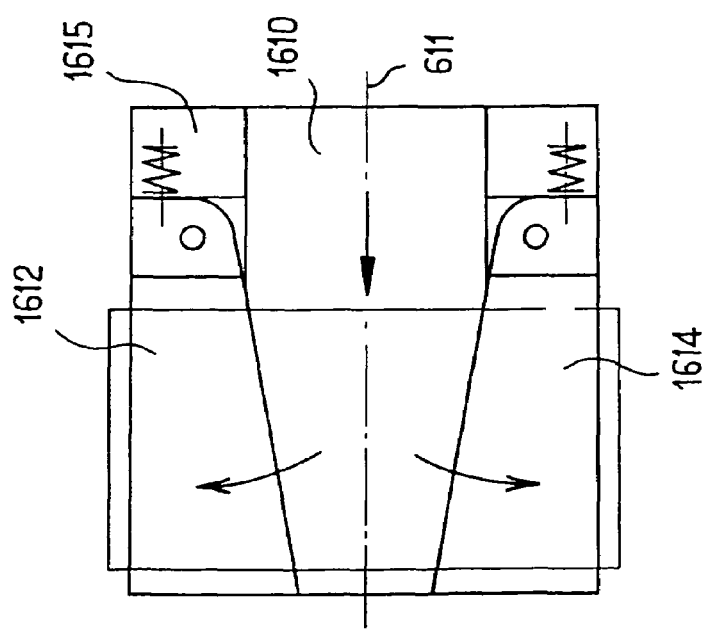

FIG_67

ARCHITECTURE OF A WINDING DEVICE FOR AN ELECTRIC ENERGY STORAGE UNIT

The present invention relates to the field of electric energy storage assemblies.

More precisely, the present invention relates in particular to multilayer electrochemical assemblies based on polymer materials comprising an electrolyte disposed between two electrodes respectively forming a cathode and an anode.

The invention applies particularly, but not exclusively, to devices having an anode based on lithium.

The present invention applies to making capacitors, supercapacitors, and batteries.

Examples of such electrochemical assemblies can be found in the following documents: FR-A-2 737 339, FR-A-2 759 087, FR-A-2 759 211, FR-A-2 808 622.

An object of the present invention is to provide a device enabling such electric energy storage assemblies to be made automatically and continuously.

More precisely, in this context, the present invention seeks to propose a device for fabricating multilayer assemblies having the function of storing electric energy and presenting qualities that are superior to those of the prior art.

In the context of the present invention, this object is achieved by a device for making electric energy storage assemblies, the device comprising multiple feed means for feeding sheet structures, means for laminating the sheet structures received from the various feed means, winder means for winding the resulting laminate, and control means for controlling continuously and in controlled synchronism the feed means, the laminator means, and the winder means.

The present invention also provides a method of making electric energy storage assemblies, the method comprising the steps of feeding multiple sheet structures from distinct feed means, laminating the film structures received from the various feed means, winding the resulting laminate, and continuously and with controlled synchronism controlling the feed means, the laminator means, and the winder means.

According to an important characteristic of the present invention, the laminate is wound in the form of generally plane slabs in order to enable a plurality of such assemblies to be stacked easily and to be connected together in series and/or in parallel.

The inventors have found that it is particularly advantageous to make such electric energy storage assemblies in the form of a multilayer winding that is generally plane from the beginning, so as to avoid putting folds or equivalent defects into the structure of such assemblies.

The inventors have found that making such assemblies in the form of circularly symmetrical windings that are subsequently flattened out frequently leads to defects such as folds or bosses in the various layers, and to poor interfaces between them, possibly with local separation between the various layers, leading to a reduction in storage capacity, because of the stresses that are generated in the turns which present developments that differ from one turn to another.

The inventors have also found that those problems, associated with the prior art, can accelerate the aging of cells, by reducing the number of charge/discharge cycles that cells can tolerate, when the cells are used as storage batteries, and can even extend to the cells self-discharging.

The means thus proposed in the context of the invention enable a constant traction force to be obtained on the sheets feeding the mandrel, and thus enable winding to be performed in perfectly regularly manner.

The present invention also provides electric energy storage cells each constituted by a flat winding having minimized internal stresses, each cell being constituted by a superposed assembly of sheets comprising at least: a current collector, a cathode based on filled polymers, a solid electrolyte based on filled polymers, and a metal anode, e.g. based on lithium, these various elements being made in the form of thin sheets that are laminated together, wound, and preformed on a mandrel that is almost flat having a tapering timezone-shaped section, and the cell then being pressed and flattened on a low-thrust press.

Other characteristics, objects, and advantages of the present invention appear on reading the following detailed description made with reference to the accompanying drawings given as non-limiting examples, and in which:

FIG. 1 is a diagrammatic overall view of the main means constituting the device in accordance with the present invention;

FIG. 2 is a fragmentary end view on a large scale showing a winding mandrel in accordance with a preferred embodiment of the present invention;

FIG. 3 is a diagrammatic view of winding means in accordance with the present invention, made up of such a winding mandrel in combination with an associated presser roller;

Figure 8:
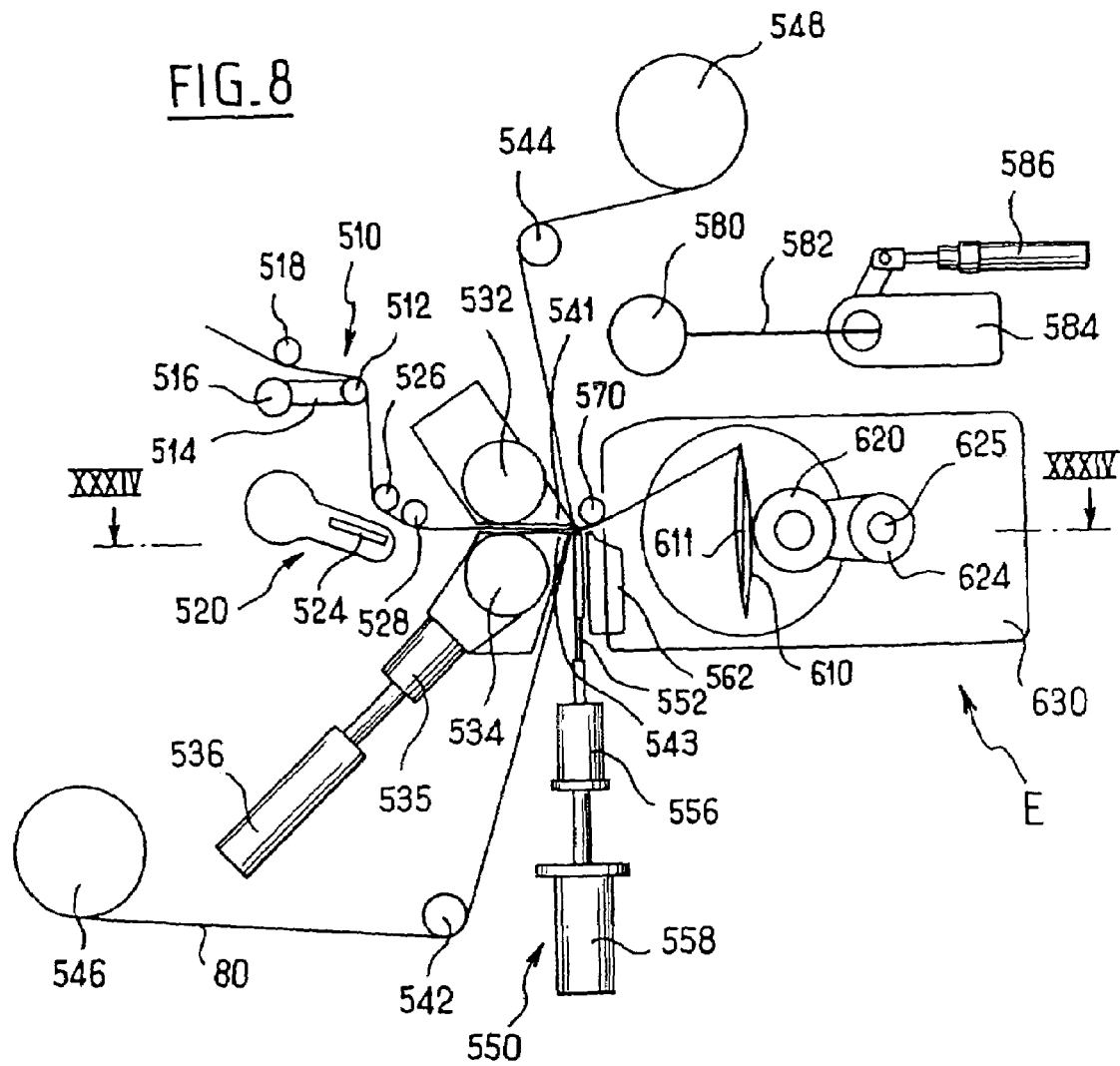
Figure 31:
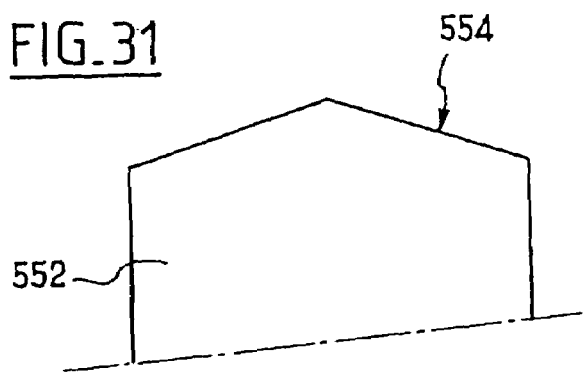
Figure 23:
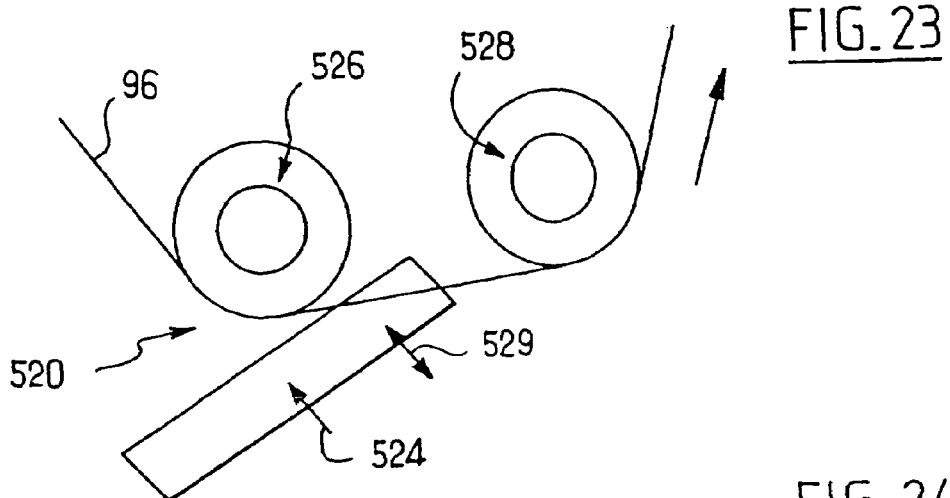
Figure 24:
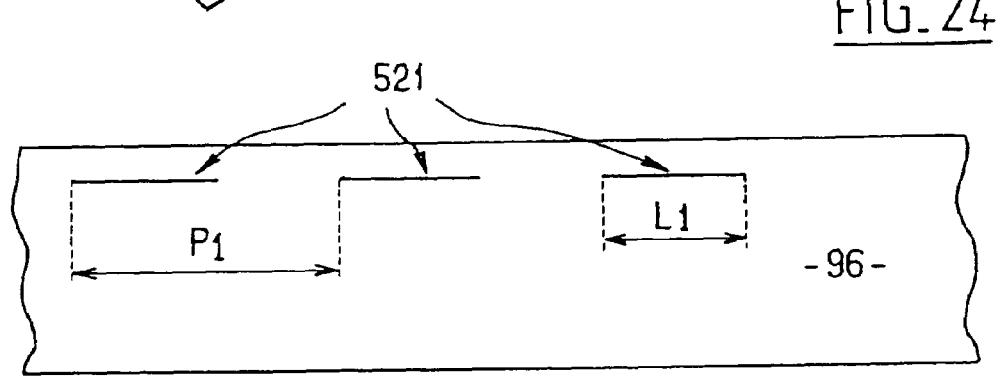
Figure 25:
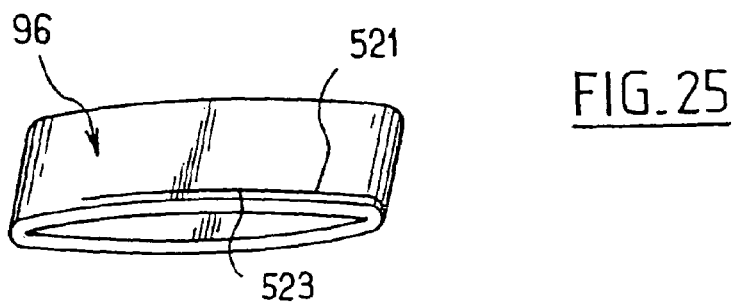
Figure 26:
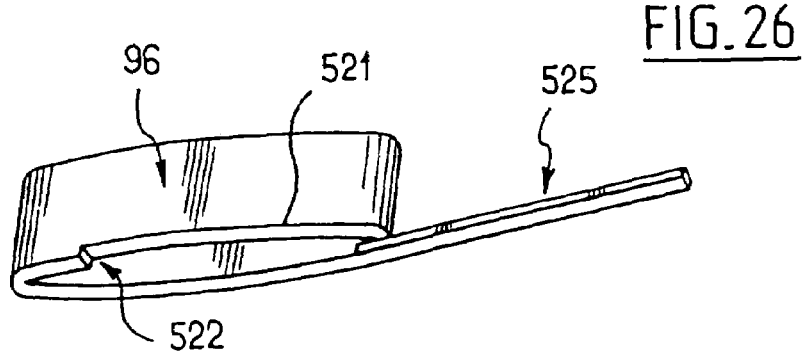
Figure 27:
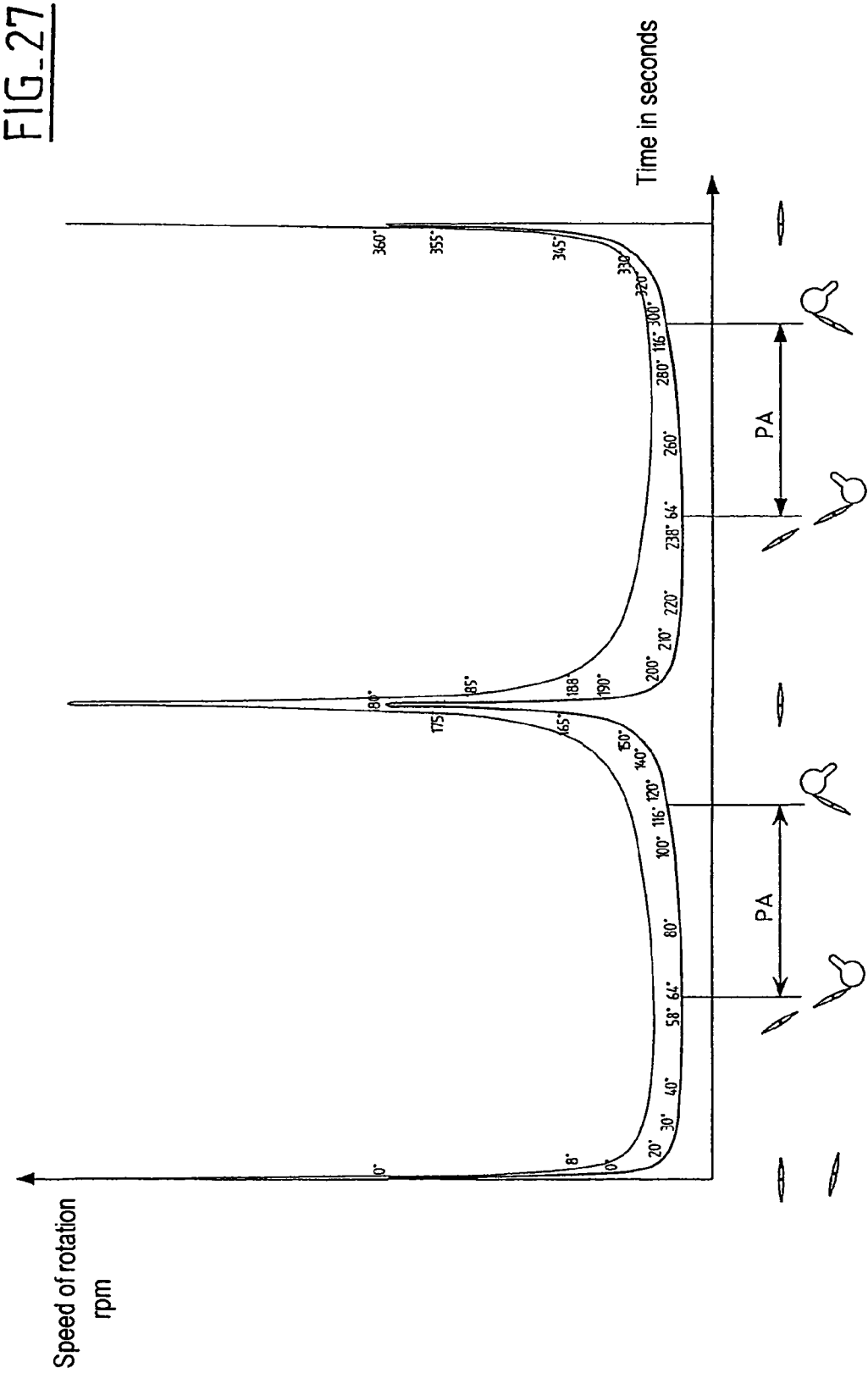
Figure 28:
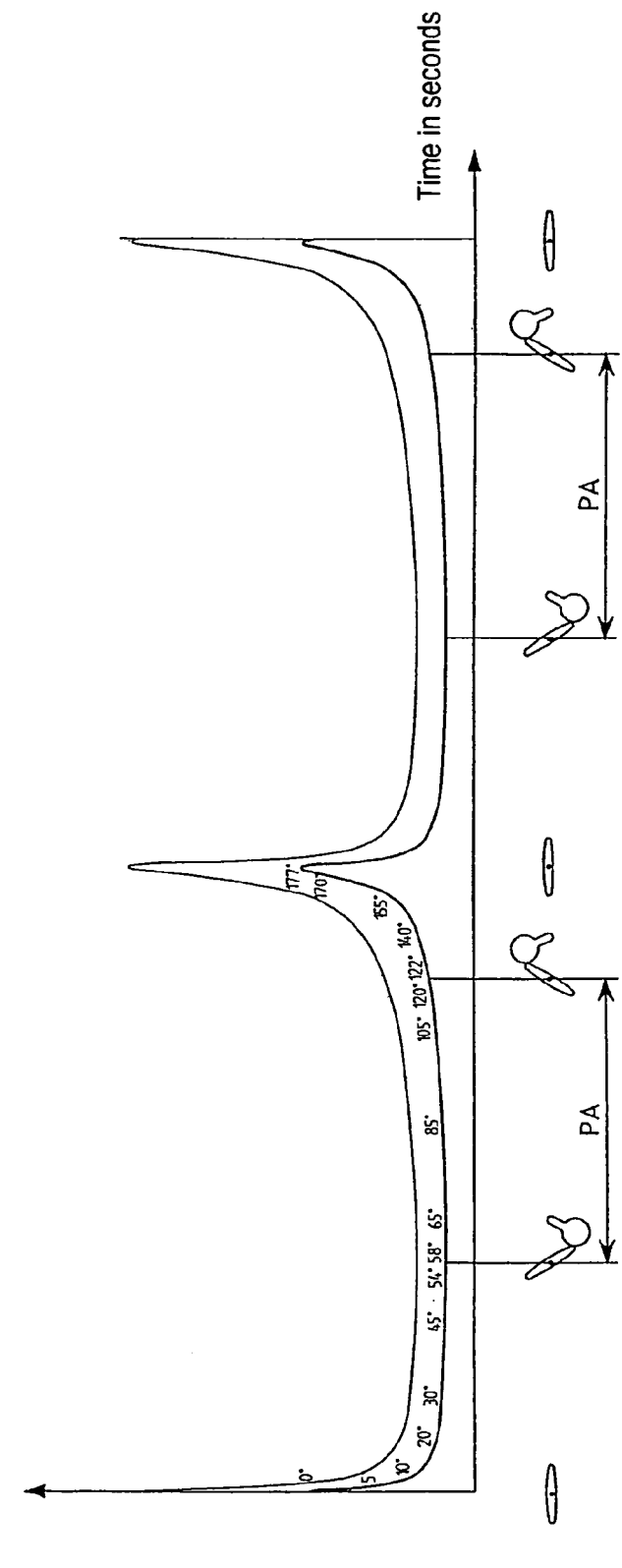
Figure 29:
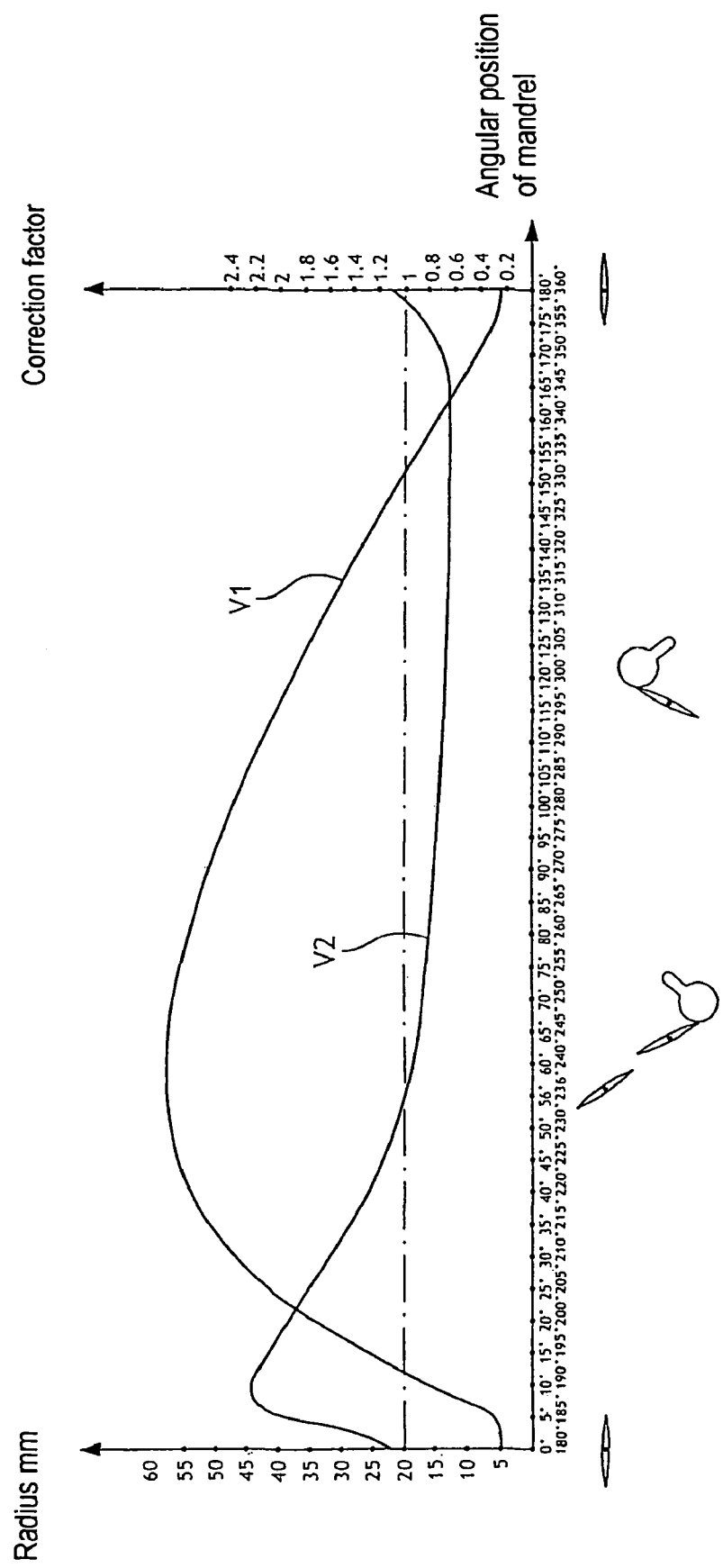
Figure 33:
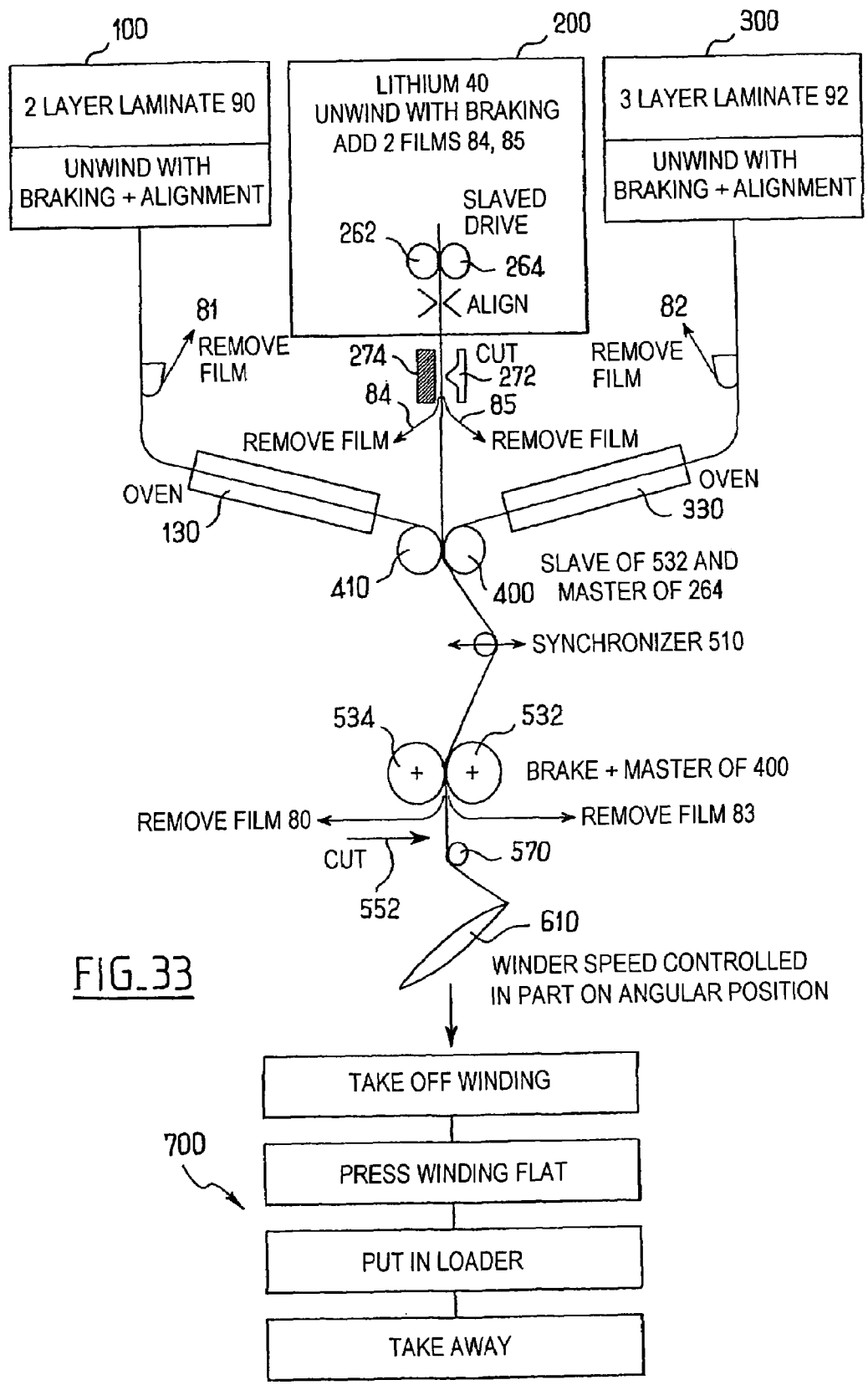
Figure 34:
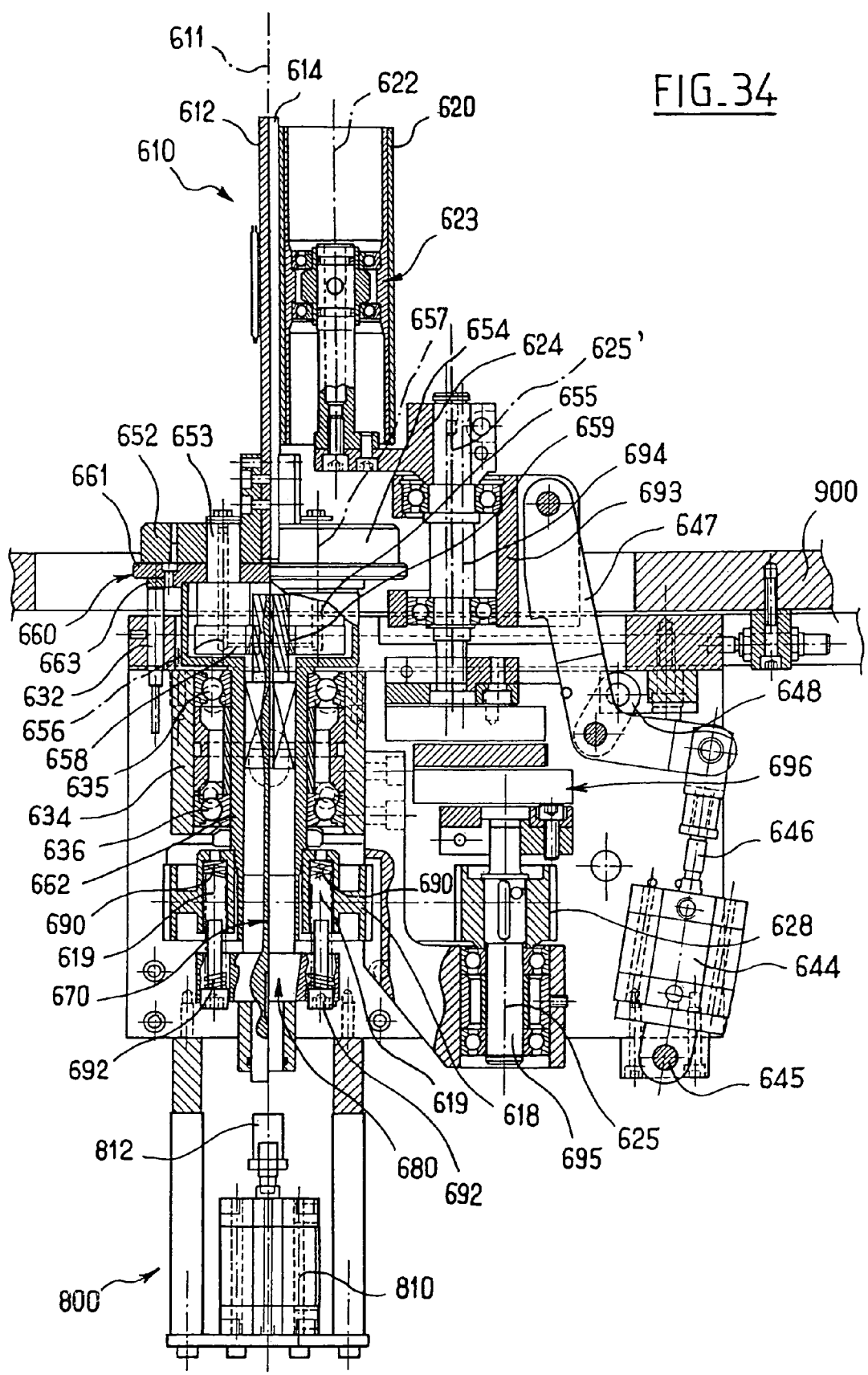
Figure 41:
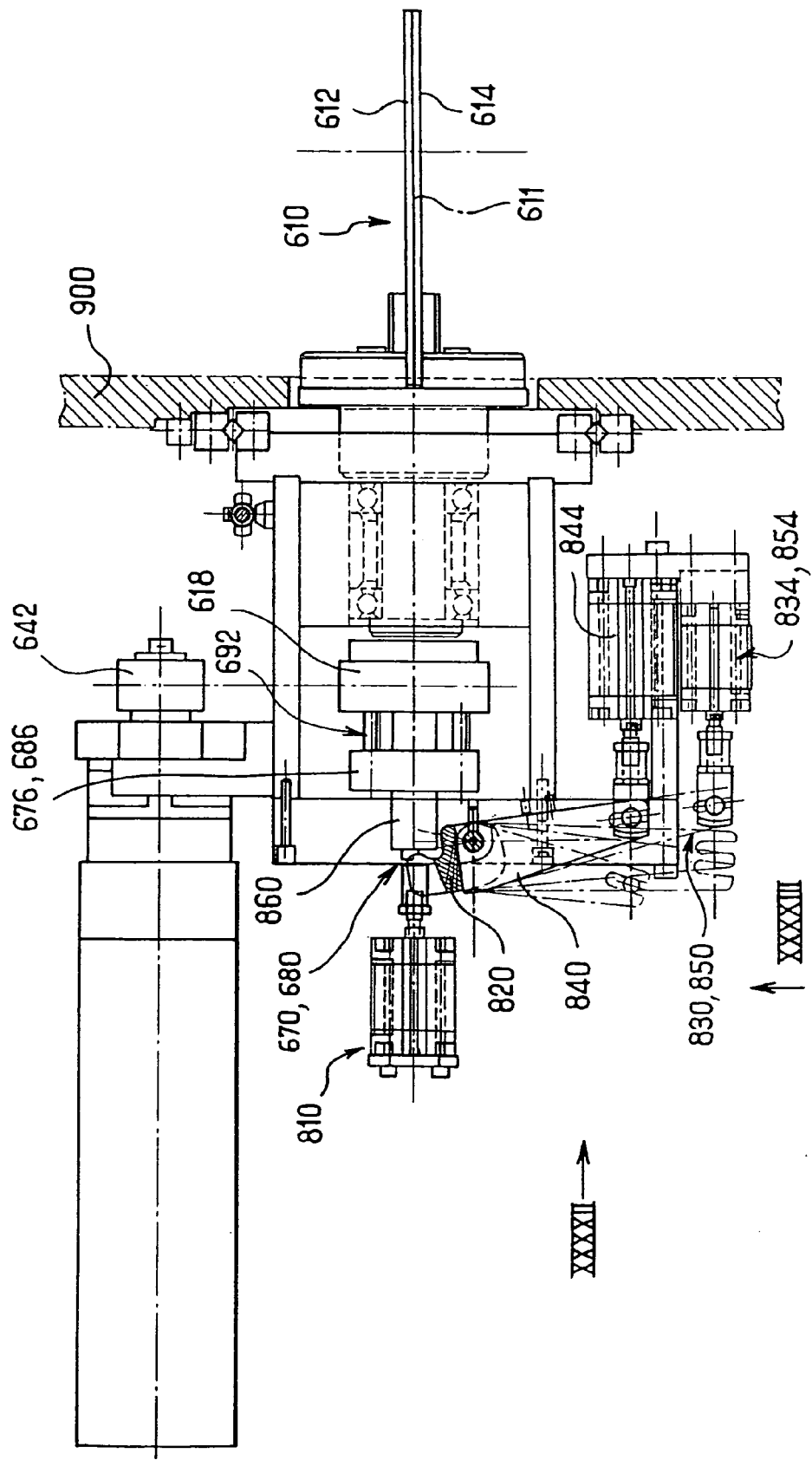
Figure 42:
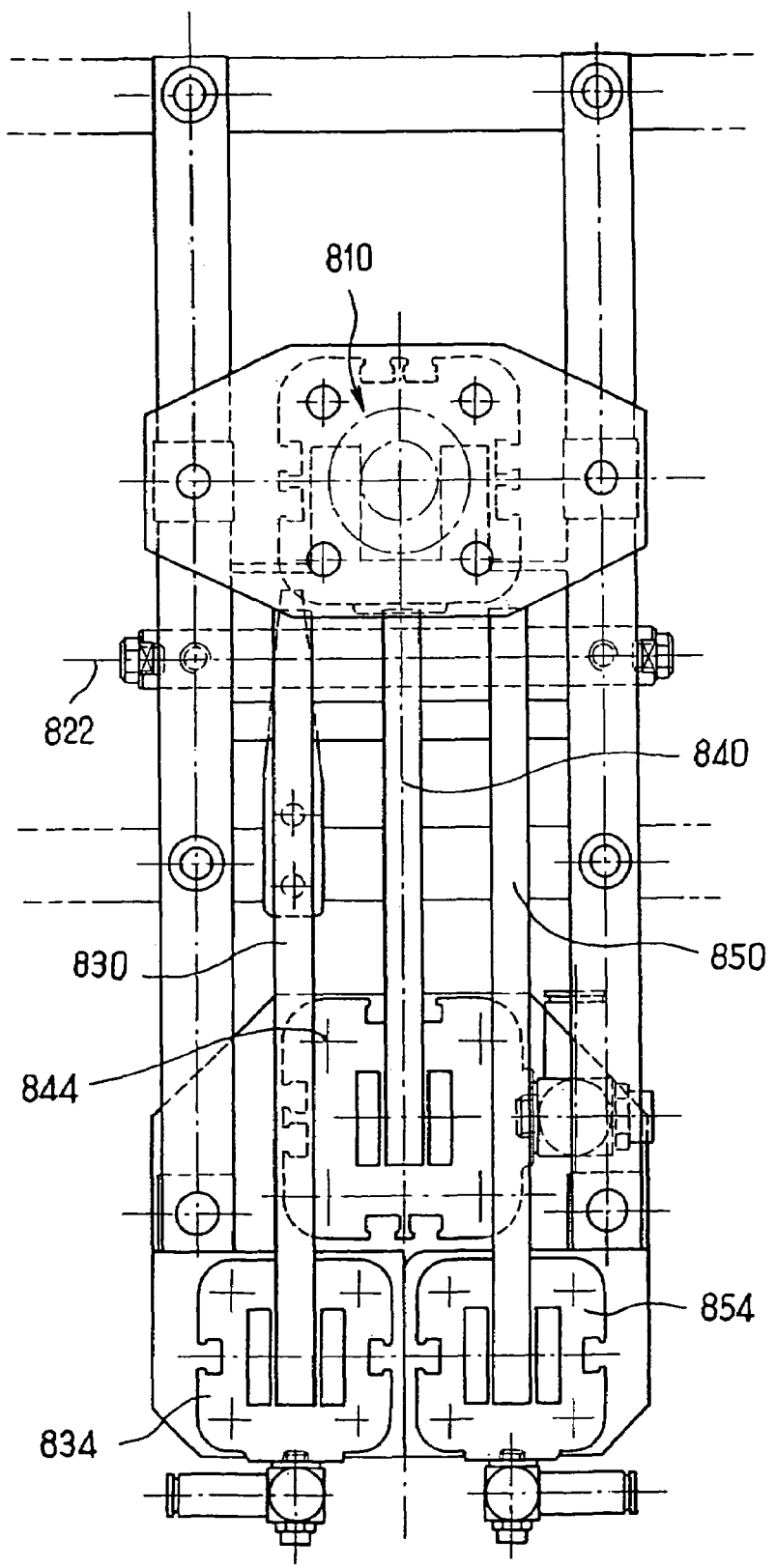
Figure 43:
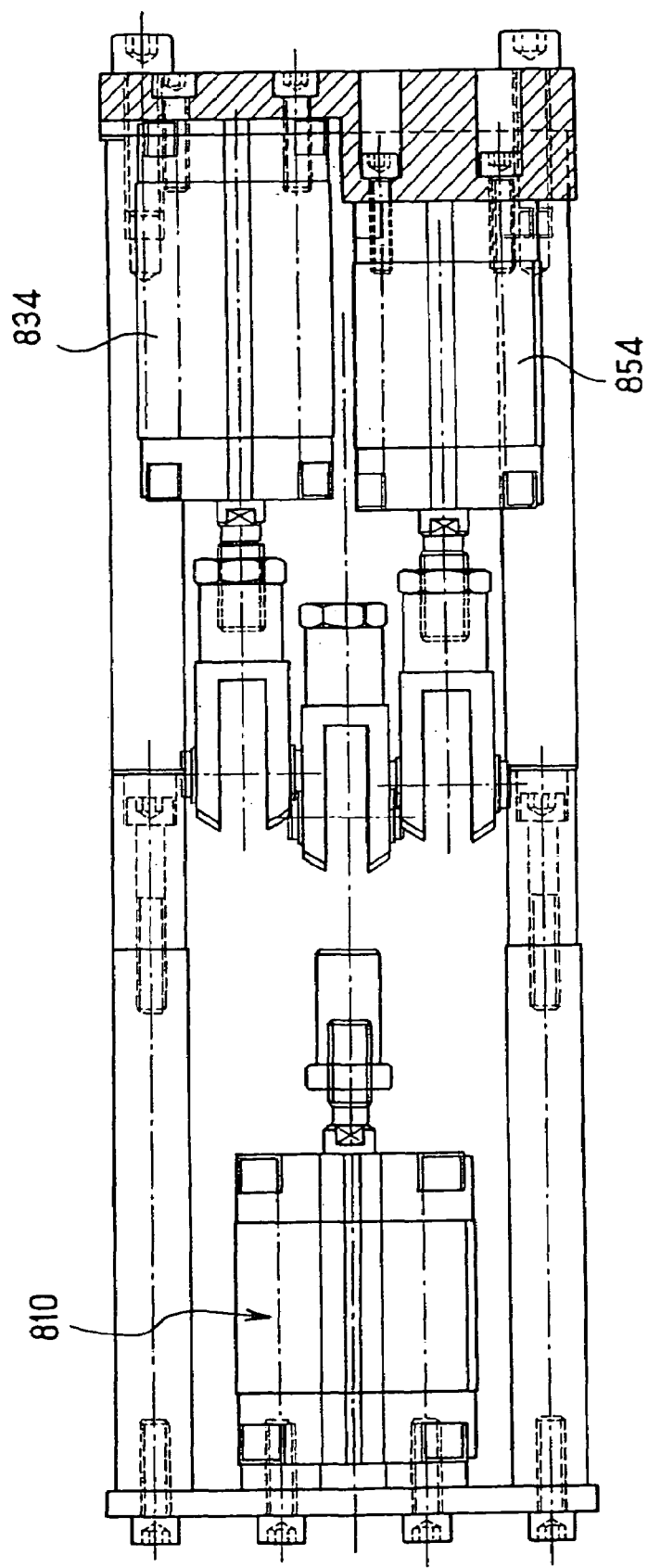
Figure 45:
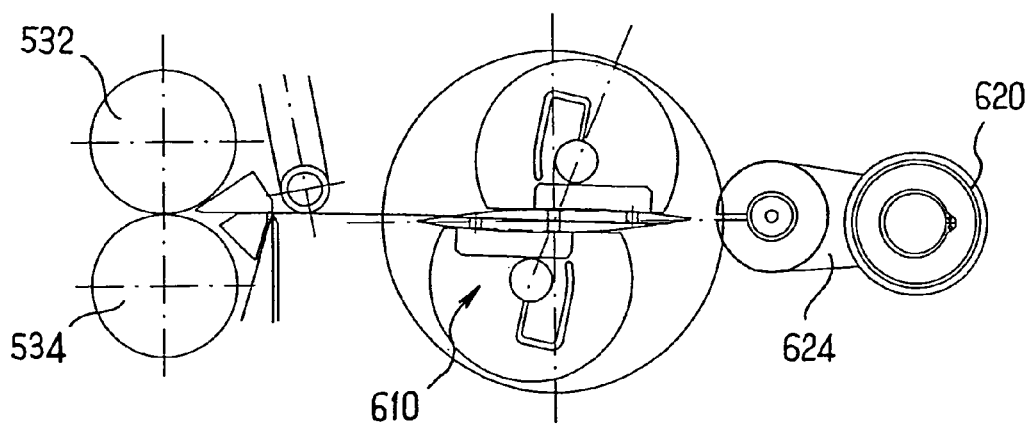
Figure 46A:
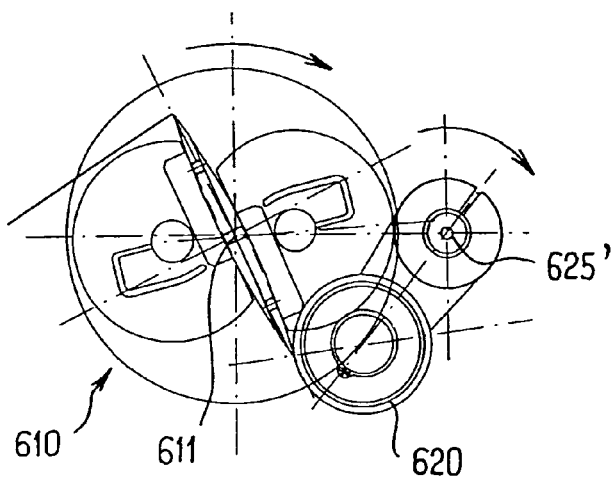
Figure 46B:
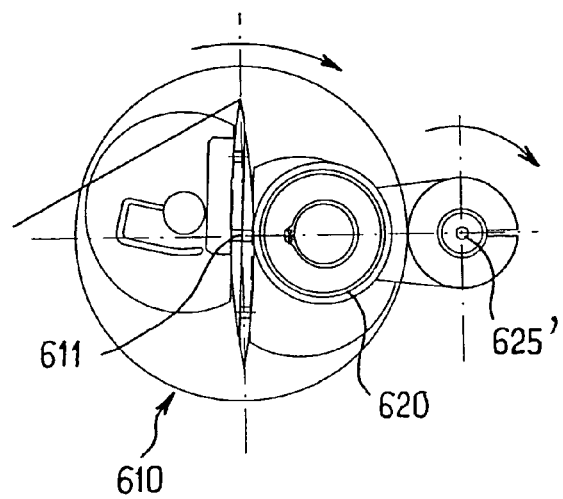
Figure 46C:
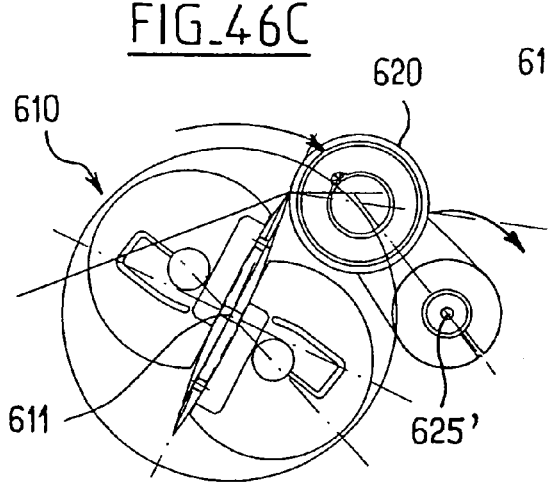
Figure 46D:
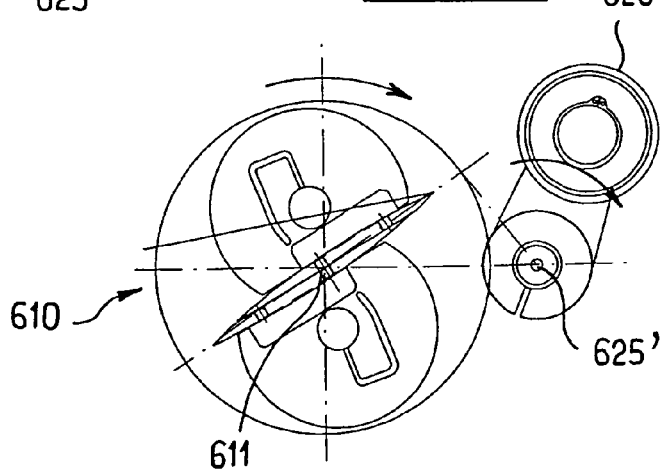
Figure 46E:
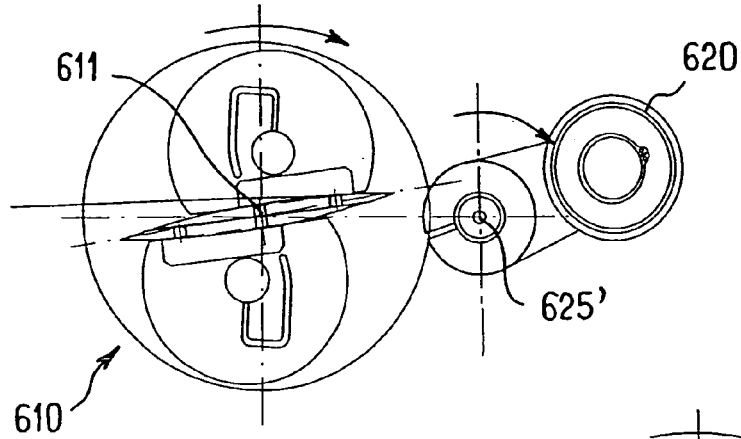
Figure 46F:
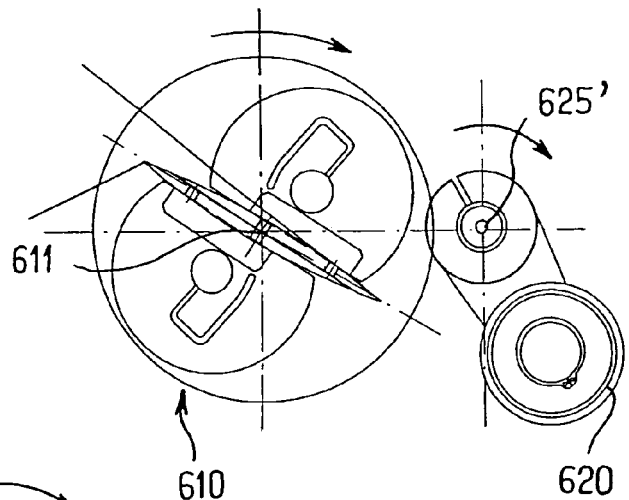
Figure 46G:
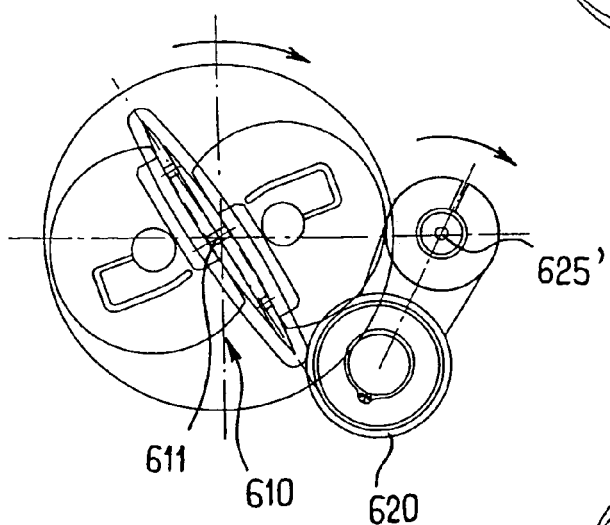
Figure 46H:
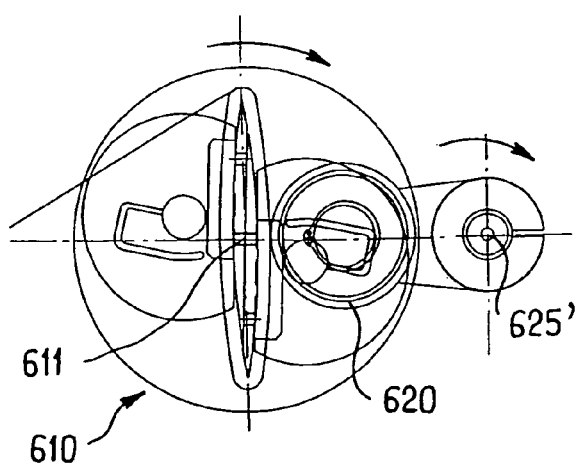
Figure 54:
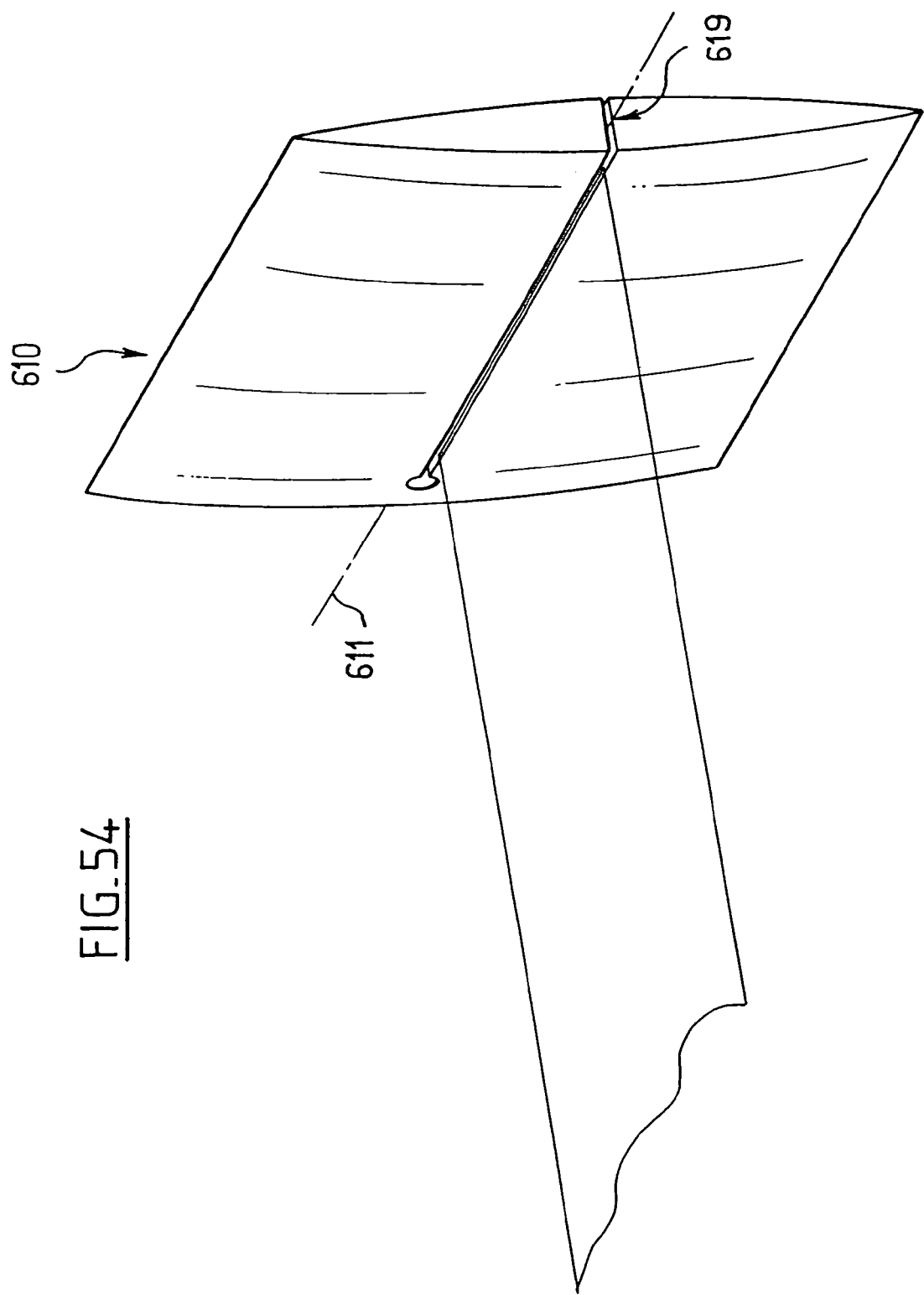
Figure 55A:
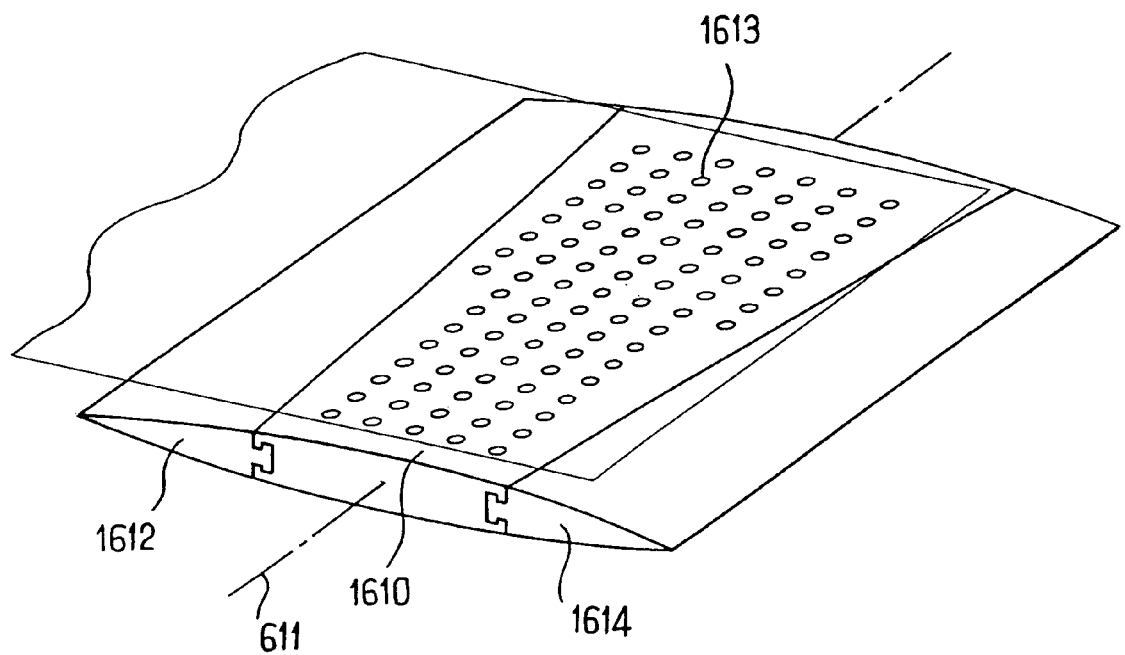
Figure 55B:
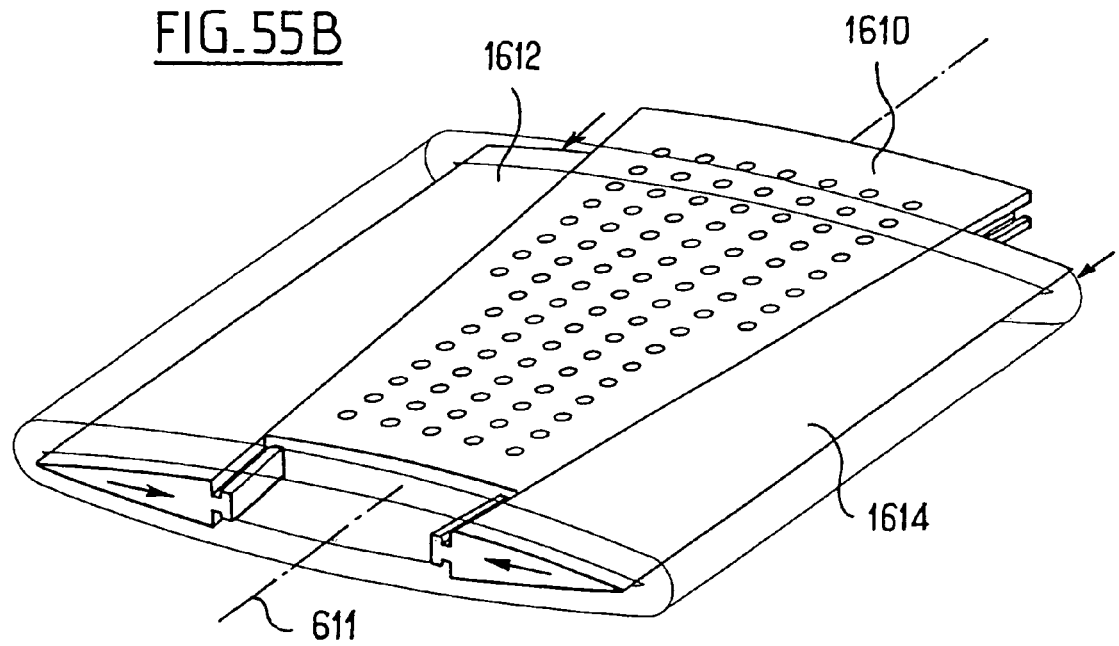
Figure 57:
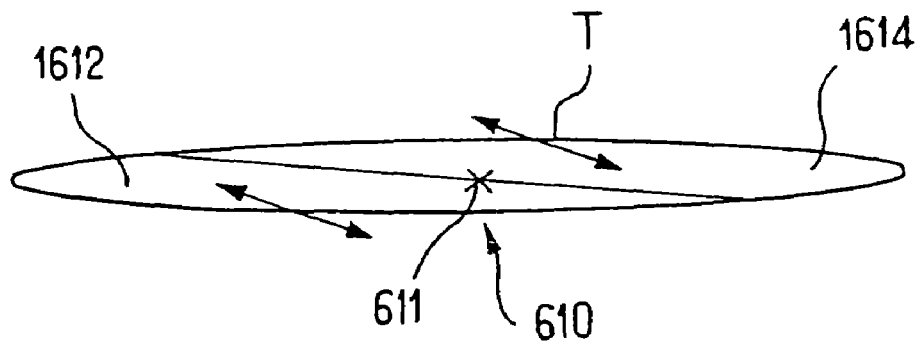
Figure 58:
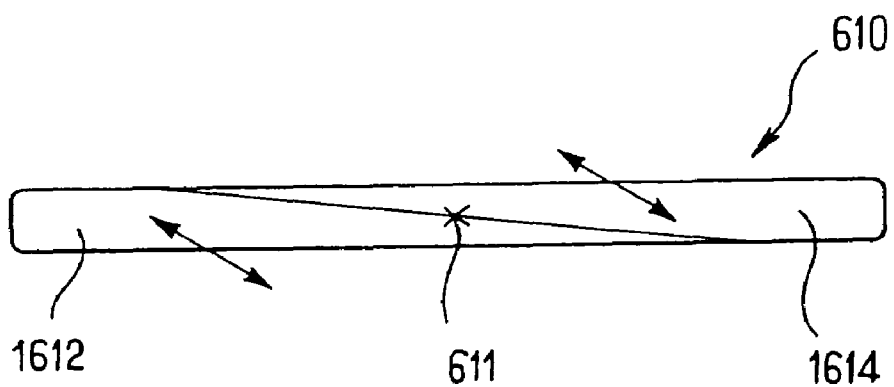
Figure 59:
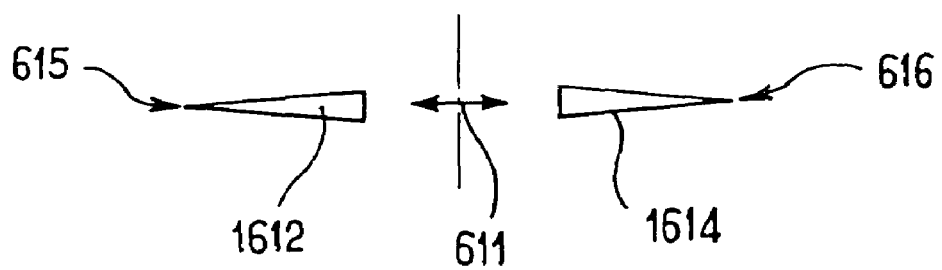
Figure 60:
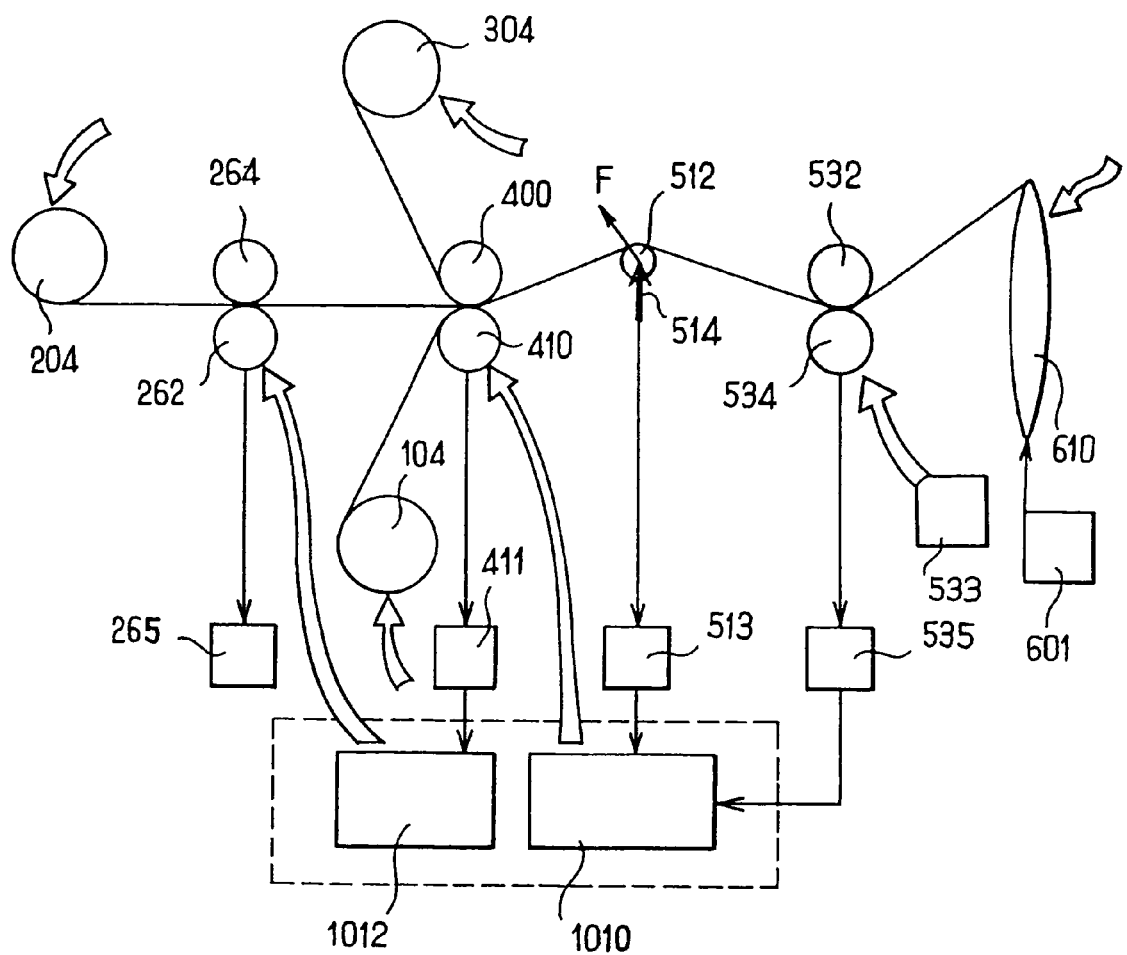
Figure 61:
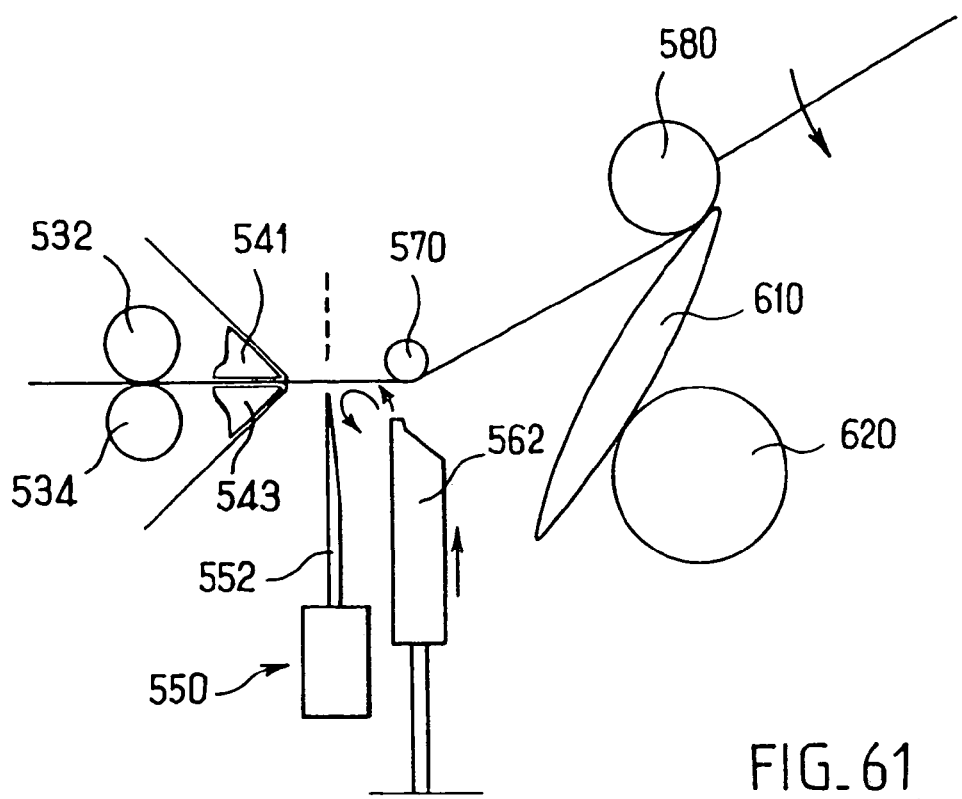
Figure 62:
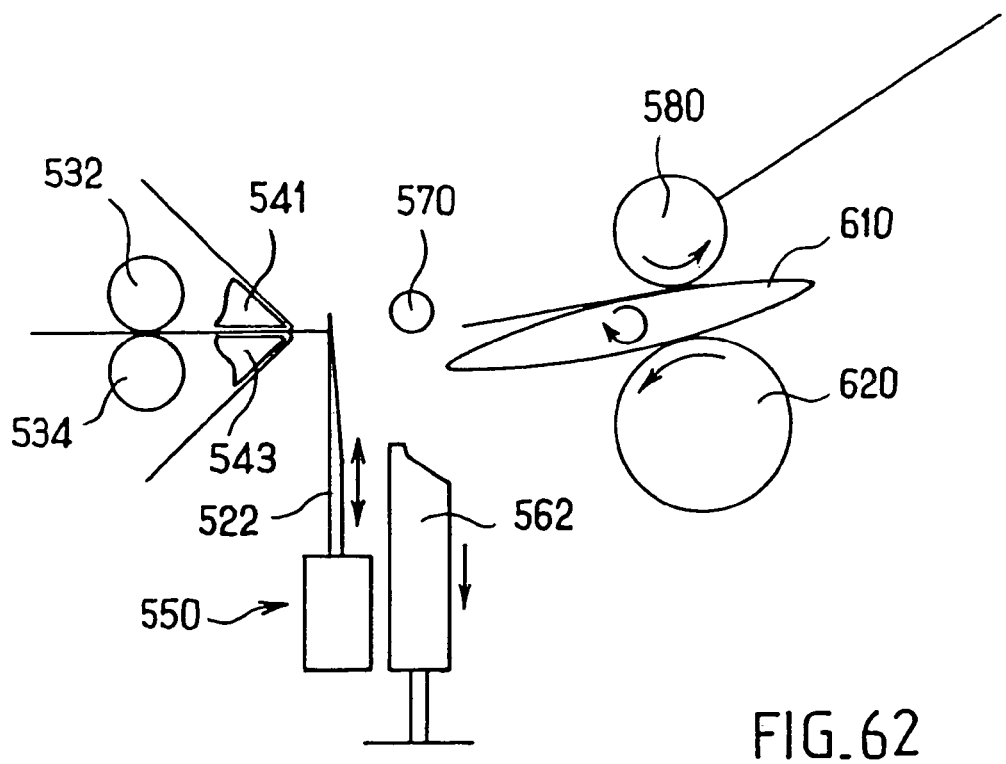
Figure 63:
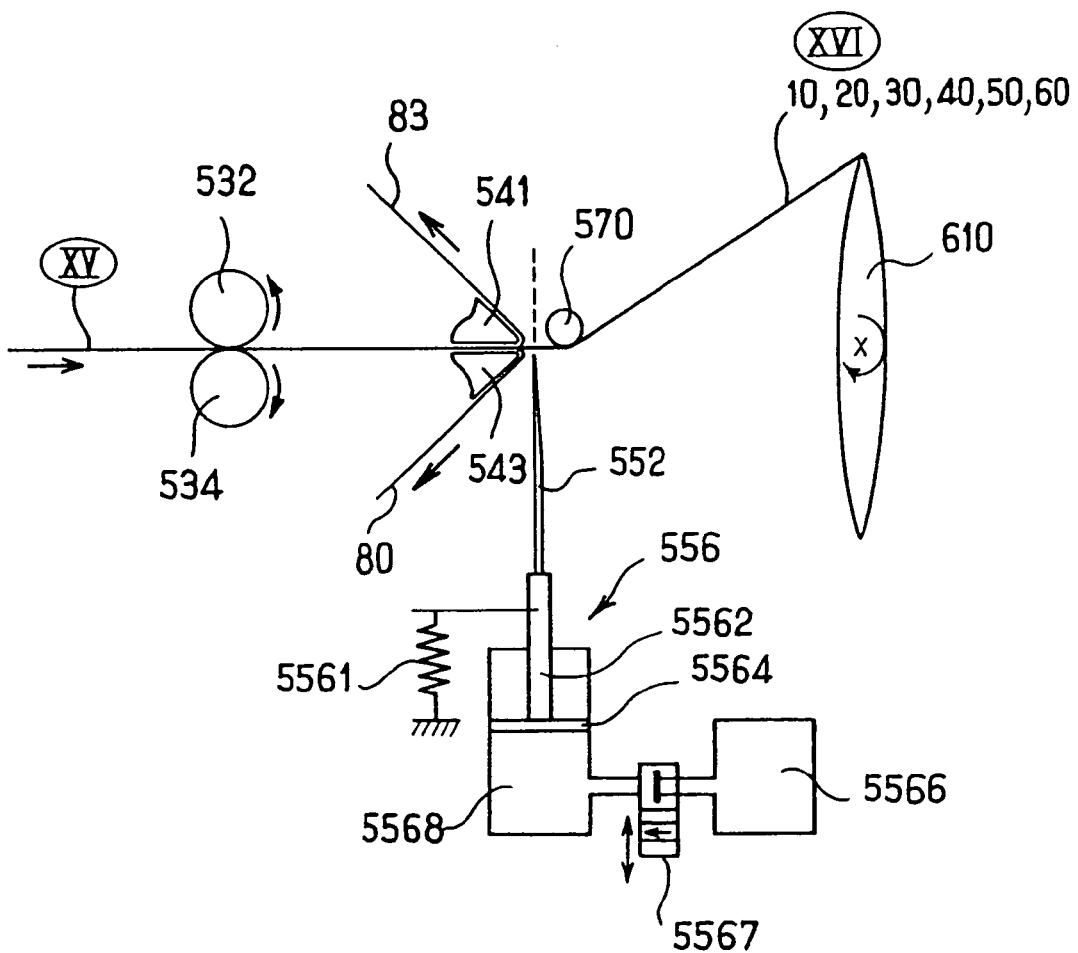
Figure 64:
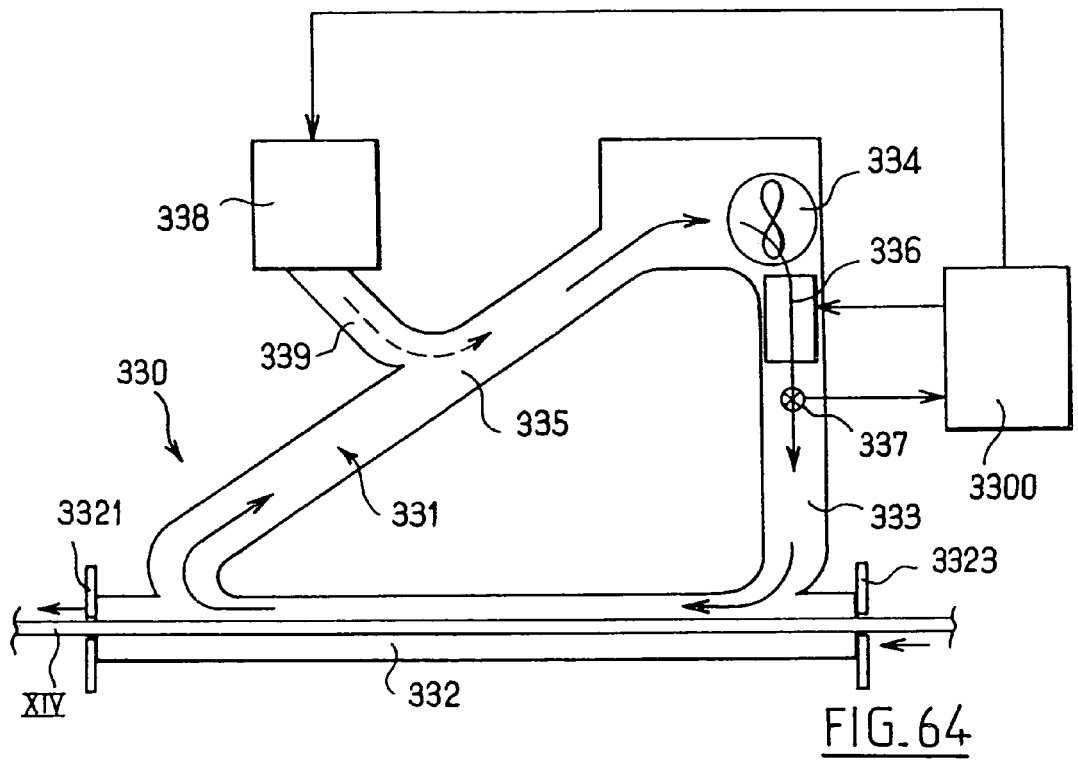
Figure 65:
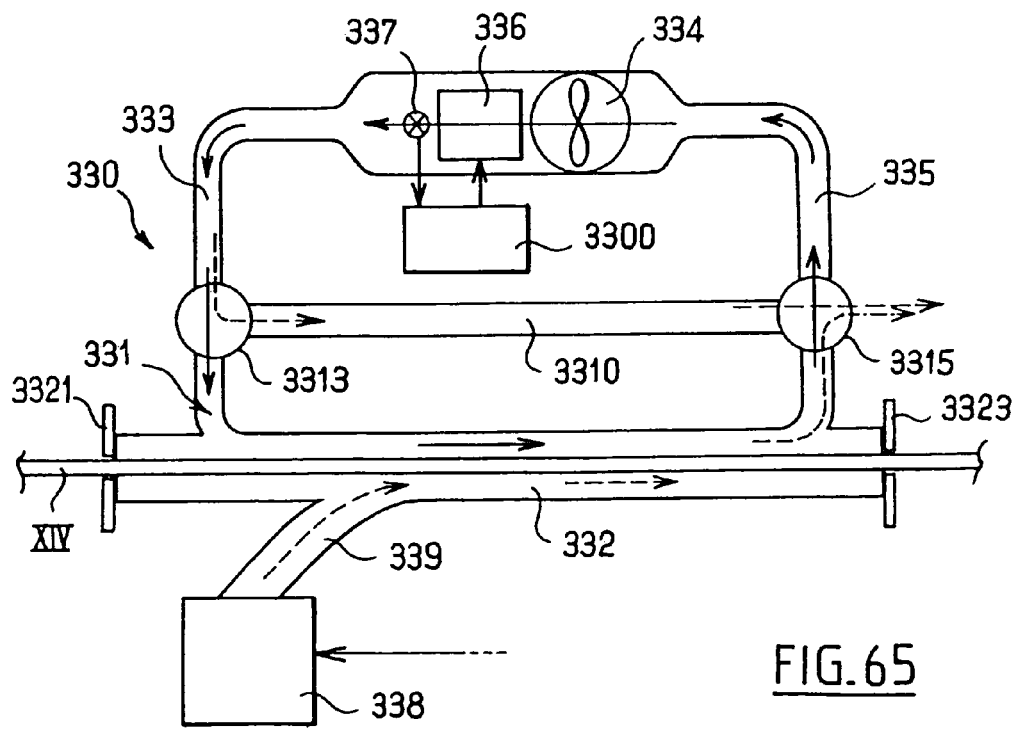
Figure 66:
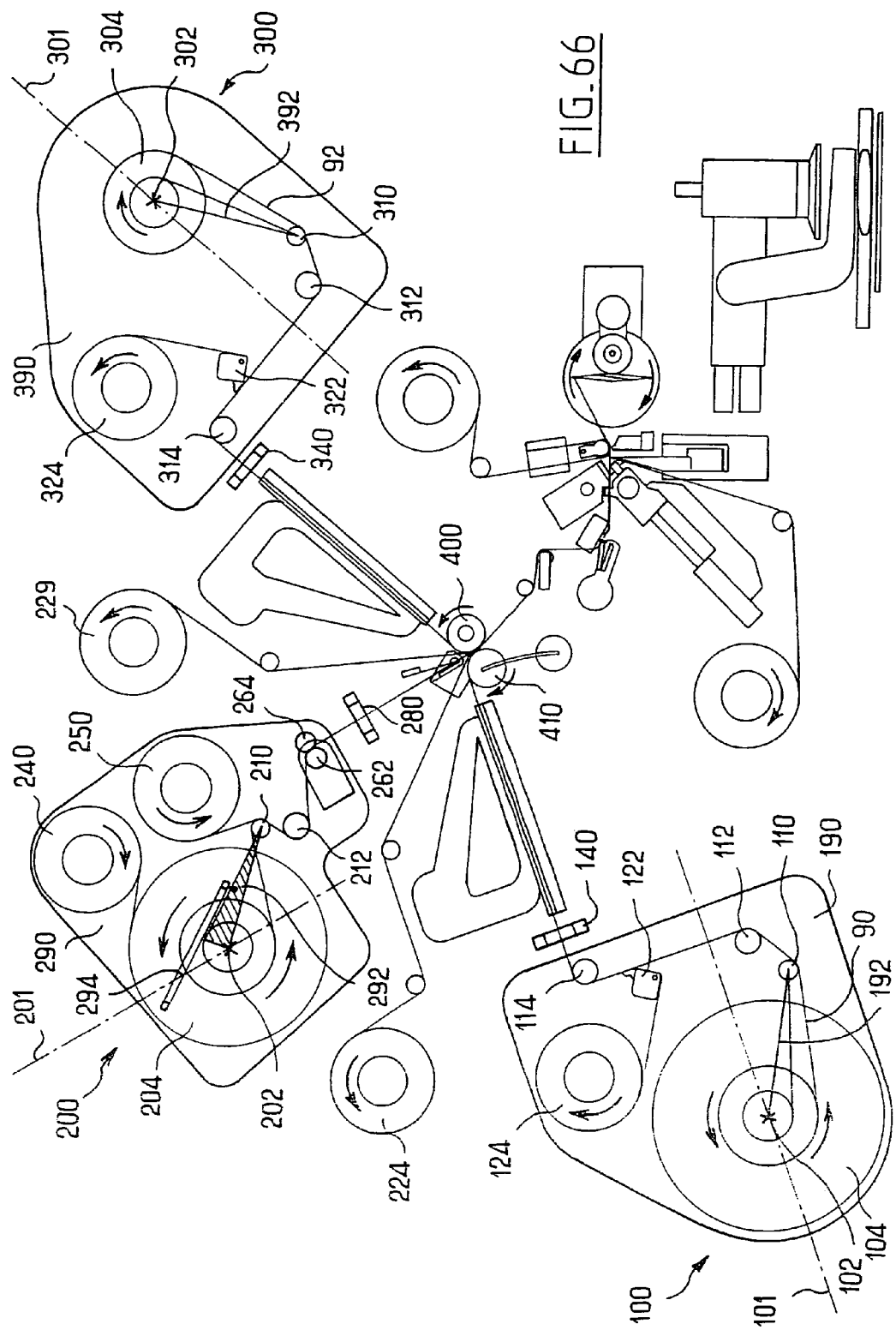
Figure 67:
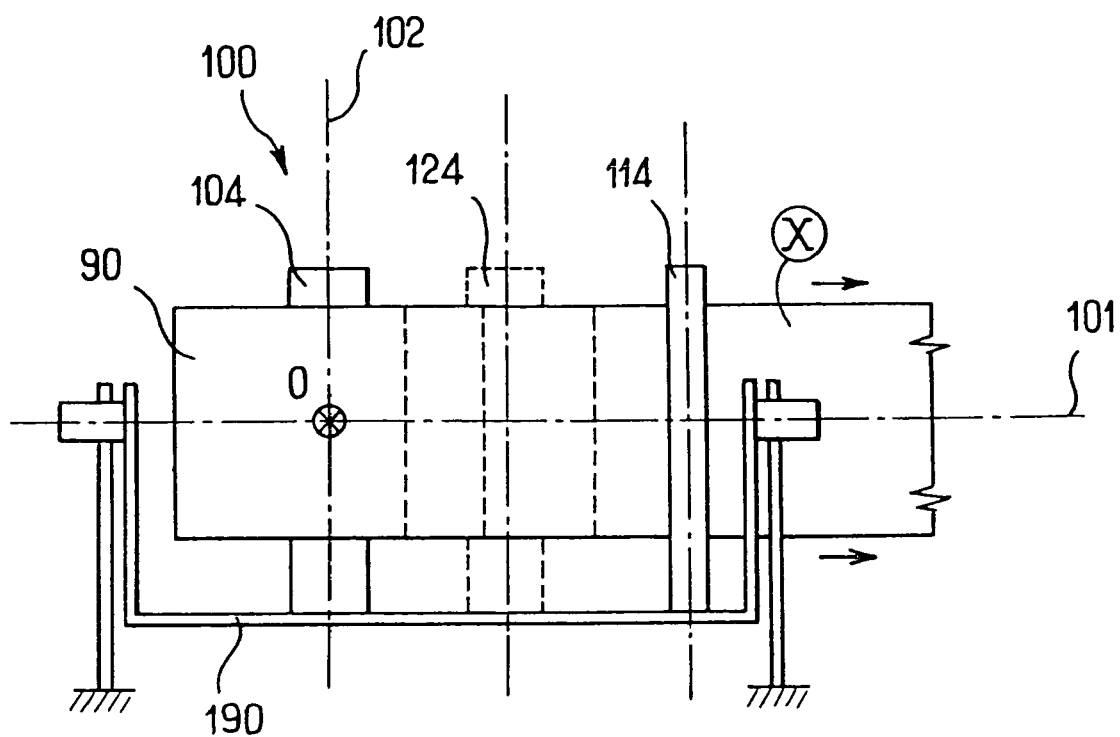
Figure 68:
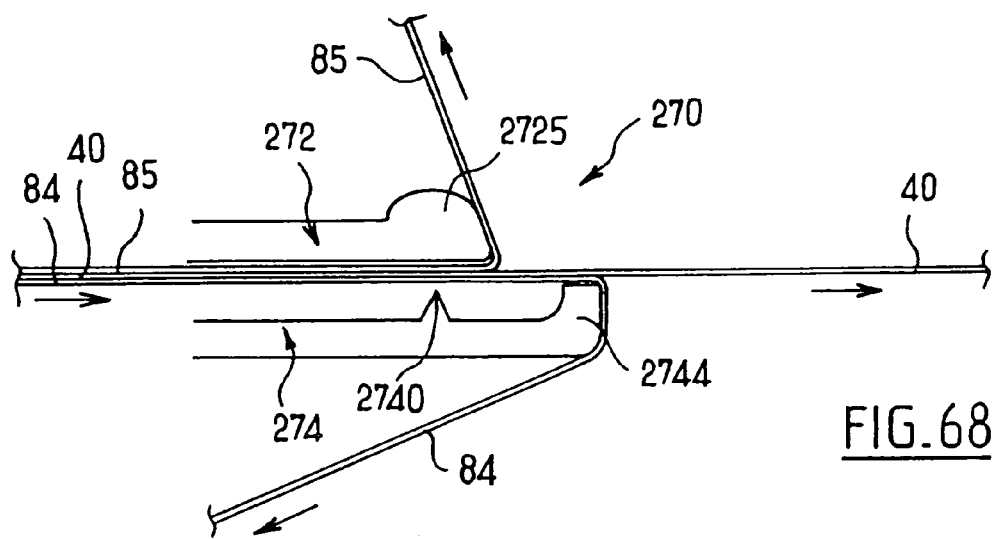
Figure 69:
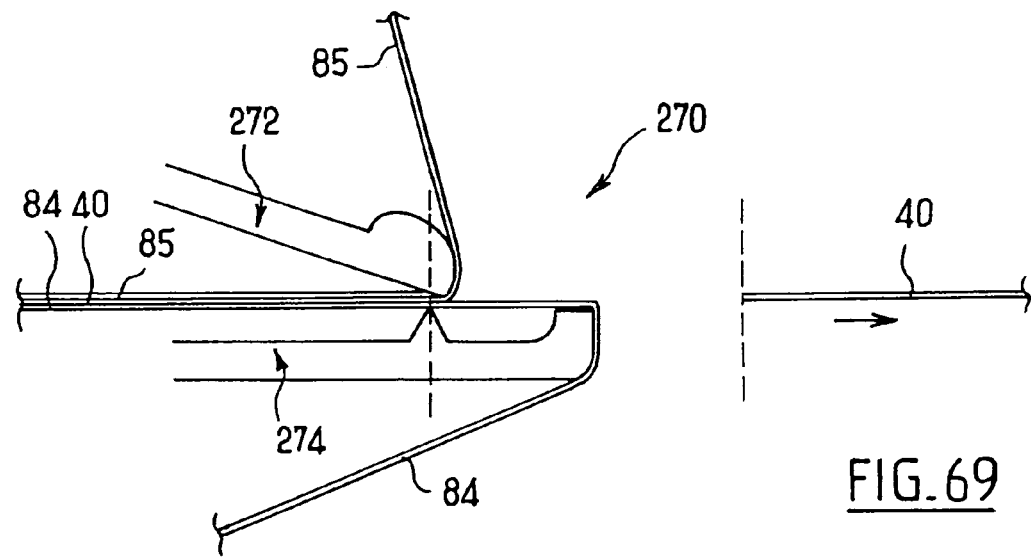
Figure 70:
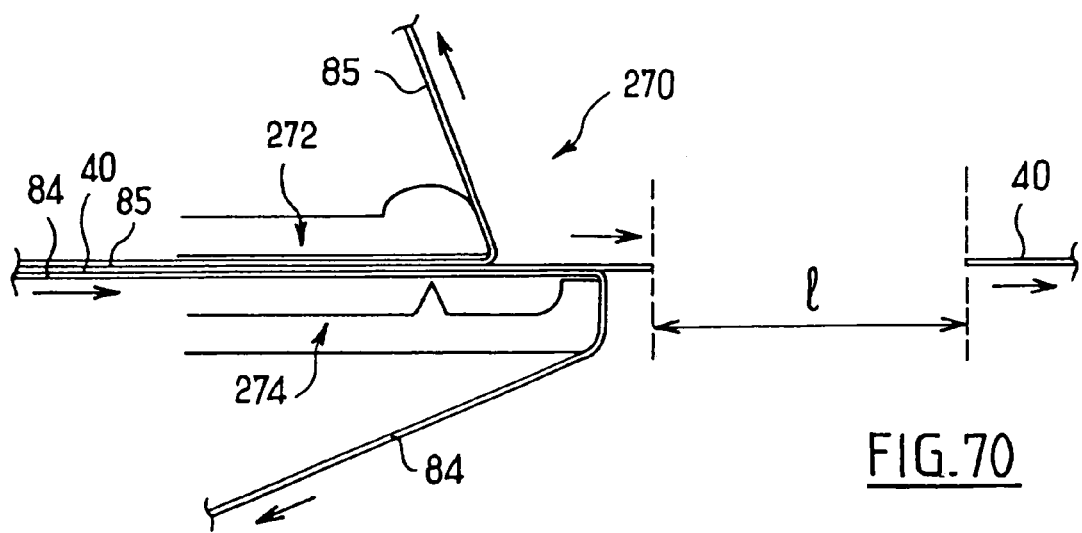
Figure 71:
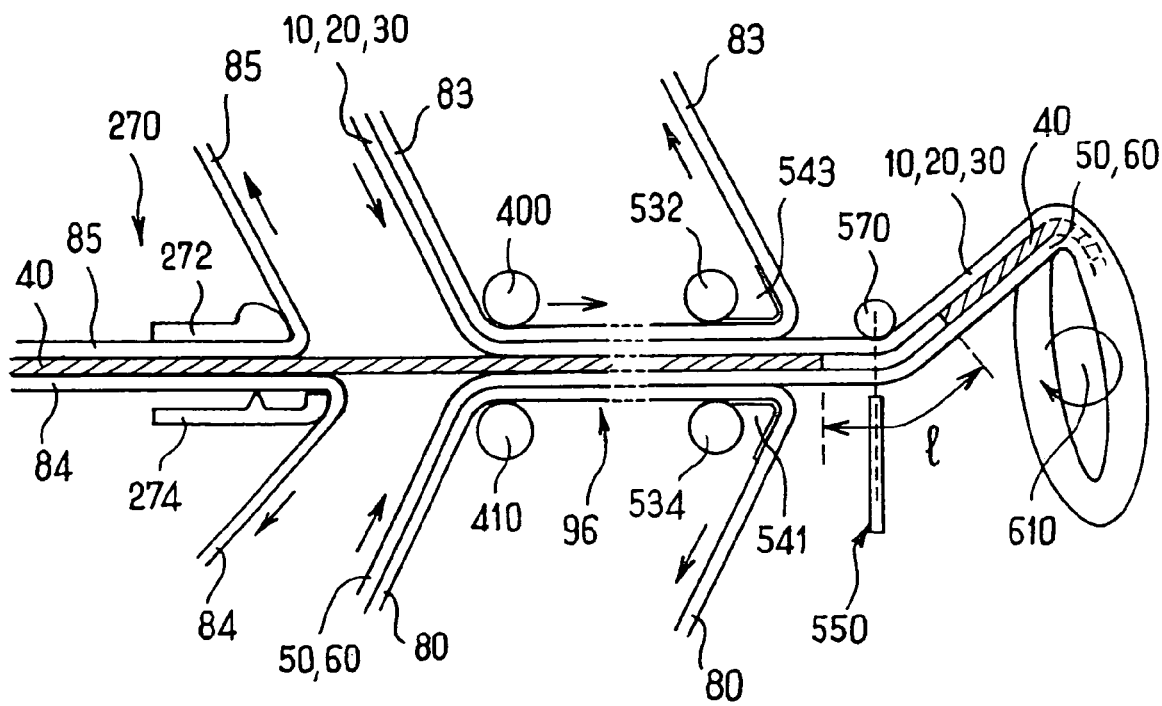

FIGS. 4, 5, and 6 are similar views of the winding means in three successive positions of their operation;

FIG. 7 is a fragmentary view of means in accordance with the present invention situated upstream from a laminating assembly;

FIG. 8 is a similar fragmentary view of means in accordance with the present invention situated downstream from the laminating assembly and upstream from a winding module;

FIGS. 9 to 16 are described in greater detail below and are diagrammatic cross-sections showing the multilayer structures implemented in different stages of feeding the device in accordance with the present invention;

FIGS. 17 to 20 which are also described in greater detail below are cross-section views of three basic multilayer structures used in the context of the invention and the resulting multilayer structure prior to being covered in film, for feeding to the mandrel, FIGS. 17 to 20 showing more precisely the relative positioning of the longitudinal side edges of the various layers involved;

FIG. 21 is a diagram of a winding in accordance with the present invention (FIG. 21 shows a number of turns that is smaller than in reality in order to simplify the illustration);

FIG. 22 is a diagram of means for driving a winding mandrel and an associated presser roller in accordance with the present invention;

FIG. 23 is a diagram of means for localized cutting of a current collector;

FIG. 24 is a diagram of the resulting current collector including localized cuts;

FIG. 25 is a diagram of a winding including such cuts;

FIG. 26 is a diagram showing a current collector as obtained by means of such cuts being deployed;

FIG. 27 shows curves that plot as a function of angular position the variation in the speed of rotation of the winding mandrel in accordance with the present invention and of an associated presser roller, for one complete revolution over 360° at the beginning of winding;

FIG. 28 shows similar curves that plot as a function of angular position the variation in the speed of rotation of the mandrel and of the presser roller at the end of winding;

FIG. 29 shows the variation in winding radius as a function of mandrel angle and also a curve of variation in a correction factor as a function of said angle;

FIG. 30 is a table of data used to control variation in the speed of rotation of the winding mandrel;

FIG. 31 is a diagrammatic view of the cutting edge of a cutter blade in accordance with a preferred embodiment of the present invention;

FIG. 32 is a diagram of a preferred embodiment of a film-remover in accordance with the present invention;

FIG. 33 is an overall block diagram of the device in accordance with the present invention;

FIG. 34 is a horizontal section view on the section plane referenced XXXIV-XXXIV in FIG. 8, showing the means for controlling the jaws of the mandrel;

FIG. 35 shows two half-shafts for controlling the relative displacement of the jaws of the mandrel in a juxtaposed position;

FIG. 36 is a cross-section view of a segment of one of the two half-shafts, in a section plane referenced XXXVI-XXXVI in FIG. 38;

FIG. 37 is an axial end view of the two above-mentioned half-shafts;

FIGS. 38 and 39 are respective side views of the two half-shafts;

FIG. 40 is a plan view of such a half-shaft, looking orthogonally to the views of FIGS. 38 and 39;

FIG. 41 is a side view of the mechanical control means of the half-shafts for orienting the two jaws of the mandrel relative to each other;

FIG. 42 is a view of the same means seen looking along the direction referenced XXXXII in FIG. 41;

FIG. 43 is a fragmentary view of the same means, in particular control actuators, seen looking along the direction referenced XXXXIII in FIG. 41;

FIGS. 44A to 44F show six respective positions of the jaws of the mandrel during a mandrel-closing sequence;

FIG. 45 shows the jaws of the mandrel in an initial position ready for the mandrel to rotate for winding purposes;

FIGS. 46A to 46H show eight successive positions of the jaws of the mandrel during such rotation;

FIGS. 47A to 47F show six successive positions of the mandrel and of a retractable additional presser roller while winding the last turn;

FIG. 48 is a diagram of the stage in which said additional presser roller is retracted;

FIG. 49 is a diagram of the stage in which rotation of the mandrel is stopped and the jaws are opened;

FIG. 50 is a diagram of the stage of extracting the winding element;

FIGS. 51A to 51E are diagrams of five successive positions and relate to the mandrel jaw carriers;

FIGS. 52A to 52E show respectively five positions of the mandrel jaws corresponding respectively to FIGS. 51A to 51E;

FIGS. 53A to 53E show the five positions of the mechanical control means corresponding respectively to the five FIGS. 51A to 51E;

FIG. 54 shows a variant embodiment of the mandrel;

FIGS. 55A and 55B are two views of another variant embodiment of the mandrel, respectively in a position for taking hold of the strip by sucking in air and in a position for extracting the winding;

FIGS. 56A, 56B, and 56C are three views of another variant embodiment of the mandrel, respectively in the winding position, in the extraction position, and in axial view;

FIG. 57 is a diagrammatic end view of a mandrel in accordance with another variant embodiment;

FIG. 58 is an end view of a mandrel in accordance with another variant embodiment of the invention;

FIG. 59 is a diagrammatic end view of a mandrel in accordance with another variant embodiment of the invention;

FIG. 60 is a diagram of an example of a device for controlling the drive of moving sheets in accordance with the invention;

FIGS. 61 and 62 are diagrams showing steps of the method of adhesively bonding the tail end of the winding;

FIG. 63 is a diagram of the cutter means and the associated actuator means;

FIG. 64 is a diagram of a heater device in accordance with an embodiment of the invention;

FIG. 65 is a diagram of a heater device in accordance with another embodiment of the invention;

FIG. 66 is a diagrammatic general view of main means making up the device for making electric energy storage assemblies, and showing unwinder and aligner systems in accordance with the present invention;

FIG. 67 is a diagrammatic side view of an unwinder and aligner system in accordance with the present invention;

FIGS. 68, 69, and 70 are diagrammatic views of the cutter mold in different positions; and FIG. 71 is a diagram of the cutter means enabling the laminate to be cut once winding has terminated.

In the description below, the term "upstream" and "downstream" are used with reference to the direction of movement of laminates through the device, the term "upstream" designating elements situated before a given reference, while the term "downstream" designates elements situated thereafter.

As shown in accompanying FIG. 1, the device in accordance with the present invention for making electric energy storage assemblies essentially comprises:

feed means A for feeding multilayer structures; and winder means E for winding these structures.

The feed means A serve to deliver a plurality of single-layer or multilayer sheets 90, 92, and 94 that are initially separate, and to laminate them, i.e. superpose them and bond them together. The feed means A also serve to ensure accurate relative positioning of the longitudinal edges of the various layers involved in the final laminate 96.

The various single-layer or multilayers sheets and the resulting laminates used in the context of the present invention travel parallel to a frame 900 of function defined in greater detail below.

The particular embodiment of the device shown in accompanying FIG. 1 is designed to make cell assemblies made up of a stack of six layers: a collector 10 (e.g. made of aluminum); a cathode 20 (e.g. based on polyoxyethylene (POE) and lithium salt); an electrolyte layer 30; an anode 40, e.g. made of lithium; an electrolyte layer 50; and a cathode 60. By way of example, the electrolytes 30 and 50 are based on POE and $LiV_3O_8$ or $V_2O_5$. The aluminum collector 10 is preferably coated in an anticorrison barrier, e.g. based on titanium nitride or some other material, e.g. graphite.

Nevertheless, the invention is not limited to this particular example.

In this context, the feed means A comprise three separate feed magazines 100, 200, and 300.

The feed means 100 is for feeding a four-layer laminate 90 comprising the above-mentioned cathode 60 and electrolyte layer 50 sandwiched between two outer protective films 80, 81 (see FIG. 9).

The feed means 200 is for feeding the anode sheet 40 (see FIG. 11).

The feed means 300 is for feeding a five-layer laminate 92 comprising: the electrolyte 30, the cathode 20, and the collector 10 sandwiched between two outer protective films 82 and 83 (see FIG. 13).

Preferably, each of the feed means 100, 200, and 300 comprises a reel of the desired laminate 90, 40, or 92, previously prepared by any appropriate means, and set into rotation on the common frame 900 about a respective axis of rotation 102, 202, and 302.

Naturally, the reels forming the feed magazines 100, 200, and 300 are removably mounted on the frame 900 so as to be capable of being replaced once emptied.

The three sheets 90, 40, and 92 coming from the three feed means 100, 200, and 300 respectively are laminated, i.e. stacked together, in a laminator module C interposed between the outlets from the feed means 100, 200, and 300, and the winder means E.

In FIG. 1, the reels carrying the laminates 90, 40, and 92 placed in the three feed means 100, 200, and 300, are given respective references 104, 204, and 304.

The four-layer laminate 90 coming from the reel 104 is guided to the laminator module C by rollers 110, 112, and 114.

Downstream from the outlet from the reel 104, the module 100 has a film-remover assembly 120 designed to remove the film 81 situated on the face of the electrolyte 50 that is to be laminated. This film-remover assembly 120 is positioned between the two deflector rollers 112 and 114.

The three-layer laminated structure 50, 60, 80 obtained at the outlet from the film-remover assembly 120 is shown in FIG. 10.

In addition, the feed means 100 includes a heater module 130 between the film-remover assembly 120 and the laminator module C. The structure and the function thereof are described in greater detail below.

In similar manner, the five-layer laminate 92 coming from the reel 304 is guided towards the laminator module C by rollers 310, 312, and 314.

Downstream from the outlet from the reel 304, the module 300 includes a film-remover assembly 320 designed to remove the film 82 situated on the face of the electrolyte 30 that is to be laminated. This film-remover assembly 320 is positioned between the two deflector rollers 312 and 314.

The four-layer laminated structure 83, 10, 20, and 30 obtained at the outlet from the film-remover assembly 320 is shown in FIG. 14.

In addition, the feed means 300 includes a heater module 330 between the film-remover assembly 320 and the laminator module C. The structure and the function thereof are described in greater detail below.

The feed means 200 for feeding an anode sheet, preferably based on lithium, includes two feed rollers 240 and 250 for feeding respective films 84 and 85.

The films 84 and 85 and the anode sheet 40 are guided by rollers 210, 212 to a primary applicator assembly 260. The function of this assembly 260 is to unite these initially-separate sheets coming from the respective feed reels 204, 240, and 250 into the form of a sheet comprising the anode layer 40 sandwiched between the two films 84 and 85.

The sandwich comprising the two films 84 and 85 on either side of the anode 40 is shown in FIG. 12.

The applicator assembly 260 is preferably constituted by two pinch rollers 262 and 264 mounted to rotate about respective parallel axes, and receiving the three above-mentioned sheets 84, 40, and 85 moving between them. Preferably, one of the rollers 262 has its axis of rotation in a fixed position, while the second roller 264 placed facing it acts as a presser roller and is urged to move against the first-mentioned roller 262 under a controlled level of force, e.g. by resilient means such as a spring blade 263.

Furthermore, at least one of the two rollers 262 and 264 is motor-driven. It is controlled to alternate between driving the sandwich 84, 40, 85 in traction, and braking the sandwich, synchronously with the process taking place downstream. In this respect, the rollers 262 and 264 are servo-controlled, being slaved to the downstream process means.

Where appropriate, at least one of the two rollers 262 and 264 is mounted on equipment that is retractable, e.g. under actuator control, so as to enable the two rollers 262 and 264 to be separated and thus make it easier to place the sandwich 84, 40, and 85 between them.

Downstream from the applicator assembly 360, the feed means 200 includes a sectioner module 270 for cutting the anode layer 40 transversely.

For this purpose, the sectioner module 270 comprises a hammer and anvil system 272 and 274 disposed respectively on either side of the travel path for the sandwich 84, 40, 85. The hammer 272 operates by striking transversely and linearly through the protective films 84 and 85.

At least one of the hammer 272 and the anvil 274, and preferably the hammer 272, has a striker edge.

The hammer 272 is urged sequentially to strike against the anvil 274 so as to define a downstream length in the initial anode sheet 40 that corresponds to the looked-for winding. It should be observed that the hammer 272 operates on the sandwich comprising the anode 40 between the two films 84 and 85. Nevertheless, the films 84 and 85 are made of a material that is suitable for withstanding being struck by the hammer 272 so as to avoid breaking the films 84 or 85.

The two films 84 and 85 are removed from the above-mentioned sandwich shown in FIG. 12 at the outlet from the sectioner module 270 by film-remover-means 220, 225. Where appropriate, the film-remover means 220, 225 may be formed by the hammer 272 and the anvil 274 themselves.

The anode segment 40 situated in front of the break line defined by the module 270 is driven by the drive means situated downstream, said anode segment 40 itself being sandwiched between the two sheets 50, 60, 80 on one side and 83, 10, 20, 30 on the other side in the laminator module C.

The segment of anode sheet 40 situated upstream from the break line is entrained by the films 84 and 85 since, as mentioned above, these films are not cut in the module 270.

On this point, it should be observed that the films 80, 81, 82, 83, 84, and 85 serve not only to prevent the outside faces of the laminate being polluted by the outside environment and to prevent the laminates from sticking to the various rollers involved, but they also contribute to driving the associated laminate.

The films 80, 81, 82, 83, 84, and 85 are advantageously based on polypropylene (PP), polyethylene (PE), polyethylene terephthalate (PET), or the like.

When they are removed, they are removed as far as possible down the path they follow so that the associated sheet never travels bare over a roller on its path, both to avoid polluting the sheet and to avoid polluting any roller.

It should also be observed that the two film unwinders 240, 250 associated with the anode unwinder 204 are substantially adjacent and that the film 84 coming from the unwinder 240 goes round the anode roll 204 over a winding arc (for tensioning) that is large (typically greater than 90° and preferably not less than 270°) both for the purpose of providing good protection for this fragile sheet and to guarantee adequate mechanical drive. This winding arc of the film 84 about the anode 204 is referenced $\beta$ in accompanying FIG. 7.

It varies as a function of the radius of the outer turn of the sheet present on the unwinder 240.

Sequential control firstly of drive imparted to the films 84 and 85, and consequently to the anode segment 40 situated upstream from the break line, and secondly of drive to the films 80 and 83, and consequently to the anode segment situated downstream from said break line is preferably adapted so as to define a gap, e.g. about 20 millimeters (mm) between the two above-mentioned segments, after the break has been made. More precisely, striking by the tool 272 is synchronized with the pinch rollers 262, 264 stopping as a brake so as to create an interruption in the travel of the lithium 40 while the laminate continues to go downstream at the same speed.

By the pre-breakage of the anode layer 40, this avoids any need downstream to cut simultaneously through all of the layers making up the final laminate, where such an operation would run the risk of pinching all of the layers against one another and could lead to short circuits between the anode 40, the cathodes 20 and 60, and the collector 10.

In order to avoid damaging the interface adjacent to the films, in particular by tearing, while they are being removed, preferably by the film removers in the above-mentioned stations 120, 220, 225, and 320, film removal is performed by using a scraper system 230 shown diagrammatically in FIG. 32, which system is disposed tangentially to the corresponding film and is provided with an almost sharp polished edge 232 adapted to peel off the film by deflecting it abruptly through at least 60° (see FIG. 32), possibly with the film being folded back onto itself substantially through 180° about a small radius of curvature (typically a radius close to 0.05 mm). The scraper 230 is constituted by a stationary blade having a dull edge 232 close to the travel plane, upstream, of the sheet carrying the film. The edge 232 has its convex side directed downstream relative to sheet movement. The inventors have found that peeling in this way enables the adjacent surface of the laminate to be preserved, whereas tearing off the film without taking precautions usually damages it. The above-mentioned scraper 230 enables the film to be unstuck by a shear effect between the functional sheet and the protective film. By pulling the protective film around the edge 232 of the scraper 230, the outside curvature of the protective film layer is lengthened, thereby locally creating a tangential force on said layer, with micro-stretching of the film, and a slip effect between the layer of film and the functional sheet, thus avoiding tearing any particles away from the functional sheet.

Preferably, the device also includes means for adjusting the traction force exerted on the protective film when it is diverted over the dull edge 232 of the scraper 230.

In FIG. 1, the scraper systems of the film-remover assemblies 120 and 320 are referenced 122 and 322. The films 81, 82, 84, and 85 removed at the stations 120, 320, 220, and 225 are directed to respective rollers 124, 324, 224, and 229. For this purpose, the film 84 is guided by the rollers 221 and 222, and the film 85 by the roller 226.

The function of the heater means 130 and 330 is to raise the interface outside surfaces of the electrolytes 50 and 30 to a controlled temperature before they are brought into contact with the anode layer 40 in the laminator assembly C, so as to ensure subsequent good adhesion between the electrolyte layers 50 and 30 and the anode 40. These heater means 130 and 330 are preferably constituted by ovens capable of rising and falling in temperature rapidly, suitable for blowing hot air by forced circulation in a regulated hot air loop, against the above-mentioned interfaces. Typically, the heater means 130 and 330 are designed to diffuse compressed air at a thermo-statically controlled temperature, e.g. at 60° C. with accuracy of ±1° C. against the interfaces of the electrolytes 50 and 30.

Still more precisely, the device in accordance with the invention as a whole includes sequential stages in which the travel of the feed films upstream from the winder module E is interrupted so as to enable the laminate to be cut and removed subsequent to each winding operation, and so as to enable re-engagement of a subsequent laminate, and the ovens 130 and 330 are preferably likewise controlled in sequential manner. In other words the diffusion of hot air within the ovens 130 and 330 is interrupted cyclically whenever the laminates stop traveling in order to avoid any excessive temperature rise on those portions of the laminates that are then situated in the ovens. Overexposure of these sheet segments to heat could spoil the quality of the final laminate.

Furthermore, in order to avoid any untimely rise in the temperature of the sheet segments held stationary in the ovens during stop stages, the heater means 130, 330 may include means suitable for sequentially blowing a jet of cool compressed air against the sheets. These means are typically adapted to bring the temperature inside the ovens to a value of about 40° C.

The ovens 130 and 330 are preferably formed as looped circuits. In the figures, references 132 and 332 designate the segments of these ovens through which the multilayer sheets 134 and 334 travel, with fans for causing hot air and cold air to be blown sequentially. For heating purposes, heater elements constituted by multiple bare electrically conductive wires are preferably placed facing the outlets from the fans 134 and 334.

In FIG. 1, references IX, X, XI, XII, XIII, XIV, XV, and XVI designate respective locations on the path of the device for the various laminates shown in FIGS. 9, 10, 11, 12, 13, 14, 15, and 16, respectively.

It is important to control the relative positioning of the longitudinal side edges of the various layers 10, 20, 30, 40, 50, and 60 making up the laminate delivered by the assembly C, in order to avoid unwanted electrical contacts between the various layers.

FIG. 17 shows the relative positioning of the longitudinal edges of the film 80, of the cathode 60, and of the electrolyte 50 downstream from the film-remover station 120. It should be observed that the width of the cathode 60 is less than that of electrolyte 50, and that the electrolyte overhangs on both sides of the cathode 60, while the film 80 is wider than the electrolyte 50 and overhangs from both sides thereof.

FIG. 18 shows the relative positioning of the longitudinal edges of the films 84 and 85, and of the anode 40. It can be seen that the anode 40 is of a width that is narrower than that of the two films 84 and 85, which may be identical in width, and the films 84 and 85 overhang on both sides of the anode 40.

FIG. 19 shows the relative positioning of the film 83, of the collector 10, of the cathode 20, and of the electrolyte 30. It can be seen that the cathode 20 is of width smaller than the collector 10, that a first edge of the cathode 20 is flush with a first edge of the collector 10, that the electrolyte 30 is of a width greater than the cathode 20, that it projects from either side thereof, that the electrolyte 30 projects relative to the first edge of the cathode 20 and of the collector 10, but that the second edge of the electrolyte 30 is set back from the collector 10, and that the film 83 has a first edge which projects relative to the first edge of the electrolyte 30, but possesses a second edge that is flush with the second edge of the electrolyte 30.

Finally, FIG. 20 shows the relative positioning of the film 80, of the cathode 60, of the electrolyte 50, of the anode 40, of the electrolyte 30, of the cathode 20, of the collector 10, and of the film 83 at the outlet from the laminator module C.

It can be seen that the edges of the electrolytes 50 and 30 are superposed, the anode 40 having an edge that is set back from the electrolytes 50 and 30 on the emerging side of the collector 10, while the anode 40 projects beyond the electrolytes 30 and 50 on the opposite side.

References XVII, XVIII, XIX, and XX in FIG. 1 designate the locations of the laminates shown respectively in FIGS. 17, 18, 19, and 20.

The relative positioning of the layers shown in FIGS. 17 and 18 is obtained while preparing the feed reels 104 and 304. The relative positioning shown in FIG. 19 is obtained by removing film in the module 260. The relative positioning shown in FIG. 20 is obtained in the laminator module C.

In order to define the relative positioning (which may also be referred to as "relative alignment") that is needed between the anode layer 40 and the two subassemblies shown in FIGS. 17 and 19, means are preferably provided that are suitable for detecting the positions of the longitudinal edges of the respective laminates upstream from the laminator assembly C, together with means suitable for moving the laminates relative to a common reference position, upstream from the laminator module C in order to obtain the desired relative positioning. These displacement means preferably act on the feed means 100, 200, and 300. For this purpose, each of the feed means 100, 200, and 300 is preferably mounted on an individual plate capable of being moved in controlled manner relative to the general support frame 900 of the device. Still more precisely, each of these plates is preferably mounted to pivot about a respective axis 101, 201, or 301 and is associated with controlled displacement means.

The means for detecting the positions of the edges of the laminates are preferably formed by ultrasound means or by optical means, where appropriate infrared means or laser means, disposed on two-tine forks carrying transmitters and receivers disposed respectively on opposite sides of the travel paths of the laminates.

In FIG. 1, reference 140 designates one such detector means associated with the laminate coming from the means 100, 280 designates the equivalent detector means associated with the laminate coming from the means 260, and 340 designates the equivalent detector means associated with the laminate coming from the means 300. The detector means 140 is placed between the roller 114 and the oven 130. The detector means 340 is placed between the roller 314 and the oven 330. The detector means 280 is placed between the primary laminator module 260 and the laminator module C.

The above-mentioned displacement means may be based on pneumatic actuators or on any equivalent means.

Preferably, each of the above-mentioned plates carries damper means suitable for resting against the above-mentioned common frame 900 to prevent the device from vibrating. By way of non-limiting example, the damper means may be formed by suction cups.

The above-mentioned pivot axes 101, 201, and 301 are preferably parallel to the plate 900. They pass through the centers of the unwinders 104, 204, 304 (through their axes of rotation 102, 202, 302) and lie in a midplane in the width of the reel placed on the unwinder. They are also parallel to the respective associated multilayer sheet segments situated immediately upstream from the laminator assembly C, as determined by the rollers 114, 262, and 314.

In this respect, it should be observed that the anode sheet segment 40 situated upstream from the laminator module C, guided by the roller 262, is situated substantially on the bisector of the angle formed by the laminate segments 90 and 92 coming respectively from the unwinders 104 and 304, upstream from the laminator module, as guided by the rollers 114 and 314. Still more precisely, upstream from the laminator module, the laminates 90 and 92 form an angle of about 150° between each other, and the anode sheet 40 situated on their bisector is at substantially 75° to each of those two laminates 90 and 92.

Similarly, and preferably, the anode 40, upstream from the laminator module C, is situated substantially on the bisector of the film segments 84 and 85 situated downstream from the film removers 220 and 225, which film segments 84 and 85 themselves make an angle of about 60°.

The deflector rollers 110, 112, 114, 221, 222, 226, 310, 312, and 314 enable the feeders 104, 204, and 304 to be placed far apart from one another and to bring the corresponding laminate segments close together upstream from the laminator module C, such that the complete angle formed between them at the laminator module is less than 180°.

It should be observed that the above-means for relatively positioning the basic laminates serve not only to guarantee satisfactory electrical connections in the finished product, and in particular to protect the cathode from short circuits by means of the projecting electrolyte, but also to optimize the active area in operation in a laminate width that is as small as possible.

The receiver rollers of the various film-remover assemblies 124, 224, 229, 324, 520, and 522 preferably comprise motor-driven winders.

Similarly, the unwinders 104, 204, and 304 are preferably motor-driven and set so as to control traction force, ensuring that it remains constant on the multilayer sheets involved. It is very important to maintain constant traction on the sheets in order to achieve reproducibility in the cells that are made.

The motors thus associated with the unwinders 104, 204, and 304 are controlled alternately to drive, when beginning to wind a laminate, and then to brake once drive of the laminate is taken over by means downstream.

In this context, it should be observed in particular that the motors of the various unwinders 104, 204, 304 and of the film removers 124, 224, 229, 324, 520, and 522 are controlled by a programmed central unit so as to ensure that the respective drive forces and braking forces that are required vary appropriately, with account being taken of changes in the diameters of the sheets being unwound and also in the diameters of the films being wound in.

These diameters may either be calculated by the central unit on the basis of the respective lengths of laminate and film that have been processed, or else they can be measured using appropriate sensors, e.g. ultrasound sensors, respectively fitted to each of the unwinders and winders concerned 104, 204, 304, 124, 224, 229, 324, 520, and 522.

The laminator assembly C preferably has two pinch rollers 400 & 410 mounted to rotate about parallel axes and having the stack formed by the superposed layers passing between them, i.e. the layers: film 80, cathode 60, electrolyte 50, anode 40, electrolyte 30, cathode 20, collector 10, and film 83.

The two pinch rollers 400 & 410 are urged towards each other with a controlled amount of force. They therefore exert controlled pressure on the sheets conveyed between these rollers 400 & 410. For this purpose, the axis of rotation of the roller 400 is preferably stationary while the axis of rotation of the roller 410 is mounted on equipment that is urged towards the above-mentioned roller 400 with a controlled amount of force, e.g. by a resilient member such as a spring blade 412. Preferably, the roller 410 is also mounted on retractable equipment controlled by drive means, e.g. an actuator, to act on command to disengage the roller 410 and make it easier to put the laminate into place.

Thus, at the outlet from the laminator assembly C, there is to be found the stack that is shown in FIGS. 15 and 20.

Where appropriate, the laminating rollers 400 & 410 may also be heater rollers. Typically they are of a diameter of not less than 20 mm.

The device in accordance with the present invention further comprises, between the laminator module C and the winder module E, an assembly 500 having multiple functions, and in particular having the following functions: 1) in a module 510, controlling the delivery rate (in length) of the laminate; 2) in a module 520, making localized longitudinal cuts in the collector 10; 3) in a module 530, ensuring that the laminate is driven at the beginning of winding and that the same laminate is braked once it is put under traction by the mandrel 610; 4) in a module 540, removing the films 80 and 83; 5) in a module 550, sectioning the layers 10 to 60 of the functional stack after a length corresponding to the desired winding has gone past; and 6) in a module 560, heating the outside faces of the resulting stack at the end of a winding operation.

The detector device 510 serves to control corrections for lack of synchronization that can result by microslippage of the laminate on the rollers 400, 410, so as to ensure that the winder E is fed at constant speed.

By way of non-limiting example, such a detector device 510 can be formed by a synchronization roller 512 mounted on a pivoting lever 514 urged to bear against the traveling laminate by a pneumatic actuator or by any equivalent means, and associated with an absolute encoder 516.

The laminate is pressed against the roller 512 by a roller 518 located upstream on the travel path of the laminate.

The cutter module 520 is designed to split an edge of the collector 10 in the longitudinal direction linearly and sequentially. In the accompanying figures, the resulting cut segments are referenced 521. Each segment 521 is of substantially equal length L1, while being slightly less than half a winding circumference on the mandrel 610. The action of this device 520 is controlled so that the splits 521 are all superposed on the same face of the final wound cell. In other words, these splits 521 are implemented at a pitch P1 that is identical to the length of each turn made on the mandrel 610. Insofar as this length varies by increasing, due to the accumulated thickness on the mandrel 610, the pitch of the splits 521 is preferably also variable.

As shown diagrammatically in accompanying FIG. 26, in the final shaping station 700, a transverse segment 522 is cut between the axial end of the above-mentioned cut 521 and the adjacent free edge of the collector 10, and then the outer side strip 523 as defined in this way in the collector 10 is deployed towards the outside of the wound cell to serve as a connector to the current concentrator. In FIG. 26 the portion of the collector strip 10 as deployed in this way is referenced 525.

The splitter device 520 is preferably of the "air cut" type. It comprises a reciprocating splitter blade 524 adapted to section the collector 10 locally and sequentially between two rollers 526 and 528 that provide backing for the laminate. In FIG. 23, the pivoting movement of the blade 524 is represented by double-headed arrow 529.

The drive module 530 preferably comprises two pinch rollers 532 & 534 between which the entire laminate shown in FIGS. 15 and 20 is caused to pass. These two rollers 532 & 534 are associated with respective motors. While the front end of the laminate is being taken towards the mandrel 610, the rollers 532 & 534 are controlled to operate in drive mode. In contrast, once the leading end of the laminate has been taken hold by the mandrel 610, it is the mandrel that provides drive, and the respective motors of the rollers 532 & 534 are controlled to provide braking. This guarantees that the laminate is pressed tightly against the mandrel 610. These two pinch rollers 532 & 534 are situated close to the winding mandrel 610, upstream therefrom.

The drive to the pinch rollers 400 & 410 is servo-controlled on the drive to the pinch rollers 532 & 534 which act as master rollers relative to the rollers 400 & 410 which act as slave rollers.

At least one of the rollers 532, 534 is associated with force delivery means such that the rollers 532 & 534 exert a controlled level of pinch force on the laminate passing between them.

Furthermore, at least one of the rollers 532, 534, e.g. the roller 534, is preferably mounted on retractable equipment 535, e.g. controlled by an actuator 536, in order to facilitate inserting the laminate between the rollers 532 & 534.

In the module 540, the films 80 and 83 are removed using scrapers 541 and 543 similar to the scrapers 122 and 322 described above. After removal, the films 80 and 83 are directed via rollers 542 and 544 onto takeup rollers 546 and 548. These rollers are motor-driven in the manner described above.

The resulting stack of six layers 10, 20, 30, 40, 50, and 60 of the laminate is cut transversely in full immediately downstream from the film-remover scrapers 541 and 543 in the module 550, using any appropriate means.

The cutter means 550 preferably comprise a blade 552 having a sharp edge 554 formed by a convex ridge having two symmetrical slopes (see FIG. 31) and driven to move quickly over a short stroke whenever a cut is required.

The displacements of the cutter blade 552 are controlled by means 556 preferably constituted by an actuator. Furthermore, the cutter blade 552 is preferably placed on retractable equipment that is controlled by specific displacement means, e.g. a second actuator 558, in order to enable the cutter blade to be retracted on request, so as to make the laminate easier to put into place, or so as to facilitate any other maintenance intervention that might be required.

In a variant, these cutter means may be formed by a hammer and anvil system similar to that described above under the references 272 and 274.

The structure of the cutter means 550 as compared with the prior art is described below.

In the context of an automatic device for making windings, it is necessary to use cutter means that are automatic and synchronized with the travel of the laminate.

For this purpose, "backing" and "groove" type cutter means are known. These means generally comprise a sharp tool and a complementary tool positioned facing it on opposite sides of the travel path of the laminate. The sharp tool is in the form of a blade or a wheel. The blade or the wheel slices sequentially through the laminate pressed against a backing surface or inside a groove. In both cases, the laminate is brought into contact either with the backing surface or with the two sides of the groove.

A drawback of those cutting techniques in the context of making energy storage assemblies lies in the laminate coming into contact with the complementary tool, since that runs the risk of causing certain layers forming the laminate to stick to the complementary tool.

This contact also generates pollution on the outside faces of the laminate from the complementary tool, and vice versa.

The inventors have found that it is particularly advantageous to build up the single-layer or multilayer sheets forming the laminate so as to constitute a sandwich between protective films. The function of these films is to prevent the outside faces of the laminate being polluted by the outside environment and to prevent the laminates sticking to the various rollers involved. These films also contribute to enabling the laminate to be driven.

The films protecting the outside faces of the laminated sheet must be removed prior to the laminate being wound on the mandrel. These films are removed as late as possible on the path of the sheet, so that the sheet never passes bare over a roller on its path and so that it is always driven through the film.

Consequently, these films are removed preferably immediately upstream from the final cutter means.

This means that it is not possible to use "backing" or "groove" type cutter means as mentioned above in which the complementary tool has a backing surface or a groove that occupies a certain amount of space and that is unsuitable for use in an automatic machine for making energy storage cells. The machine needs to be placed in an anhydrous environment, such as a small anhydrous room. Consequently, the elements of the machine need to be as compact as possible so as to minimize the final overall size of the machine.

In this context, the invention proposes a cutter device that is compact, and compatible with the constraints of making energy storage assemblies automatically in the form of windings.

To this end, the invention proposes a device for making electric energy storage assemblies and including means for driving a laminated sheet and means for winding a laminated sheet, the device being characterized in that it further comprises means for tensioning the laminated sheet over a segment, and movable cutter means that are suitable for being actuated sequentially to cut the laminated sheet in air through its tensioned segment.

In such a device, since cutting takes place in air, the film does not bear against any surface. The device thus makes it possible to exclude any pollution of the laminate.

The fact that the film is tensioned as it moves past the cutter means also makes it possible to achieve a cross cut that is accurate.

Advantageously, the means for tensioning the laminated sheet comprise a roller against which the laminated sheet bears, the roller being positioned between the cutter means and the means for winding the laminated sheet, on the path of the sheet.

Preferably, the cutter means comprise a blade having a sharp edge formed by a convex ridge with two symmetrical slopes.

The fact that the cutter blade is in the form of a symmetrical ridge having two slopes presents certain advantages compared with a conventional blade presenting a single slope. Blade symmetry makes it possible to limit transverse deformation of the film. If cutting were performed by a blade having a single slope, there would be a risk of generating transverse stresses in the sheet when it is engaged, and that could spoil the lateral adjustment of the sheet. In addition, for a given blade angle, a blade having two slopes is not as tall as a blade having a single slope, so a two-slope blade can be actuated over a stroke that is shorter than for a single slope blade. Consequently it can be actuated more quickly.

[Insert Details of an Example of the Geometrical Characteristics (Angle, Height) of the FIG. 31 Blade.]

FIG. 63 is a diagram showing the cutter means 550 and the associated actuator means.

The cutter means 550 are disposed on the travel path of the laminate between the film-remover means 541, 543 and the backing roller 570, as close as possible to the film-remover means.

These cutter means comprise a blade 552 (see FIG. 31). The blade 552 is caused to move by actuator means 556. These actuator means 556 comprise a pneumatic actuator having a rod 5562 secured to a piston 5564 co-operating with the cylindrical body of the actuator to define a chamber 5568 into which gas under pressure can be injected.

The injection chamber 5568 is connected to a dispenser 5566 of gas under pressure that is directly juxtaposed with the actuator 556. The chamber 5568 communicates with the gas dispenser 5566 via a valve 5567 that can be controlled to occupy an open position or a closed position.

When the valve 5567 is controlled to occupy its open position, the gas under pressure is injected almost instantaneously from the dispenser 5566 towards the injection chamber 5568. The injection of gas causes the piston 5562 to move in translation and consequently moves the blade which sections the laminate along a line of cut represented by dashed lines in FIG. 63.

By means of these cutter device, a cut can be made in less than 0.2 seconds (s) (i.e. the time interval between commanding a cut and the laminate being fully sectioned). The rapid triggering of the device is obtained by the fact that the dispenser 5566 is directly juxtaposed with the actuator. The injection chamber 5568 is fed directly from the dispenser 5566 without any intervening pipework. Thus, the pneumatic circuit between the dispenser 5566 and the injection chamber 5568 is extremely short and enables the piston to get up to speed quickly.

This fast acceleration enables the sharp edge effect of the blade 552 to be combined with an effect of the laminated sheet being struck, thus guaranteeing that a clean cut is obtained.

As can be seen in FIG. 63, the actuator 556 is an actuator of the "single-acting" type, there is no way of feeding gas under pressure to the other side of the piston 5564, i.e. the side supporting the rod 5562. The side supporting the rod is connected to the surrounding atmosphere. The piston is thus returned by means of a return spring 5561 associated with the rod 5562. This spring 5561 serves to return the blade 552 and the piston 5564 into the rest position after they have been actuated.

The means for actuating the cutter device 550 are controlled synchronously with the set of rollers of the device for making storage assemblies.

In particular, the rollers 532 & 534 for driving the laminated sheet and the mandrel 610 are controlled to act as brakes in order to prevent the segment of film subjected to the cutter means from moving while it is being sectioned. When the cutter system is triggered, the segment of sheet is thus held stationary, being tensioned in position between the rollers 532 and 534 and the backing roller 570.

In a variant, the cutter means may be constituted by a taut wire or by a multipoint blade (of the handsaw type), or even a laser. It should be observed that using a laser requires that sublimed sheet material be sucked up in order to avoid polluting the layers and/or components of the device for making storage assemblies.

Under all circumstances, the cut is advantageously a cut made in air.

The cut performed by the cutter means 552 extends substantially through the middle of the gap formed in the lithium anode layer 40 in the striker station 572/574. Thus, as can be seen in FIG. 21, the anode layer 40 is set back from the other layers constituting the winding, both at the leading end and at the trailing end of the winding.

Furthermore, as can also be seen in FIG. 21, the two axial ends Ei and Ee of the finished winding En are preferably not superposed. In other words, the outer end Ee of the winding is interrupted before reaching the inner end Ei in order to avoid extra thickness at this location. Thus, the flattened finished winding presents overall thickness that is identical over its entire extent.

The end faces of the stack are heated by any appropriate means in the module 560, e.g. by blowing fan-driven hot air or by passing over a heater roller.

This heating is preferably performed by a retractable bar for blowing hot air 562 that is situated immediately downstream from the cutter device 550 to heat a transverse strip of the laminate so as to prepare for heat-sealing at the end of winding.

The above-mentioned heater means serve to solve the following problems.

Techniques are already known for making electric energy storage assemblies in the form of multilayer windings.

Such assemblies are generally made by winding layers of superposed polymer materials on a circularly cylindrical mandrel. Once the number of turns in the winding is sufficient, the layers need to be cut transversely by cutter means.

To finish off winding and prevent the cut end (i.e. the tail of the winding) from flapping loosely, this end must be properly secured to the winding. The resulting winding is then separated from the mandrel.

The circularly cylindrical winding is then flattened in press means so as to give it a more compact flat shape. This flat shape enables storage assemblies to be stacked easily and enables a plurality of assemblies to be interconnected in series and/or in parallel.

The winding tail can be secured by various different techniques.

One possible technique consists in placing an adhesive item (e.g. a tape) on the winding to hold the tail against the outside surface of the last turn.

The drawback of that technique is that it leads to local extra thickness which, during the subsequent operation of pressing the assembly flat, leads to a localized increase of pressure in the vicinity of the adhesive item. This local increase produces local stress in the turns which can generate quality defects: in particular lack of uniformity in the winding, rapid aging, and creep in the electrolyte layer which can lead to short circuits in this location.

Furthermore, the adhesive used for the adhesive item can turn out to be highly polluting, electrochemically speaking, on the resulting storage assembly.

Another possible technique consists in applying the adhesive directly to the winding, e.g. by spraying it on.

Nevertheless, that technique presents the same drawback as the preceding technique, concerning defects due to the resulting extra thickness or to the assembly being polluted.

In addition, when making the assemblies automatically, the use of an adhesive requires setting time and that can slow down the rate at which energy storage assemblies are fabricated.

"Quick-setting" adhesives do indeed exist, of the cyanoacrylate type. Nevertheless, it should be observed that those adhesives do not work in an anhydrous atmosphere.

Unfortunately, in the context of an automatic machine for making energy storage assemblies, the machine needs to be placed in an anhydrous environment, such as a small-sized anhydrous room.

That is why both of the above techniques appear a priori to be ill-suited to automatically fabricating energy storage assemblies in the form of multilayer windings, and in particular to form flat cells.

In this context, an auxiliary object of the invention is to enable multilayer electric energy storage assemblies to be fabricated automatically and continuously by using a suitable end-of-winding adhesive device.

To this end, the invention provides a device for making energy storage assemblies, the device comprising drive means for driving a laminated sheet, winder means for winding the laminated sheet, and cutter means for sectioning the laminated sheet at the end of winding, the device being characterized in that if further comprises heater means for heating the laminated sheet and presser means for pressing the end-of-winding end of the sheet against the surface of the wound assembly so that the winding end adheres to said surface.

This device enables the winding tails to be fastened in a manner that is simple, by heat-sealing and without requiring any additional adhesive substance that might run the risk of polluting or degrading the final electrochemical assembly.

In a first embodiment of the invention, the heater means may include means for maintaining an ambient temperature in a compartment that includes the device for making energy storage assemblies.

In another embodiment of the invention, the heater means comprise localized heater means for heating a portion of the sheet, said heater means being disposed immediately upstream from the winder means on the path of the laminated sheet.

In this embodiment, the heater means are disposed to heat a portion of the laminated sheet close to the section end of the film so that it adheres to the wound assembly while being pressed.

Preferably, the heater means are suitable for being activated continuously or sequentially so as to avoid overheating the portion of sheet.

This characteristic is particularly advantageous when localized heater means are used.

The heater means are hot air blower means, for example.

Still more precisely and preferably, the heater means comprise a heater block constituted by a retractable bar 562 of copper alloy positioned facing the roller 570 immediately downstream from the cutter device 550 and upstream from the mandrel 610. This retractable bar 562 has a multitude of orifices connected via ducts fitted with solenoid valves to means for injecting air under pressure.

The copper alloy bar is permanently maintained at a heating temperature by regulator means. By way of example, this temperature is of the order of 300 degrees Celsius (° C.) and it depends on the nature of the polymer layers 10, 20, 30, 40, 50, and 60 to be heated. This heating temperature is selected so as to obtain a temperature of about 120° C. at the surface of the sheet and to recreate an adhesive effect between the layers.

The retractable bar 562 is mounted on a telescopic device driven by a rod-less pneumatic actuator.

There follows a description of the adhesive bonding step at the end of winding.

While making a winding, the telescopic device is retracted so that the bar 562 is at a distance from the surface of the laminated sheet, in a standby position.

When the number of winding turns is sufficient, the rotation of the mandrel is stopped and the various drive rollers are controlled to act as brakes so that the strip of film is prevented from moving (see FIG. 61). The retractable presser roller 580 is moved to bear against the winding. Immediately prior to the operation of the cutter module 550 completely sectioning the laminated sheet, the telescopic device is deployed and the bar 562 is positioned close to the surface of the laminated sheet.

At this moment, the solenoid valve is opened so that air under pressure blows through the orifices 562 of the bar. The air jets escaping from the orifices in the bar are heated by the body of the bar. The air jets are directed in a direction that is slightly oblique relative to the surface of the laminated strip, sloping towards the cutting zone.

This characteristic serves advantageously to avoid overheating the laminate where it contains a layer of lithium. The air jets heat a portion of the laminate that is to be sectioned, i.e. that does not have any lithium (see FIG. 21).

The heater means do not require mechanical contact between the layers of the laminate and the heater block. They act by convection from the blown hot air. This avoids the layers melting and prevents them being transferred onto the heater block.

At the end of a given length of time, once the heating operation has terminated, the heater block 562 is retracted by shortening the telescopic device, and simultaneously the cutter module 550 sections the laminated strip transversely (see FIG. 62).

Thereafter, the mandrel 610 is again caused to rotate to continue winding the end of the sheet. The presser roller 580 bearing against the mandrel presses down the tail of the winding against the assembly as wound in this way, thus finalizing heat-sealing of the tail of the winding.

The guide roller 570 may also be a heater roller. For example it may be continuously maintained at a temperature of about 110° C. During the interruption in the travel of the laminated strip, the portion of the laminate in contact with this roller becomes heated across its entire thickness to a temperature of 110° C. This heating is sufficient to ensure that the tail of the winding is indeed bonded.

Under such circumstances, the guide roller 570 should be adjusted in position relative to the strip of laminate. In particular, it should not overlap either of the electrolyte layers 30 and 50 where they project in order to avoid sticking these layers to the roller and subsequently tearing them.

Finally, the heater block 562 could be replaced by any other heater element, such as an oven similar to the heater modules 130 and 330, or filament or infrared heater resistances, etc.

The mandrel 610 continues to rotate through an additional turn so that the satellite roller finishes off pressing down the last wound turn. During about 100° of rotation during this last turn, the presser roller 580 and the presser roller 620 are both active simultaneously. The retractable presser roller 580 is retracted once the mandrel has gone past the horizontal position by about 30°, after the winding tail has been pressed down fully against the winding.

It should be observed that the temperature to which the heater element is heated is considerably higher than the temperature at which the layers are multiplexed which is about 40° C. to 80° C. This temperature guarantees bonding that is reliable and repeatable on an industrial scale.

Action may optionally be taken on heating parameters of the heater element: temperature of the block, injected air flow rate, length of time the air is blown against the laminated strip, etc., in order to obtain an effect that is more or less adhesive.

Optionally, the retractable presser roller 580 may also be a heater roller. This characteristic enables different temperatures to be used for the heater block 562 and the presser roller 580 so as to cause the temperature of the laminate sheet to increase progressively. This avoids inducing excessive stresses in the laminate. For example, the heater block 562 may be maintained at a temperature of 200° C., causing the surface of the sheet to be heated to a temperature of about 120° C., while the presser roller 580 is maintained at a temperature of 200° C.

There follows a description of the winder means E in accordance with the invention.

These means comprise mainly a mandrel 610 mounted to turn about an axis 611.

The mandrel 610 presents a right cross-section transverse to its axis of rotation 611 that is not circularly symmetrical. The mandrel 610 is substantially flat. It has a tapering section of shape somewhat like a time zone. Typically, the ratio between a major axis and a minor axis of its right section is greater than 3, preferably greater than 5, and most advantageously greater than 10. Advantageously, its right section is generally elliptical.

More precisely, the outer envelope of the mandrel 610 is preferably defined by two convex sectors of a circular cylinder, the sectors having identical radii (R1 in FIG. 2), but parallel axes that are far apart; furthermore, this outer envelope defining the right section of the mandrel has rounded ends 615 and 616 of small radius.

The length of the mandrel 610 (taken parallel to its axis of rotation 611) is greater than the width of the laminates for winding.

Still more precisely, and preferably, the mandrel 610 is made up of two symmetrical and complementary jaws 612 and 614. The interface between the two jaws 612 and 614, i.e. their mutual bearing face in the winding position and referenced 613 in the figures, is preferably plane and interconnects the two curved outer envelope surfaces of the mandrel at a distance from the tapering ends of the ellipse of the outer envelope.

By way of non-limiting example, the major axis of the mandrel 610 formed by the two touching jaws 612 and 614 is about 12 centimeters (cm) while the minor axis of the mandrel 610, formed by the two touching jaws 612 and 614 is about 9 mm to 10 mm, the angle formed between the oblique plane corresponding to the interface 613 between the two jaws 612 and 614 and the major axis of the timezone-shape is typically about 2.5°, with the timezone-shape being terminated at the ends 615, 616 of its major axis by circular arcs having a radius of about 0.15 mm, with the distance between the centers of the main cylindrical surfaces of the mandrel being greater than six times their radius R1.

The two jaws 612 and 614 are associated with drive means, e.g. hydraulic actuators or the equivalent, that are adapted to cause the two jaws to move relative to each other between a first position in which the two jaws 612 and 614 are spaced apart so as to allow the leading end of a laminated stack 10 to 60 for winding to be inserted, and a second position in which the two jaws 612 and 614 are touching so as to enable the above-mentioned laminated stack to be wound.

The mandrel 610 formed by the two co-operating jaws 612 and 614 is itself rotated about its axis 611 at a speed that is not constant, in a manner that is described below.

The mandrel 610 is associated with a presser roller 620.

This roller is mounted free to rotate about its axis 622 on the end of a rotary arm 624.

The arm 624 is driven in rotation about an axis 625 that is offset from the axis 622, and it is driven at a speed that is twice that of the mandrel 610 so that the roller 620 rolls in succession over each of the faces of the mandrel 610, and more precisely over the laminated stack 10 to 60 being wound thereon, so as to press it down regularly and prevent any folds forming in the stack. The arm 624 is preferably driven mechanically by the rotation of the mandrel 610 with a velocity ratio of 2.

The mandrel 610 and the arm 624 rotate in the same direction of rotation.

The dynamics of the displacement of the mandrel 610 and of the roller 620 are shown diagrammatically in accompanying FIGS. 3 to 6.

By way of non-limiting example, and as shown in FIG. 22, the mandrel 610 and the arm 624 may be driven by a common belt 640 associated with a motor 642 via respective sprocket wheels 618 and 628 engaging with said common belt 640. In order to ensure that the arm 624 rotates at twice the speed, the sprocket wheel 628 associated therewith possesses a drive ratio that is half that of the sprocket wheel 618 associated with the mandrel 610, i.e. typically its circumference is half that of the other roller.

It should be observed that the device preferably further comprises a roller 570 downstream from the cutter blade 552 facing the hot air blow nozzle 562.

This roller 570 provides final guidance to the laminate has been formed prior to winding onto the mandrel 610.

The generator line of the roller 570 against which the laminate presses is situated in a plane defined by the generator line of the upstream roller 534 and the generator line of the mandrel 610 corresponding to its minor axis (which generator line has the laminate pressing thereagainst when the mandrel is placed with its major axis parallel to the above-mentioned plane, as shown in FIG. 5).

The assembly formed by the mandrel 610, the arm 624, and the presser roller 622 in combination is mounted on a slider 630, itself associated with drive means suitable for moving this assembly in translation between a winding position as shown in FIG. 1, close to the module 500, and a discharge position remote from the module 500, once the desired length of stack has been wound onto the mandrel 610 in order to facilitate removal of the resulting winding.

The above-mentioned slider 630 may also be movable into an additional temporary initial position close to the feed pinch rollers 532 & 534 while they are acting as drive rollers in order to take hold of the leading end of the laminate at the beginning of winding. Once the laminate has been gripped, the slider 630 is preferably moved away from the pinch rollers 532 & 534 in order to perform winding proper.

To finish off winding and ensure that the outer tail end of the wound laminate does not flap, the mandrel 610 is preferably driven to rotate through a complete 360° after the wound laminate has been sectioned and said laminate has been fully wound, with the presser roller 620 being maintained pressed against the winding during this additional rotation in order to finish off the bonding of the last turn of the winding by virtue of the above-mentioned preheating performed by the means 560. Where appropriate, this heating may be accompanied by hot air being blown into the winder station E.

This causes the tail of the winding to be adhesively bonded without any need to provide adhesive.

It should be observed, as shown in FIG. 8, that the device may further comprise an additional presser roller 580 that is retractable, being placed between the roller 570 and the mandrel 610. The function of such a roller 580 is to enable the laminate to be held stationary while it is being cut and the end of the strip is being pressed down on the mandrel 610. The roller 580 is preferably connected via a string blade 582 to oscillating equipment 584 controlled by an actuator 586.

While the laminate is being wound on the mandrel 610, the roller 580 is placed in the position shown in FIG. 8 where it is off the path followed by the moving laminate and it is remote from the mandrel 610. At the end of winding, after the laminate has been cut, the above-mentioned oscillating equipment and the associated roller 580 are moved so that the roller 580 comes, on the contrary, to be pressed against the face of the roller 610 opposite from the face against which the roller 620 bears.

This winding, which is obtained in a generally flat shape due to the elliptical shape of the mandrel 610, is subsequently removed from the mandrel 610 and taken by a robot or any suitable equivalent means to a presser station 700 for making each resulting winding even flatter.

Such a robot may be constituted by a pneumatic robot having clamps for taking hold of the electric energy storage cell wound on the mandrel 610, for extracting the cell from the mandrel, and for performing various movements in rotation and translation to put the cell in the presser station 700.

Essentially, the presser station comprises a press, e.g. formed by a presser actuator 710 serving to perform final flattening of the cell. This press preferably operates on a finished cell, in parallel with a following cell being wound.

In order to make it easier to remove the resulting winding, the device may include means suitable for acting during a limited sequence at the end of winding to impart relative reciprocating displacement in translation between the two jaws 612 and 614 constituting the mandrel 610 in a direction parallel to the interface 613 so as to vary the length of the major axis of the mandrel and thus slightly "loosen" the winding relative to the mandrel 610, unsticking the first turn, and releasing the pinch on the leading end.

Each winding is subsequently directed to a magazine for performing the subsequent steps required for making connections in the desired series and/or parallel configuration. Such a magazine and the means implemented for providing the required series and/or parallel connections are not described in greater detail below.

As mentioned above, according to an advantageous characteristic of the invention, the mandrel 610 is rotated at an angular speed that is not constant and that is controlled in such a manner that the linear travel speed of the laminated stack feeding the mandrel 610 is constant.

By means of this characteristic, the invention makes it possible to guarantee a constant traction force on the laminate, and consequently good winding thereof on the mandrel 610 without any wrinkles or equivalent defects.

Furthermore, because the laminate is traveling at constant speed, there is no need to have an intermediate magazine upstream from the winder module E in order to absorb the accelerations and decelerations of the strip. This enables the entire device to be made in compact form so that it occupies a limited volume.

In FIG. 27, bold lines plot the curve of speed variation of the mandrel 610 at the beginning of winding.

The same FIG. 27 has fine lines showing the curve of speed variation of the arm 624 carrying the presser roller 620.

It should be observed that in FIG. 27 the relative positions of the mandrel 610 and of the pressure roller 620 are shown below the abscissa axis.

Still more precisely, the angular speed of rotation of the mandrel 610 is corrected during winding in order to take account of the changing radius of the winding as the result of the increasing thickness of laminate that has accumulated on the mandrel 610 in such a manner as to guarantee that the laminate travels at a constant linear speed.

Thus, FIG. 28 has a bold line plotting the curve of speed variation for the mandrel 610 when carrying laminate at a thickness of 5.5 mm (e.g. corresponding to 19 winding turns), and fine lines plot the corresponding curve for variation in the speed of the roller 620.

Beneath the abscissa axis, reference PA in both FIGS. 27 and 28 identifies the ranges of angles in which the presser roller 620 presses against the mandrel 610.

On examining FIGS. 27 and 28, it can be seen that the speed of rotation of the mandrel 610 and of the equipment 624 carrying the presser roller 620 is high when the laminate is being wound on a small radius (i.e. a winding radius of the same order of magnitude as the minor axis of the mandrel 610), i.e. when the mandrel 610 extends substantially parallel to the segment of laminate being delivered. This speed then drops when the winding radius increases (and comes close to the major axis of the mandrel 610), i.e. when the mandrel 610 is extends substantially perpendicularly to the feed segment of laminate.

Thus, the speed of rotation of the mandrel 610 and of the presser roller 620 varies cyclically: there are two peaks per 360° revolution. This variation is inversely proportional to variation in winding radius.

It should also be observed that the presser roller 620 comes into contact and remains in contact with the laminated sheet wound on the mandrel 610 while it is being rotated at slow speed. This disposition ensures that good contact is guaranteed between the presser roller 620 and the wound sheet, and consequently between the various superposed layers of the wound sheet.

FIG. 28 corresponds to the end of a winding operation and shows speed varying over a smaller range. Because of the thickness of the laminate accumulated on the mandrel 610, the winding radius ratio covers a range that is smaller than at the beginning of winding.

Thus, while a cell is being wound, the speed of rotation varies on each revolution over a period of 180°. In addition, the time required to wind a turn increases because the length of the winding on the mandrel 610 increases from one turn to the next by the thickness that has been added to the mandrel 610.

Consequently, speeds and accelerations decrease progressively as winding progresses.

Furthermore, in FIG. 29, there can be seen firstly a smoothed curve V1 showing variation in winding radius as a function of the angular position of the mandrel, and secondly a smoothed curve V2 showing variations in a correction factor as a function of said angular position.

The abscissa axis covers an angular range of 0 to 180°. It also covers the range 180° to 360°, since the above-mentioned curves present periodicity over 180°. Furthermore, the ordinate axis on the left gives the amplitude of the winding radius, and the ordinate axis on the right gives the amplitude of the correction factor.

The inventors have determined that, in order to take account of variation in the thickness of the winding, the correction factor that needs to be applied to the basic variation V1 in the speed of angular variation based solely on variation in the bare winding radius as a function of the angular position of the mandrel, can be implemented in the form of such a smoothed curve V2 that varies as a function of the angular position of the mandrel 610, while being unvarying for any given angle regardless of the number of turns that have already been wound on the mandrel.

FIG. 30 is a table giving an example of data used in the context of the present invention for controlling the motor driving the mandrel 610.

The first two columns of the table in FIG. 30 give the angle of rotation of the mandrel.

These two columns correspond respectively to angle ranges 0 to 180° and 180° to 360°, given the symmetry that exists between two successive half-turns of a single winding turn. A complete turn is wound only after rotation through 360°. When winding any one turn, the same thickness is thus to be found on both faces of the mandrel during each of two successive half-periods of 0 to 180° and 180° to 360°.

The third column in FIG. 30 gives the radius of the bare mandrel 610, i.e. its radius at the beginning of winding.

The fourth column of FIG. 30 gives the correction factor shown in FIG. 29.

The following pairs of columns in FIG. 30 apply to successive winding turns, and for each turn, one column gives the winding radius, and the other the speed of rotation of the mandrel 610.

More precisely, as can be seen in the table of FIG. 30, for each winding turn, the winding radius r is calculated on the basis of the relationship:

$$r = r_0 + (F \cdot n \cdot e)$$

in which:
  $r_0$ represents the radius of the bare mandrel 610;
  F represents the correction factor given in column 4;
  n represents the number of the current turn, i.e. the number of turns that have been wound onto the mandrel 610; and
  e represents the thickness of the laminate being wound on the mandrel 610.

The speed of rotation of the mandrel 610 is then calculated on the basis of the following relationship:

$$\omega = V/(2 \cdot \pi \cdot r)$$

in which:
  V represents the desired constant linear speed for the laminate; and
  r represents the above-calculated winding radius.

In practice, the motor driving the mandrel 610 can be controlled either on the basis of data that has been precalculated and stored in an appropriate memory, or else on the basis of data being calculated directly by a central unit (comprising a microprocessor and associated memory means) on the basis firstly of the relationship for variation in the winding radius as a function of the shape of the mandrel 610, and secondly on the basis of the correction relationship that depends on the way said radius varies as a function of the thickness of the winding already wound on the mandrel.

The data given above is applied successively to each angular fraction of the rotation of the mandrel 610 so as to control its drive motor.

By way of non-limiting example, for a linear speed of the order of 6 meters per minute (m/min), the mandrel 610 reaches a speed of about 180 revolutions per minute (rpm), i.e. an angular speed of about 1090 degrees per second (°/s), giving a sampling speed of about 1 degree per millisecond (°/ms).

The decision to operate with precision of one degree means that the reference speed for the motor needs to be refreshed about once every millisecond.

In this context, the motor is selected to accept application of a speed reference that is digital, so as to avoid handling analog/digital conversions.

Naturally, a control module provides full servo-control of the means involved in winding the laminate.

The various axes mentioned above, and in particular the axes 102, 202, 302, of the rollers 104, 204, 304, the axis of rotation 611 of the mandrel 610, the axis of rotation of the presser roller 620 and the pivot axis of the oscillating arm 624, the axes of the rollers 124, 224, 240, 250, 229, 320, 520, and 522 associated with the films, the axes of the deflector rollers 110, 112, 114, 221, 222, 210, 212, 226, 310, 312, 314, and the axes of the presser rollers 262, 264, 400, 410 are mutually parallel and preferably horizontal.

According to another advantageous characteristic of the invention, the device comprises a case that is split into two compartments separated by a vertical partition 900: a first compartment under a controlled dry atmosphere houses all of the above-described means 100, 200, 300, 400, 500, 600, and 700, while a second compartment houses the associated control and motor drive means. The above-mentioned vertical separating partition constitutes the support frame for the various axes of rotation described above.

Where appropriate, an additional stream of dry air can be provided in the operational enclosure.

The present invention typically enables a laminate to be wound to have 16 to 19 turns, corresponding to a segment of laminate having a length of about 4 meters (m) to 5.5 m, giving the winding a total thickness of about 5.5 mm. The travel speed of the laminate typically lies in the range 2 m/min to 10 m/min. It is advantageously about 6 m/min.

By way of non-limiting example, the device in accordance with the present invention is adapted to process laminate strips of width lying in the range 50 mm to 150 mm.

The present invention offers numerous advantages compared with the means proposed in the state of the art.

In non-limiting manner, mention can be made to the following:
  the fact that the winding mandrel 610 is almost flat in shape avoids generating the stresses encountered in the prior art while flattening;
  by heating laminates in ovens and by laminating the multilayer sheets forming cathodes and collectors on the lithium, it is possible to achieve high quality bonding without any handling of intermediate products, while optimizing surface contact between the various layers, thereby improving ion exchange between the various layers in operation in the final product; and
  the fact that all of the functions of the device are controlled automatically with precise settings and parameters for each function ensures that the device performs reproducibly with quality always being under control.

In general, all of the wheels and winding or unwinding rollers used in the device of the invention perform driving and/or braking functions in alternation, depending on the winding sequence involved, so as to guarantee constant traction on all of the associated sheets, laminates, and films.

As mentioned above, FIG. 33 is an overall diagram of the main means of the device in accordance with the present invention.

As mentioned above, the device in accordance with the present invention includes mechanical means suitable, on command, for modifying the right section of the mandrel 610.

Modification to the section of the mandrel 610 can be used in particular for pinching an end of the sheets to be wound at the beginning of winding, and/or for generally loosening the winding, i.e. establishing a certain amount of clearance between the winding and the outside surface of the mandrel 610 in- order to make it easier to remove the winding. This function can be achieved, for example, by a controlled reduction in the length of the major axis of the mandrel 610.

There follows a more particular description of the means specific to the present invention for modifying the right section of the mandrel 610 on command when the mandrel comprises two complementary jaws 612 and 614.

The above-mentioned means are designed to control relative displacement of the two jaws 612 and 614 along at least one component extending transversely to the axis of rotation 611 of the mandrel 610.

Each jaw 612 and 614 is secured to a respective jaw carrier 652, 654. Each of these is rigidly secured to a shaft 653, 655 mounted to rotate on a mandrel body 660 about a respective axis 656, 657, that is eccentric relative to the axis of rotation 611 of the mandrel 610, but parallel thereto. More precisely, the shafts 653 and 655 are mounted to turn on a plate 661 belonging to the mandrel body 660.

The person skilled in the art will understand that turning a shaft 653, 655, and consequently the jaw carrier 652, 654 and the associated jaw 612, 614, relative to the mandrel body 660, leads to the jaw in question being moved relative to the other jaw.

For this purpose, each shaft 653, 655 carries a helically-cut gearwheel 658, 659. By way of non-limiting example, the angle of cut of the gearwheel 658, 659 may be about 17°.

The gearwheels 658, 659 connected to the jaw carriers 652, 654 are driven angularly by two respective control half-shafts 670, 680.

These may be embodied in various different ways.

They are preferably as shown in FIGS. 35 to 40.

In these figures, there can be seen two half-shafts 670 and 680 that are generally symmetrical about a longitudinal axial plane containing their common axis of rotation, which coincides with the axis 611 of rotation of the mandrel 610.

The half-shafts 670, 680 are juxtaposed and disposed in a sheath 662 connected to the mandrel body 660. They are designed to be moved in translation, parallel to their axes, by means described below.

The sheath 662 acts as a spindle for guiding the mandrel body 660 in rotation about the axis 611.

Each half-shaft 670, 680, includes at one end, a segment that has a helical gear 672, 682 cut therein suitable for meshing with the shafted gearwheels 658, 659.

Each half-shaft 670, 680 also has a segment 674, 684 of non-circular section, e.g. of triangular section (the two adjacent triangles 674, 684 of the two half-shafts 670, 680 together form a square) disposed in a segment of complementary section of the sheath 662. The engagement as defined in this way prevents any relative rotation between the half-shafts 670, 680 and the sheath 662, but allows and guides relative axial displacement therebetween.

At their second ends, the half-shafts 670 and 680 carry respective enlarged heads 676, 686 each in the form of half a disk. It is shown below that each of these heads 676, 686 preferably carries means for adjusting resilient members that urge the half-shafts towards a rest position. For this purpose, each head has a plurality of housings 679, 689, e.g. three per head, that are uniformly distributed angularly.

More preferably, each half-shaft 670, 680 further comprises, firstly, on the side of the head 676, 686 facing towards the gear 672, 682, a circularly cylindrical segment 675, 685 for guidance in translation, and secondly, on the opposite side of the head 676, 686, a tail 677, 687 projecting beyond the head 676, 686.

The two half-shafts 670, 680 can move in translation relative to each other so as to allow the jaws 612 and 614 to be inclined relative to each other. For this purpose, sliding shoes are preferably interposed between the two half-shafts 670, 680 in slots 671, 673 that are provided for this purpose in the interface between the half-shafts 670, 680.

The tails 677, 687 of the half-shafts 670, 680 are urged selectively into a plurality of positions selected by mechanical means 800 that are described below with reference to FIGS. 41, 42, 43, and 53.

It should be observed that each of the two jaw carriers 652, 654 can be moved independently of the other. The same therefore applies to the two half-shafts 670, 680 which are independent of each other so as to enable the movements between the two jaws 612 and 614 to be non-synchronized. Such non-synchronization is necessary in particular in order to pinch or take hold of the new end of a strip when beginning a winding operation.

The spindle constituted by the above-mentioned sheath 662 is rotatably mounted on a bearing 634 associated with the slider 630 and fitted with two ball bearings 635 and 636. At its rear end opposite from the mandrel 610, the spindle 662 carriers a sprocket wheel 618 (shown in FIG. 22) that co-operates with the driving cog belt 640.

The sprocket wheel 618 has as many recesses 619 as there are housings 679, 689 formed in the heads 676, 686 of the half-shafts 670, 680.

In the non-limiting example, six recesses 619 are provided respectively in alignment with the housings 679, 689.

Each housing 619 houses a compression spring 690. The springs 690 are thus interspersed between the sprocket wheel 618 and the heads 676, 686 of the half-shafts 670, 680. The springs 690 consequently urge the half-shafts 670, 680 away from the jaw carriers 652, 654. In other words, the springs 690 automatically urge the jaws 612, 614 towards a closed position. Mechanical means 800 described in greater detail below with reference to FIGS. 41 to 43 and 53 deliver a reverse action on the half-shafts 670, 680. On being activated, these mechanical control means 800 urge the half-shafts 670, 680 towards the jaw carriers 652, 654.

The force exerted by the springs 690 can be adjusted by screws 692 engaged in the housings 679, 689 of the heads 676, 686. Consequently, adjusting the screws 692 enables the pinching force exerted by the jaws 612, 614 to be adjusted.

FIG. 34 shows the presser roller 620 mounted to rotate freely via internal bearing means about its axis 622 on an arm or base 624. Preferably, and as can be seen in FIG. 34, the means for turning the presser roller 620 about its axis 622 are formed by a hinged hub 623 adapted to enable the roller 620 to be positioned automatically in such a manner as to press it closely against the outer surface of the winding. In practice, the hinged hub 623 may be constituted by two close-together bearings positioned in the center (measured in the longitudinal direction) of the roller 620 allowing the roller 620 to rock angularly to some extent.

The arm 624 is itself mounted to rotate about an axis 625' parallel to the above-mentioned axis 622 and eccentric relative thereto. More precisely, the arm 624 is mounted to rotate about the axis 625' on an element 693. This forms a small carriage that is movable relative to the slider or main carriage 630 in order to compensate for variations in the thickness of the winding on the mandrel 610 between the first turn and the last.

Various means may be provided for driving the arm 624 in rotation about the axis 625'. It should be recalled that the arm 624 is preferably driven at a speed of rotation that is twice that of the mandrel 610.

In the particular and non-limiting embodiment shown in the accompanying figures, the arm 624 is secured to a shaft 694 centered on the axis 625' and mounted to rotate on the above-mentioned small carrier 693.

A second shaft 695 carrying the sprocket wheel 628 for co-operating with the drive belt 640 shown in FIG. 22 is mounted to rotate about the axis 625 on a spacer associated with the slider 630.

Furthermore, a constant velocity coupling 696 is interposed between the outlet of the drive shaft 695 and the inlet of the driven shaft 694 itself connected to the arm 624.

The function of the constant velocity coupling 696 is to allow the shaft 694 to move parallel to itself relative to the shaft 695 as the thickness of the winding on the mandrel 610 increases, while continuously maintaining an accurate connection in rotation between the driving shaft 695 and the driven shaft 694.

Displacement of the small carriage 693 relative to the main slider 630 is controlled by any suitable means, preferably an actuator 644. The body of the actuator 644 is hinged at 645 to the slider 630. Its rod 646 is hinged to a first end of a bell-crank 647. The second end of the bell-crank 647 is hinged to the carriage 693. The middle of the bell-crank 647 is hinged to a link 648 that is also mounted to pivot on the slider 630.

Thus, the presser roller 620 is pressed against the winding on the mandrel 610 by co-operation between the small carriage 693 and the actuator 644. By way of non-limiting example, during the displacement of the roller on the sheet being wound, the travel stroke of the small carriage 693 relative to the slider 630, and consequently relative to the axis of rotation 611 of the mandrel 610, can be about 3 mm for the first turn and about 8.5 mm on the finished winding. This difference in stroke between the original position with the bare mandrel and its position carrying a finished winding is thus compensated by the stroke in translation of the actuator 644 and of the small carriage 693.

Typically, but by way of non-limiting example, the constant velocity coupling 696 is designed to permit a radial offset of about 25 mm between the parallel axes 625 and 625' of the shafts 695 and 694 so as to be able to implement the working stroke of the radial movement of the satellite presser roller 620 towards the mandrel 610.

To sum up, the sprocket wheel 628 transmits rotation to the driven shaft 694 via the constant velocity coupling 696. The shaft 694 transmits its rotation to the arm 264 which itself carries the central bearing of the satellite roller 620. The bearing of this roller is fitted with a rocker system about the axis 622 to allow the roller 620 to align itself automatically against the turns while winding is taking place.

Furthermore, the satellite presser roller 620 is carried by the small carriage 693 on board the slider 630 of the mandrel. Because of the 1:2 ratio between the sprocket wheels 628 and 618, the arm 624 and the accompanying presser roller 620 turn twice as fast as the mandrel 610, thus enabling the presser roller 620 to press against the winding on each half-turn of the mandrel.

The back-and-forth movement of the satellite roller 620 relative to the mandrel 610 is achieved by the bell-crank 647 and the double-acting pneumatic actuator 644.

To sum up:
- the slider 630 can move in horizontal translation relative to the frame of the machine and to the roller 570 between a position where it is close to the roller 570 in order to take hold of the beginning of a winding, and a position that is remote therefrom in order to enable winding to be performed. The slider carries the mandrel body 660, the mandrel 610, the half-shafts 670 and 680, the presser roller 620, and the means connected thereto;
- more precisely, the presser roller 620 is mounted via the rotary arm 624 on a carriage 693 which is itself capable of moving in translation relative to the slider 630;
- the mandrel body 660 carries the mandrel jaw carriers 652, 654 which in turn carry the jaws 612, 614. The mandrel body 660 is mounted to rotate about the axis 611 on the slider 630 and is driven by the sprocket wheel 618;
- the jaw carriers 652, 654, and consequently the jaws themselves 612, 614 associated therewith are rotatably mounted about respective axes 656, 657 on the body 660;

finally, the half-shafts 670, 680 are mounted to move in translation in the body 660. Movement in translation of each half-shaft 670, 680 relative to the mandrel body 660 leads via the co-operation defined between the helical threads provided on the gearwheels 658, 659, and the gears 672, 682 to the jaw carriers 652, 654 turning, and consequently to the jaws 670, 680 which are connected thereto turning relative to the mandrel body 660, and thus to the jaws 612, 614 moving relative to each other.

There follows a description of the structure of the mechanical control means 800 shown in FIGS. 41, 42, 43, and 53, designed to ensure controlled displacement of the half-shafts 670, 680.

The function of the means 800 is to define a plurality of precise relative positions for the half-shafts 670, 680, and consequently for the jaws 612, 614.

The means 800 are preferably designed to ensure four precise relative working positions of the jaws 612, 614, in addition to a rest position. These various positions and the means implemented for obtaining them are described below with reference to FIGS. 51, 52, and 53.

Still more precisely, the mechanical control means 800 are designed to control each half-shaft 670, 680 individually, and consequently to control each jaw 612, 614 individually.

The mechanical means 800 are preferably adapted to produce sequentially either a relative inclination between the two jaws 612, 614, e.g. in order to open and close them when taking hold of a strip for winding and when releasing a winding, or else a parallel relative displacement between the two jaws 612, 614 so as to change the lengths of the major axis and of the minor axis of the mandrel (to make it bulge) during a final sequence of extracting a winding.

In order to produce a relative inclination between the two jaws 612, 614, the control means 800 are designed to produce relative displacement in translation between the two half-shafts 670, 680.

Various means may be provided for this purpose.

In the preferred embodiment of the invention, the two half-shafts 670, 680 are of different lengths, more precisely, the respective tails 677 and 687 of the two half-shafts 670 and 680 that emerge from the back of the heads 676, 686 are preferably of different lengths, as can be seen in FIG. 35.

The person skilled in the art will understand that acting on the longer tail 677 of the half-shaft 670 while not acting on the half-shaft 680 will lead to only the jaw carrier 650 turning, and consequently to only the jaw 612 turning relative to the body 660. This can be driven using an actuator 810, having its rod 812 placed facing the half-shaft 670.

In contrast, in order to achieve relative displacement of the two jaws 612, 614 while keeping them in a mutually parallel position, the mechanical control means 800 must move both half-shafts 670, 680 over identical strokes.

Various means may be provided for this purpose.

In the embodiment shown in the accompanying figures, the means 800 comprise for this purpose a rocker 820 or hinged pusher mounted to pivot on the slider 630 about an axis 822. The rocker 820 is itself driven by three levers 830, 840, and 850 hinged to the slider 630 about an axis parallel to the axis 822, and preferably coinciding therewith. Each lever 830, 840, 850 is itself driven via a respective clevis-type connection 832, 842, 852 by the rod of a respective actuator 834, 844, 854 associated therewith.

Springs urge the levers 830, 840, 850 towards a rest position in which the rocker 820 does not act on the half-shafts 870, 880. In contrast, the actuators 834, 844, 854 urge the levers 830, 840, 850 in the direction for causing the rocker 820 to move towards the half-shafts 870, 880. The rocker 820 is itself capable of moving relative to each of the levers 830, 840, 850 so that the working position of the rocker 820 is defined by that one of the three levers 830, 840, and 850 that has moved over the greatest stroke.

Still more precisely, as shown in the accompanying figures, two long side levers 830 and 850 are preferably provided on either side of a shorter central lever 840.

The rocker 820 could bear against the heads 676, 686 of the half-shafts 670, 680 directly. However, it is preferable to provide a ring 860 (see FIG. 41) that is interposed between the rocker 820 and the rear faces of the heads 676, 686. The ring 860 surrounds the tail 677, 687.

Thus, two independent controls are defined for the half-shafts 670, 680: one relates to the half-shaft 670 on its own and is driven by the actuator 810, and the other relates to both half-shafts 670, 680 and is driven by the actuators 834, 844, 854 via the levers 830, 840, 850, the rocker 820, and the ring 860.

The general operation of the mandrel is described below with reference to accompanying FIGS. 44 et seq.

Naturally, this description is given purely by way of non-limiting example.

The beginning of a strip for winding is pinched by moving the two jaws 612, 614 against each other. This pinching is performed by the above-mentioned jaw carriers 652, 654 themselves being turned angularly by the shafted gearwheels 658, 659, themselves caused to turn by the two half-shafts 670, 680 being moved in axial translation. This axial translation is caused by the adjustable loading of the six above-mentioned springs 690.

Still more precisely, the strip is gripped and the jaws 612, 614 are closed by performing the movements shown in FIGS. 44A to 44F.

Originally, the jaws 612, 614 are indexed in a position shown in FIG. 44A so as to be symmetrical relative to the strip. The slider 630 carrying the mandrel is approached to the outlet for strip coming from the guide roller 570.

The rollers 532, 534 are activated to advance the strip towards the jaws 612, 614, e.g. through a distance of about 40 mm, as shown in FIG. 44B.

As shown in FIG. 44C, the jaws 612, 614 are returned to a parallel position by retracting the rod of the actuator 810. It should be observed that the angular position of the mandrel preferably remains identical during the two steps of FIGS. 44A and 44B, but that the mandrel is repositioned angularly in order to pass on to the step shown in FIG. 44C. By way of example, the angular position may be 348° relative to an arbitrary reference in FIGS. 44A and 44B and 351° in FIG. 44C.

Figure 44E:
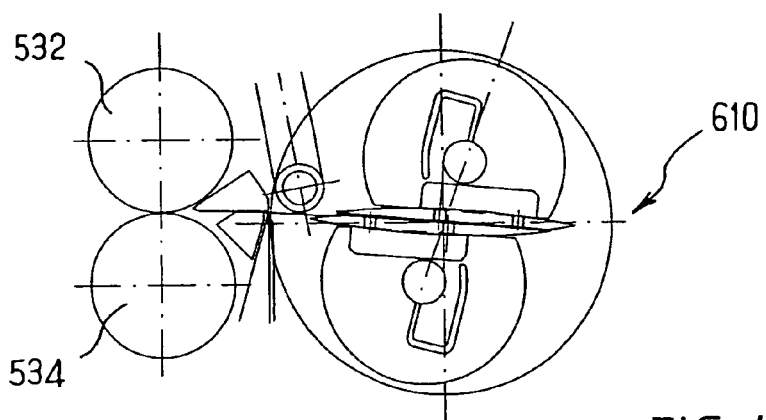
Figure 44F:
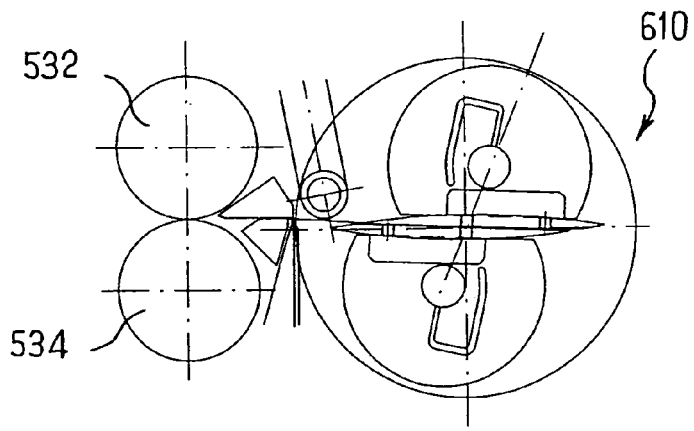

As shown in FIGS. 44D, 44E, and 44F, the jaws 612, 614 are subsequently moved progressively towards each other by successively retracting the rods of the actuators 844, 854, and 834. In this case also, it is preferable to reset the jaws angularly in succession so as to maintain the plane of the interface between the jaws 612, 614 in an optimum position. Relative to the above-mentioned reference, the position in FIG. 44D can be 356°, that of FIG. 44E can be 368°, and that of FIG. 44F can be 0°.

The mandrel is then ready to perform winding in the position shown in FIG. 45 after the slider 630 has been moved away from the guide roller 570.

The mandrel can then be caused to rotate in compliance with the above-described concept for regulating its speed.

During this winding as shown in FIGS. 46, the upstream rollers 532, 534 are preferably put into braking operation in order to hold and apply traction to the strip during winding.

Rotation of the mandrel is continuous until the first fraction of the last turn of the winding as shown in FIG. 47A.

During winding and rotation of the mandrel, as shown in FIGS. 46, the satellite presser roller 620 comes into action when the mandrel is in position 58° and thus enables the presser to come into contact with the winding, and remains in contact up to the position that is symmetrical to the position 58° about the horizontal axis, i.e. over 64°, after which it separates in order to begin again in the same manner for the following half-turn.

During winding, the jaws 612, 614 remain in the clamped position until the winding is being finished off. In this position, the set of two jaws 612, 614 constitute the combined section with the major axis deployed.

FIG. 47A shows the position of the presser roller 620 on the mandrel 610 at the end of the last full turn of winding, prior to the presser roller 620 moving away from the winding.

The last turn as shown in FIGS. 47 preferably begins with a first step which corresponds to a stop in which the mandrel 610 and the two pinch rollers 532, 534 are held in position with the strip under tension. In this position, the presser roller 620 is preferably placed in the low position at 58° at contact with the winding, as shown in FIG. 47B.

Thereafter, the retractable roller 580 is lowered by actuating the actuator 586, as can be seen by comparing FIGS. 47B, 47C, and 47D. In the position shown in FIG. 47D, the retractable roller 580 holds the wound sheet against the mandrel 610. The heat-sealing bar 562 is activated to blow hot air and raise the temperature of the final end of the winding so as to enable it subsequently to be stuck down.

Hot air is preferably blown for a determined length of time. In the step shown in FIG. 47E, the cutter blade 552 is moved by the actuator 556 to cut the terminal end of the winding, as can be seen in FIG. 47F. The blade 552 is then retracted.

Thereafter the mandrel 610 is caused to continue rotating with the roller 580 remaining pressed thereagainst.

Rotation of the mandrel 610 with the roller 580 pressing thereagainst is continued up to a given angular position, e.g. 9°, as shown in FIG. 48, after which the presser roller 580 is raised.

The mandrel preferably continues to rotate over a complete turn so that the satellite roller 620 continues its work of flattening the last turn of the winding until the mandrel reaches a reference angle of 356°. The mandrel is then in a position shown in FIG. 49. A succession of opening and closing cycles is preferably then performed by the jaws 612, 614 in order to separate the first turn of the winding from the outside surface of the mandrel, so as to make the winding easier to extract subsequently. This last step is shown diagrammatically in FIG. 50.

The relative displacement of the two jaws 612, 614 during these alternating opening and closing cycles is driven by axial displacement of the two half-shafts 670, 680 by controlling the actuators 834, 854. When the half-shafts 670, 680 are moved towards the mandrel 610, they drive the shafted gearwheels 658, 659 in rotation together with the jaw carriers 652, 654, and thus the jaws 612, 614 themselves.

Figure 51A:
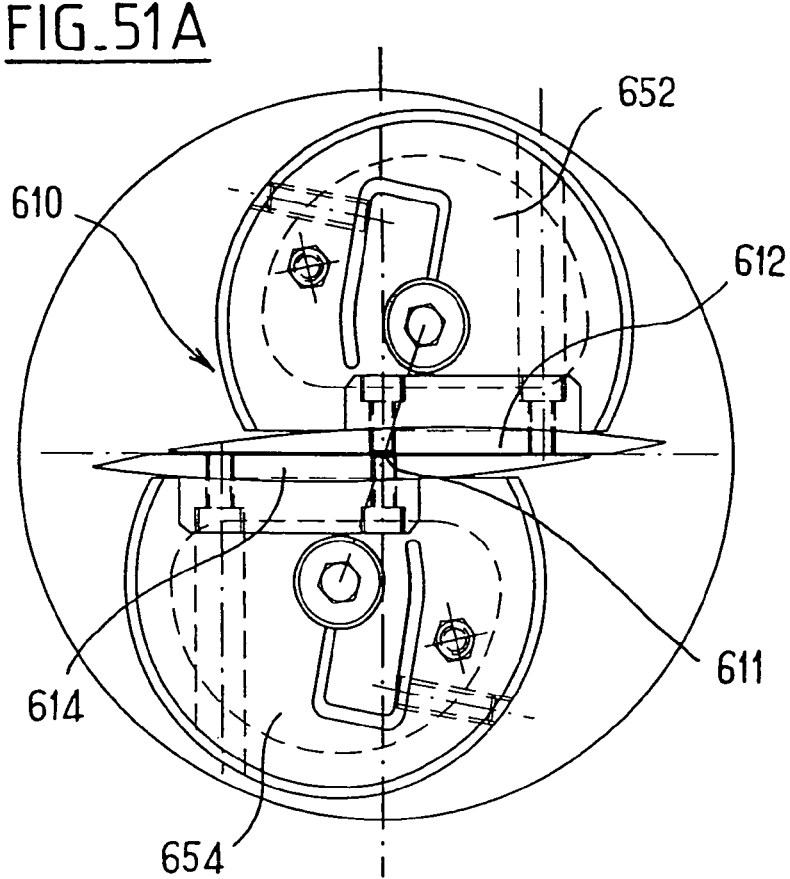
Figure 52A:
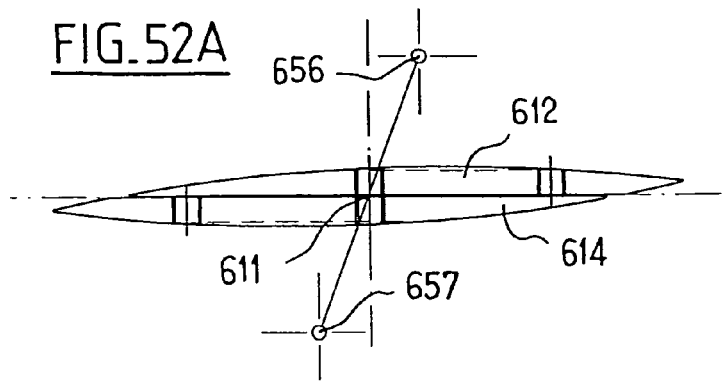
Figure 53A:
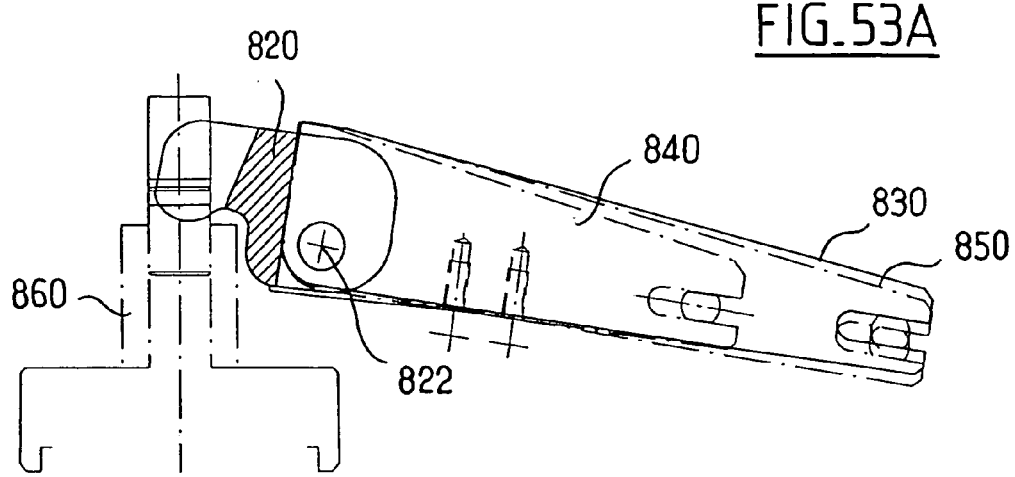

FIGS. 51A, 52A, and 53A show the positions of the jaw carriers 652, 654, of the jaws 612, 614, of the rocker 620, and of the levers 830, 840, and 850 in the rest position. This position in which the two jaws 612 and 614 are touching, is the position used while rotating the mandrel to wind the strip.

Preferably, and as mentioned above, the half-shafts 670, 680 are caused to slide to occupy four additional particular working positions corresponding respectively to the positions shown in FIGS. 51, 52, and 53 when associated with the letters B, C, D, and E respectively.

Each of these two additional positions is independently adjustable by means of the four above-described actuators 810, 834, 844, and 854.

Pneumatic energy serves to control the thrust force of the actuators and thus to protect the mechanism involved in moving the jaws.

Figure 51B:
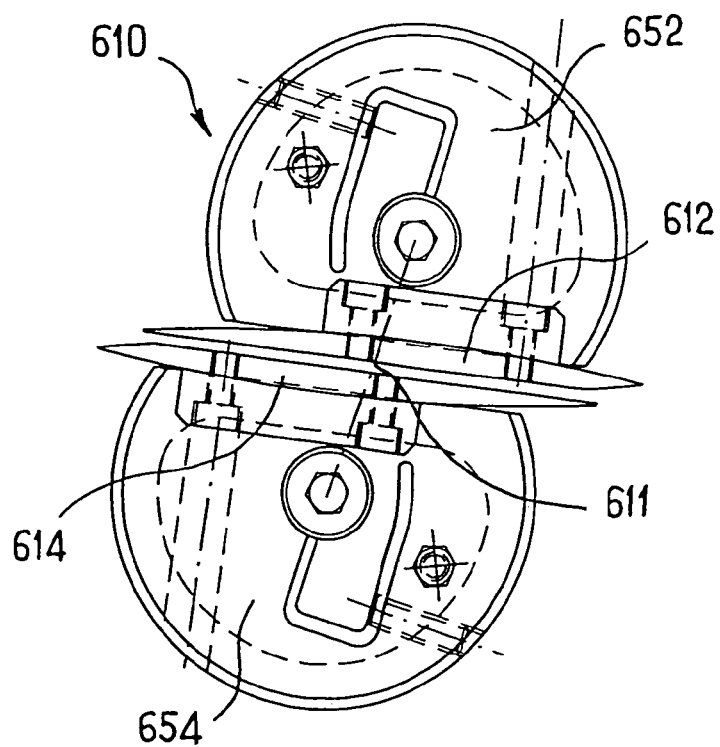
Figure 52B:
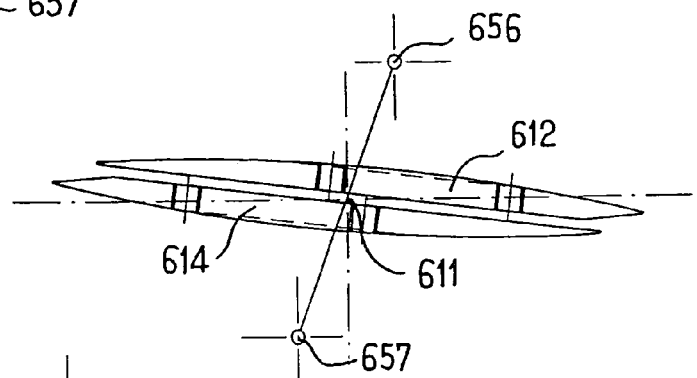
Figure 52C:
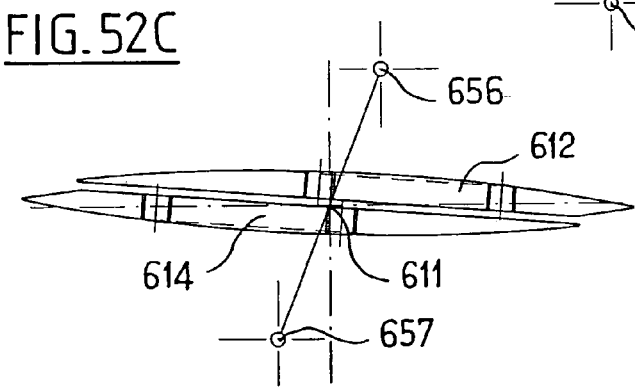
Figure 52D:
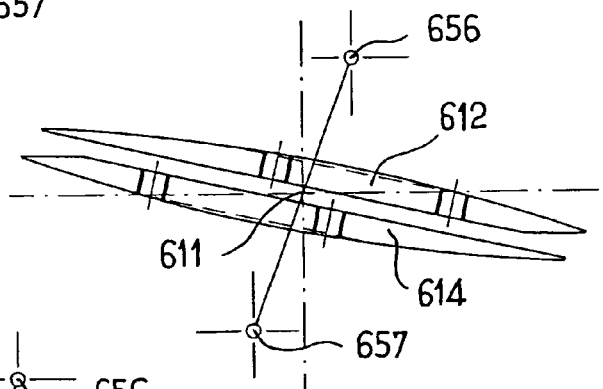
Figure 52E:
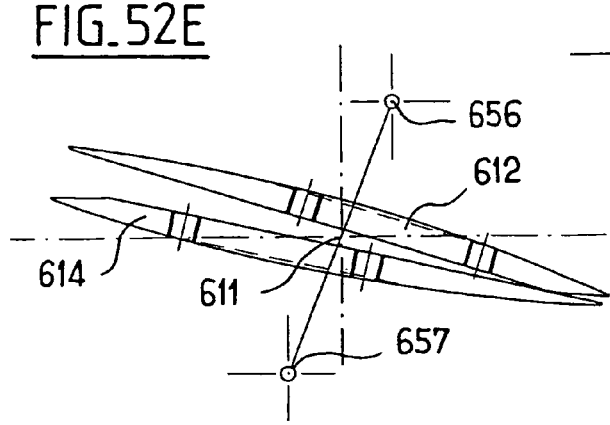
Figure 53B:
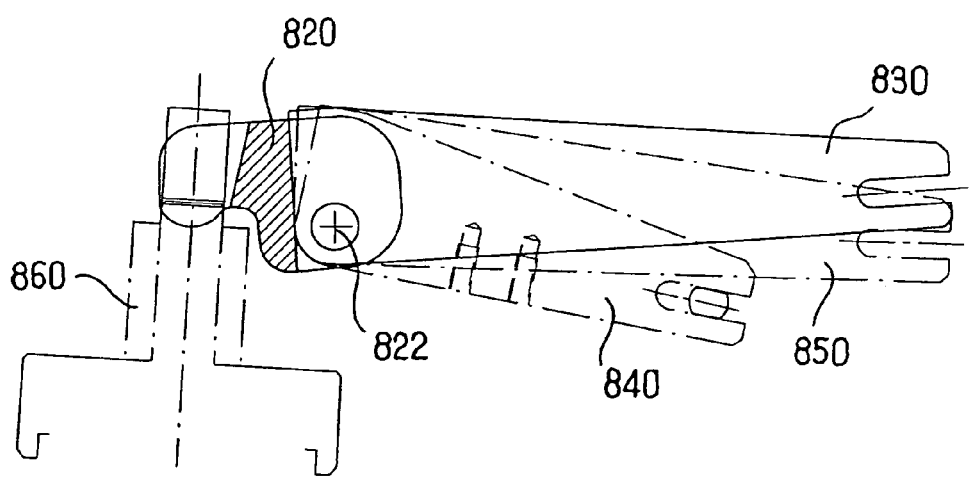
Figure 53C:
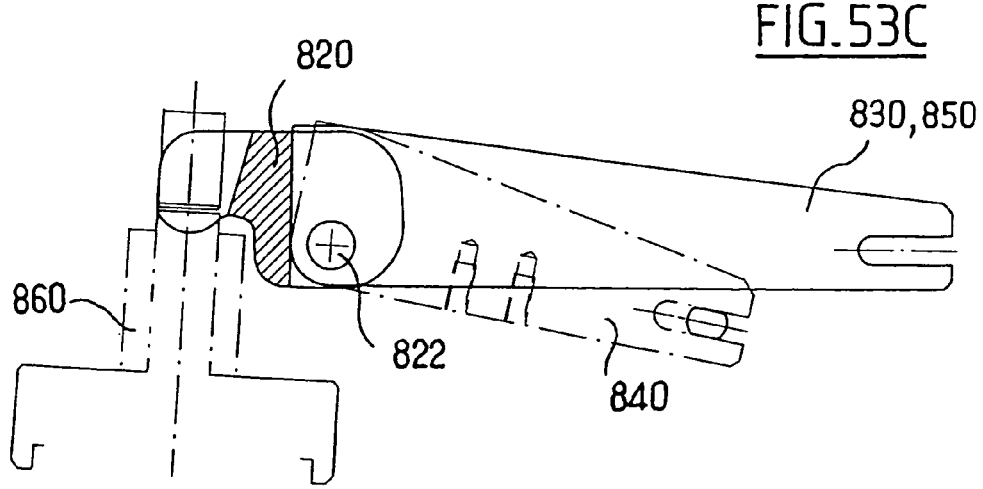
Figure 53D:
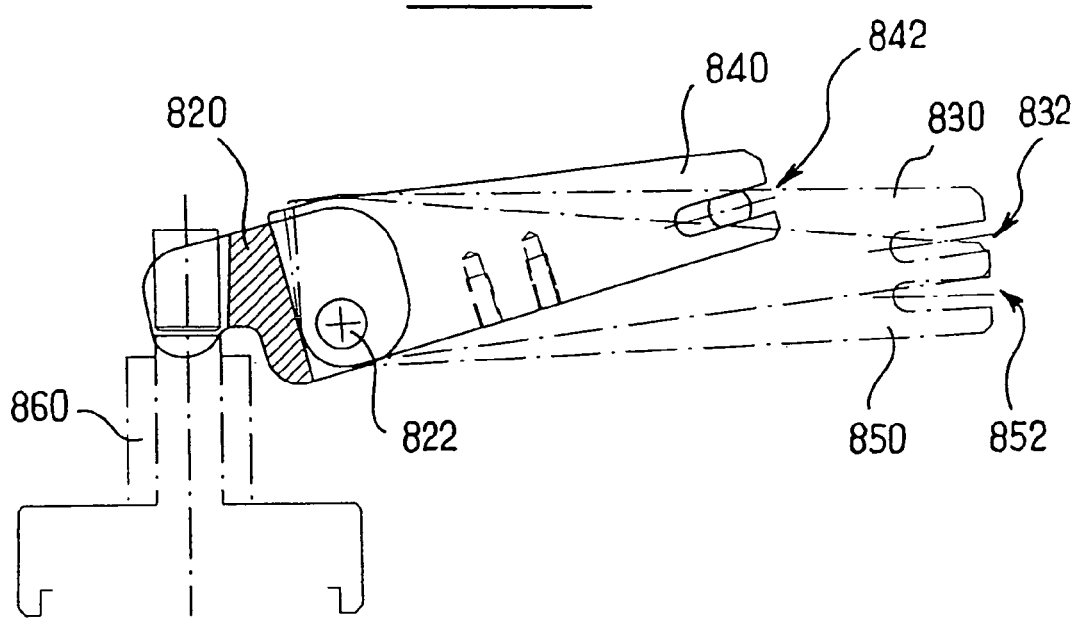
Figure 53E:
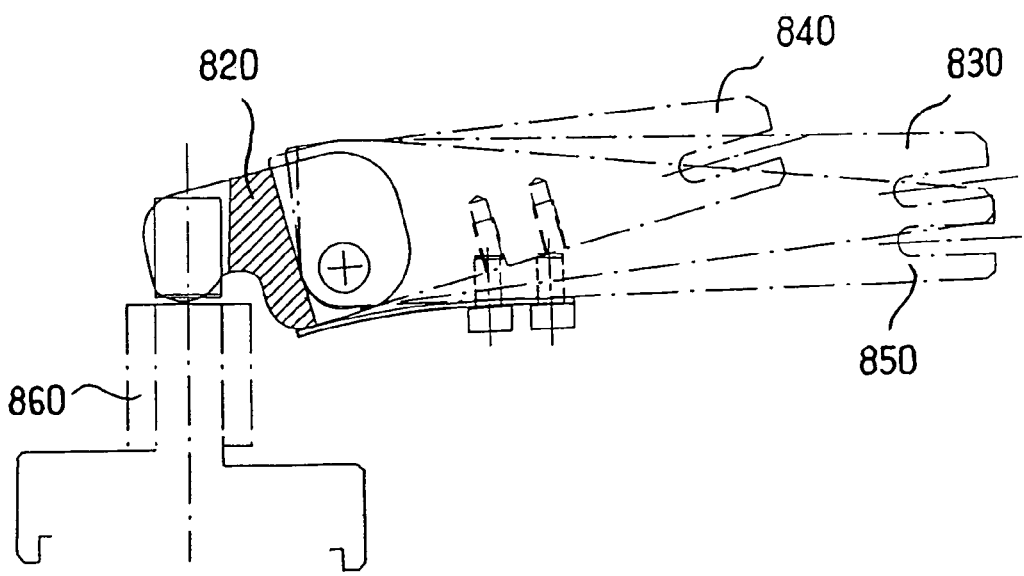

More precisely:
- the position shown in FIGS. 51B, 52B, and 53B is used for separating the inside turn of the winding from the outside surface of the mandrel 610 (in this position, the inside faces of the two jaws 612 and 614 are parallel and are placed at their maximum spacing);
- the position shown in FIGS. 51C, 52C, and 53C is used for withdrawing the winding (in this position the inside faces of the two jaws 612 and 614 are parallel and spaced apart so as to enable the start of the strip to be withdrawn, however the spacing is smaller than that in the figures with index B so as to avoid the innermost turn of the winding sticking to the outside surface of the mandrel 610);
- the position shown in FIGS. 51D, 52D, and 53D is an intermediate step preparatory to opening for taking hold of the start of a strip to begin a new winding (the inside faces of the jaws 612 and 614 are spaced apart and the jaws are inclined relative to the positions they occupy in the preceding figures); and
- the position shown in FIGS. 51E, 52E, and 53E is used for gripping the start of the strip (the inside surfaces of the jaws 612 and 614 are spaced apart and slope mutually; they form a tapering slot open towards the feed roller 570).

The position shown in FIGS. 51B, 52B, and 53B enables the major axis of the jaws 612, 614 to be shortened considerably. It thus causes the winding to bulge. This position is given by the actuator 854 pushing the ring 860, e.g. through a distance of 7.5 mm, causing each of the jaws and jaw carriers to move through a given angle, e.g. 7.5°.

The position shown in FIGS. 51C, 52C, and 53C is obtained by actuating the actuator 834, e.g. over an axial stroke of 4.5 mm, so as to cause the jaws and the jaw carriers to move through a controlled angle, e.g. each through 4.5°.

During the above-described sequence shown in FIG. 50, it is possible to pass several times from the position shown in FIGS. 51B, 52B, and 53B to the position shown in FIGS. 51C, 52C, and 53C, in succession, in order to break any adhesion between the jaws 612, 614 and the first turn of the winding.

The final position of the mandrel 610 is preferably as shown in FIGS. 51C, 52C, and 53C, waiting for the winding to be extracted by the robot 700.

Nevertheless, it should be observed that prior to extracting the winding, the mandrel preferably performs an angle correction in order to compensate for the angular offset caused by opening the jaws. The robot 700 is preferably adapted to take the winding in the horizontal position, which means that the tips of the flat shapes constituting the mandrel should be situated in said horizontal position.

After the winding has been extracted, the mandrel is naturally prepared and moved into its asymmetrical fully-open position of the jaws in order to receive the start of a strip for making a new winding.

This preparatory sequence is performed by passing successively through the positions shown in FIGS. 51D, 52D, and 53D, and then 51E, 52E, and 53E.

The position shown in FIGS. 51D, 52D, and 53D is due to the action of the actuator 844 pressing the thrust ring 860 over a length that is typically about 13 mm, and thus causing each jaw 612, 614 to turn typically through about 13°.

Thereafter, the mandrel passes to the position shown in FIGS. 51E, 52E, and 53E by actuating the actuator 810, with the actuator 834 itself remaining actuated. This causes the jaws 612, 614 to open maximally, as shown in FIG. 52E. This position must be indexed by controlling the orientation of the mandrel, e.g. to take up position 348°, so that the clamp formed by the two jaws 612, 614 is symmetrical about the horizontal axis in order to take hold of the strip symmetrically, as originally mentioned with reference to FIG. 44A.

Relative displacement of the above-described means can be controlled by any appropriate means.

FIG. 34 shows a sensor 632 carried by the carriage 630 facing the path traveled by a detection element 663 carried by the mandrel body 660 in order to control the rotary movement of the mandrel body 660 relative to the slider 630.

The means for controlling relative displacement of the jaws 612, 614 pass through an opening made in the vertical partition of the frame separating the two above-mentioned compartments, in order to make movement in translation with the carriage 630 possible.

Naturally, the present invention is not limited to the particular embodiments described above, and it extends to any variant in accordance with its spirit.

Although it is preferred to remove film mechanically by means of a blade as described above, since that avoids introducing any chemicals into the environment of the process, it is possible in a variant to remove film from the laminate by using a jet of solvent injected into the interface between the outside face of the laminate and the corresponding film.

The device of the invention may also include film-remover means comprising means for applying a jet of air, preferably cold air, onto the zone of divergence between the film and the laminate from which it is being removed.

Similarly, the hot air circulation ovens could be replaced by heater rollers.

The accompanying figures described above relate to an embodiment in which the final six-layer laminate is obtained by in situ stacking of three basic laminates respectively comprising one layer, two layers, and three layers, that are initially separate and pre-prepared. Nevertheless, in a variant, it is possible in the context of the present invention to envisage feeding the mandrel 610 directly with such a six-layer laminate that has been previously prepared on a suitable machine. Under such circumstances, the gaps in the lithium anode are preferably integrated in the laminate. In yet another variant, in the context of the present invention, the various basic laminates could be themselves built up in situ on the device of the invention using single-layer sheets.

The various cutter mechanism described above could be replaced by any equivalent means, e.g. laser-based means.

Where appropriate, the reciprocating blade 524 can be driven mechanically or electronically by the rotation of the mandrel 610 so that the pitch of successive cuts made by the blade 524 is not exactly equal all along a winding, but is a function of the angular position of the mandrel 610, which thus triggers the beginning and the end of each cut. This ensures that the cuts are superposed over a common sector of the winding and are in radial alignment, at least approximately.

The mandrel 610 may be implemented in a wide variety of ways.

FIG. 54 shows a variant embodiment in which the mandrel is constituted by a single piece. This piece 610 possesses a right section of shape similar to that defined by the combination of the two above-described jaws 612, 614. However, on examining FIG. 54, there can be seen a rectilinear slot 619 in said single piece for receiving the end of the strip to be wound.

Typically, this slot 619 extends over a fraction only of the length of the mandrel 610 parallel to the tapering edges thereof and substantially halfway between them.

Any appropriate means may be associated with such a mandrel for successively opening the slot 619 in order to enable an end of a strip to be engaged therein, then allowing the slot to close so as to enable winding to take place and/or the winding to be "aired".

By way of non-limiting example, moving two mandrel portions situated on either side of the slot 619 towards each other in order to air the winding and enable it to be extracted can be done by the robot 700 itself.

FIGS. 55A and 55B show another variant embodiment of the mandrel.

In this variant, the mandrel is made up of a plurality of parts that can move relative to one another parallel to the axis of rotation 611 and together forming, in the working position shown in FIG. 55A, an envelope that is identical to that of the above-described mandrel presenting a tapering right section.

In the particular non-limiting embodiment shown in FIGS. 55, the mandrel is thus made up of three parts: a central part 1610 between two lateral parts 1612 and 1614. In a variant, the mandrel may comprise only two such parts. Furthermore, it should be observed that each of the parts 1610, 1612, 1614 presents a "radial" dimension measured transversely to the axis of rotation 611 that varies along its length parallel to said axis. More precisely, the radial dimension of the central part 1610 varies in the opposite direction of the lateral parts 1612 and 1614.

The person skilled in the art will understand on comparing FIGS. 55A and 55B that when the part 1610 is displaced relative to the parts 1612 and 1614, parallel to the axis 611, by any appropriate means, the size or major axis of the section of the mandrel is varied.

The mandrel shown in FIGS. 55A and 552 presents another feature: at least one of the pieces, for example the central piece 1610, possesses a cavity that opens out to its outside surfaces via a grid of orifices 1613. Thus, by connecting the cavity inside the part 1610 to suction means, it is possible to press the end of the tape for winding against the mandrel 610 by suction.

FIGS. 55 show dovetail-type means for guiding movement in translation between the parts 1610, 1612, and 1614. Naturally, any equivalent guide means could be used.

FIGS. 56 show another variant embodiment in which the mandrel is also formed by a combination of a plurality of parts, for example a central part 1610 and two lateral parts 1612 and 1614 capable of moving relative to one another with at least a component parallel to the axis of rotation 1610. More precisely, in the embodiment shown in FIGS. 56, the lateral parts 1612 and 1614 are hinged on a common support 1615 and the central part 1610 which is movable relative to the common support parallel to the axis of rotation 611 has a wedging effect for modifying the spacing between them.

FIG. 57 shows a variant embodiment in which, while conserving a mandrel having the same section a that described above, in particular with reference to FIG. 2, control of the relative displacement of the jaws 612 and 614 is simplified by retaining only movement in translation of the jaws 612, 614 parallel to each other in a direction that is not parallel to the plane of the interface 613, i.e. along a trajectory referenced T in FIG. 57 that is oblique relative to the interface plane 613 of the jaws.

Naturally, the invention is not limited to the particular timezone shape for the mandrel as shown in FIG. 2.

For example, in FIG. 58, there can be seen a mandrel formed by two jaws 612, 614 that together define a mandrel of right section that is generally rectangular with rounded corners.

FIGS. 55 show a mandrel whose right section can be modified by relative displacement of the parts 1610, 1612, and 1614 parallel to the axis of rotation 611.

It is also possible to envisage modifying the right section of the mandrel 610, in particular the major axis of the right section of the mandrel, by moving two lateral parts 1612, 1614 radially towards and away from the axis 611 and a central part 1610.

The various mandrel embodiments described above comprise parts defining a continuous winding surface.

In a variant, it is possible to envisage making a mandrel in the form of two separate parts 1612 and 1614 embodying the edges 615, 616 with the central portion of the mandrel remaining empty, as shown in FIG. 59. The parts 1612 and 1614 are preferably moved radially relative to the axis of rotation 611 to make it easier to remove the winding by reducing the major axis of the mandrel.

With reference to accompanying FIG. 60, there follows a more particular description of the drive servo-control means in accordance with the present invention.

In this aspect of the invention, the device for making electric energy storage cells comprises means for driving a laminated sheet and means for winding the laminated sheet, and is characterized by the fact that the drive means comprise at least one pair of drive means respectively constituting a master pair and a slave pair, the master drive means being placed downstream from the slave drive means on the travel path of the laminated sheet, and control means for servo-controlling the slave drive means on the master drive means.

This disposition makes it possible to improve the situation over the prior art in which the drive means are generally controlled by a servo-control signal coming from feeder means placed upstream.

FIG. 60 shows the mandrel 610, the pair of rollers 532, 534, the detection and synchronization roller 512, the pair of laminator rollers 400, 410, the feed reels 104, 204, 304 (in which typically, but not necessarily, the reel 204 delivers a lithium sheet while the reels 104 and 304 deliver respectively a three-layer laminate and a two-layer laminate), and the pair of pinch rollers 262 and 264.

The mandrel 610 is the controlling member of the set of reels. It receives its reference speed from a control module 601.

All of the travel parameters for the sheets making up the laminate are adjusted on the basis of the demand coming from the mandrel 610.

The motor-driven pair of rollers 532 & 534 is controlled in drive mode at the beginning of a winding operation in order to bring the leading edge up to the mandrel 610.

However, during winding proper of the laminated sheet on the mandrel 610, this pair of rollers 532 & 534 is controlled to operate as a brake. It thus exerts selected constant traction on the laminated sheet corresponding to a reference value. The pair of rollers 532 & 534 receives its braking torque reference value from a control module 533.

The pair of rollers 532 & 534 is fitted with an incremental encoder 535 mounted on the driving motor and gearbox unit enabling this pair of rollers to be given the master function.

The pair of laminating rollers 400 & 410 situated upstream therefrom is also fitted with an encoder 411. This pair of rollers 400 & 410 is controlled as a slave relative to the above-mentioned rollers 532 & 534. It operates in drive mode.

More precisely, the encoder 535 associated with the pair of rollers 532 & 534 measures the length of strip running between said rollers 532 and 534.

The corresponding length information is applied via a module 1010 to the pair of laminating rollers 400 & 410 so that it delivers an identical length of strip under the control of its own associated encoder 411.

The alternating synchronization roller 512 is positioned between the roller pairs 532 & 534 and 400 & 410. It can move through a short distance and it is subjected to an adjustable force ensuring good contact with the strip between the two above-mentioned pairs of rollers 532 & 534 and 400 & 410.

Its role is to monitor microslippage or disturbances that might possibly lead to loss of synchronization in travel between the two pairs of rollers 532 & 534 and 400 & 410.

To do this, the encoder 513 of the roller 512 is positioned on the pivot axis of the roller 512. It serves to sense the angular displacement of the roller 512.

The encoder 513 is not involved so long as the synchronization between the two pairs of rollers 532 & 534 and 400 & 410 remains perfect. However, in the event of microslippage or disturbances leading to a loss of synchronization, the roller 512 is pivoted and the encoder 513 is involved.

The encoder 513 is connected to the module 1010. Thus, the synchronization roller 512 delivers a correction, e.g. ±10%, via the encoder 513 on the linear delivery rate of the slave pair of rollers 400 & 410.

The ±10% range for correcting the delivery rate of the pair of laminating rollers 400 & 410 is particularly useful on starting, after new reels 104, 204, and 304 have been loaded into the machine. The operator loading a reel engages the sheets they carry without knowing and without paying attention to the initial position of the roller 512.

Under steady conditions, the correction it provides is very close to zero and serves merely to handle microslippage.

By choosing to organize control on the basis of the length of strip that has been delivered rather than on the basis of the travel speed of the strip, a system is obtained that makes it possible to perform accurate and continuous linear interpolation between the electrical axes represented by the pairs of rollers 532 & 534 and 400 & 410 (the term "electrical axis" is used to mean the combination of a motor and gearbox unit associated with an encoder and a variable speed controller as used for constituting the pairs of rollers 532 & 534 and 400 & 410). This avoids errors and synchronization drifts accumulating.

Thus, the slave pair of rollers 400 & 410 tracks the movement of the master pair of rollers 532 & 534 just as if these rollers were situated in pairs on common mechanical shafts, and naturally possessing at each of its ends the same angular position.

As indicated above, the force F applied to the roller 512 is preferably generated by a pneumatic actuator. This is fed by an electric signal to pressure converter which delivers pressure proportional to the electric signal coming from the reference.

Adjusting the reference serves to adapt the force exerted on the laminate involved.

The force applied on the roller 512 can be varied using any other suitable means, i.e. not necessarily a pneumatic actuator, for example a spring, a counterweight, a resilient member, an electromagnet, etc.

The pair of pinch rollers 262 & 264 is itself a slave pair of motor-driven rollers being slaved to the motor-driven pinch rollers 400 & 410 situated downstream therefrom. It is fitted with a sensor 265.

It is recalled that the pair of rollers 262 & 264 serves to take the lithium strip coming from the reel 204 that is to be laminated between the two laminates coming from the reels 104 and 304, i.e. the two-layer laminate and the three-layer laminate.

Thus, the pair of rollers 532 & 534 is the master pair for the upstream pair of rollers 400 & 410, which in turn is the master for the upstream pair of rollers 262 & 264.

As a result, the invention makes use of at least two servo-control systems in cascade.

The pair of rollers 262 & 264 is also controlled from a reference associated with length information coming from the sensor 411 associated with the pair of rollers 400 & 410 via a servo-control module 1012.

However, it is preferable to have a length reference applied to the pair of rollers 264 & 262 that is slightly smaller than that applied to the pair 400 & 410 so as to micro-stretch the lithium strip and remove geometrical imperfections therefrom.

Typically, the downstream roller pairs 262 & 264 is controlled by a length reference that is equal to 99.5% the linear delivery rate of the pair 400 & 410.

The difference between the reference applied to the pair 262 & 264 and the reference applied to the pair 400 & 410 is advantageously adjustable, in particular as a function of deformation of the strip and as a function of its thickness.

It is recalled that the rollers 262 & 264 have, amongst other functions, the function of stopping travel of the lithium strip in a very short length of time, typically of 1 ms order, during the operation of cutting the lithium strip on the fly.

The sensors used in the context of the present invention can be embodied in numerous ways. They may be incremental encoders presenting a zero in the middle of the correction range, or analog displacement encoders (proportional inductive, resistance variable as a function of length, a magneto-resistive sensor of a magnetic field, . . . ).

Most preferably, in the context of the present invention, the encoders 513 are of the absolute encoder type. Thus, each angular position has a non-volatile binary code for absolute position enabling the angular position of the roller 512 to be situated even after the machine has stopped completely, and without reinitializing the zero in the middle of the range.

Still more precisely in the context of the present invention, the length sensors are preferably adapted to measure length increments lying in the range 1 mm to 4 µm, advantageously in the range 500 µm to 8 µm, and most preferably in the range 100 µm to 40 µm. According to another advantageous characteristic of the invention, the length sensors are adapted to measure length increments that are less than 1/1000th the total length of the winding, advantageously less than 1/4000th said total length, and most preferably less than 1/40,000th of said total winding length.

Another means for controlling the slave pair 400 & 410 relative to the master pair 532 & 534 is to replace the reciprocating roller 512 by an idling stationary roller mounted on a strain gauge. Under such circumstances, the strain gauge is sensitive to the tension in the strip as perceived by the idler roller. The pair 400 & 410 remains a slave to the pair 532 & 534. The speed of the pair 400 & 410 is corrected relative to the pair 532 & 534 as a function of the tension in the strip as read by the strain gauge on the idler roller so that the desired level of traction is obtained in the strip. This variant nevertheless does not present the same advantages as servo-controlling to length as described above. It can lead to speed oscillating about the reference point and thus to variation in strip tension.

Length servo-control as recommended in the context of the present invention provides numerous advantages:

it makes it possible to guarantee windings of total length that is accurate and regular, and thus to guarantee characteristics that are uniform for all of the cells made, and to guarantee a uniform location for the final end of the winding, and also to avoid any excess thickness; and it enables the final cutting of the laminate to be accurately synchronized with the gaps formed between pairs of segments in the anode 40.

There follows a description in greater detail of the heater module 330. (It should be observed that the heater module 130 for heating the sheet X is similar and perfectly symmetrical to the heater module 330 for heating the sheet XIV, which is why the module 130 is not described in detail.)

The purpose of this module is to solve the following problem.

The inventors have found that it is possible to heat the surface of certain polymer sheets before they are assembled together in a laminate in such a manner that they adhere to one another.

The various layers of sheet then constitute a one-piece laminated tape having a degree of overall strength. This characteristic gives the resulting laminate machineability that lends itself well to making battery windings.

In addition, good adhesion between the layers ensures that current flows uniformly between the various layers in the final battery cell. This guarantees better performance and longer lifetime for the cell.

In the context of an automatic machine for making energy storage cells, the heater means can be positioned along the travel path of some of the single-layer or multilayer polymer sheets.

However a difficulty in applying this technique to an automatic machine is that the travel of the polymer sheets must be regularly interrupted in order to enable the laminate to be cut, each successive finished winding to be expelled, and re-engagement of a following winding. For this purpose, sheet heating should be interrupted sequentially in order to avoid excessive temperature rise in those portions of sheet that, when stopped, are exposed to heat from the heater means.

Similarly, when restarting travel of the polymer sheets, the heater means must become effective again as quickly as possible.

It is therefore desirable to have heater means that present very short response times in terms of heating up and cooling down (typically of the order of a few seconds).

The use of infrared emitters as heater means does not appear to be satisfactory. Such emitters are ill-adapted to heating polymers or to heating materials containing carbon (as do certain cathodes). In addition, such emitters have thermal inertia that makes them incompatible with the looked-for response times.

A secondary object of the invention is thus to provide a heater device enabling temperature to be raised and lowered as quickly as possible.

In the context of the present invention this object is achieved by a heater device for heating a single-layer or multilayer sheet for the purpose of making a laminate containing the sheet, the device being characterized in that it includes a segment of duct in which the sheet extends, and means for causing a flow of hot air and a flow of cold air to circulate in alternation in said segment.

Heating by means of an air flow is particularly well adapted to polymer sheets or sheets containing carbon.

This device also makes it possible to control accurately the temperature of the flow of air put into circulation. The device consequently makes it possible to control how heating and cooling vary.

By causing a flow of hot air or a flow of cold air to circulate in alternation in a segment it is possible to achieve response times for the device that are particularly short. The hot air expels the cold air, and vice versa, such that the temperature of the air in the segment is modified almost instantaneously.

The invention also provides a method of heating a single-layer or multilayer sheet for the purpose of forming a laminate containing said sheet, the method being characterized in that it comprises the steps consisting in:

extending the sheet in a segment of an air flow duct; and causing flows of hot air and of cold air to circulate in alternation in said segment.

More precisely, the method enables a flow of cold air to be circulated when the sheet is being driven to travel along the segment of duct, and a flow of cold air to circulate when the travel of the sheet is interrupted.

In FIG. 64 the heater module 330 comprises a tubular air circulation duct 331 of closed configuration and generally in the form of a right-angled triangle. This duct 331 has a segment 332 formed by the base of the triangle in which there travels the multilayer sheet XIV (of composition shown in FIG. 14). The segment 332 is open at both ends via windows allowing the sheet to pass through. These windows are defined by strips 3321 and 3323 that are adjustable in position thus enabling the heights of the windows to be adjusted.

The two segments 333 and 335 forming the other two branches of the duct 331 constitute respectively an injection segment and a suction segment.

Means for propelling the air in the form of a fan 334 are provided at the junction between the injection and suction segments 333 and 335. The fan 334 is suitable for being controlled to set up a flow of air circulating around a loop in the duct 331 in the direction represented by continuous-line arrows. The flow of air circulates in the segment 332 in the direction opposite to the travel direction of the sheet XIV.

The heater module 330 further comprises a heater element 336 in the form of bare-wire resistances positioned downstream from the fan 334 in the injection segment 333, and a temperature probe 337 enabling the temperature of the air flow leaving the heater element to be measured.

While the sheet XIV is being driven, the heater element 336 is in operation so that the sheet XIV is subjected to a flow of hot air. This flow of hot air serves to raise the outside surface of the sheet XIV to the controlled temperature. For this purpose, the temperature of the air flow is measured by the probe 337 and the heater element is regulated dynamically by regulator means 3300 as a function of the measured temperature.

Since the hot air flow circulates around a loop, the rate at which the temperature of the heater device can be caused to rise is particularly fast.

When travel of the sheet XIV is interrupted, heating must be stopped. If the sheet were to continue to be heated after stopping, then the overexposed zone of the sheet situated in the duct 332 would have its properties spoiled, for example it might soften excessively, and cracking might appear, leading to the sheet no longer being plane. This can lead to poor adhesion between the layers of the resulting laminate, and also to electrochemical defects in the final electrochemical cell.

In order to avoid these drawbacks, the heater device 330 includes means for blowing in cold compressed air. These means comprise a compressor 338 connected to a side blow-in duct 339 opening out upstream from the fan 334 into the suction segment 335.

As soon as the travel of the sheet XIV is interrupted, the heater element 336 is switched OFF and the compressor 338 is switched ON. The compressor blows cold air into the suction segment 335. The blown-in cold air is set into circulation by the fan 334. The cold air blows away the hot air from the air circulation duct 331. The hot air is exhausted via the windows of the segment 332. The temperature of the air flow is measured by the probe 337 and the flow rate from the compressor is regulated dynamically by the regulator means 3300 as a function of the measured temperature.

While the sheet XIV is moving, the temperature of the air flow generated by the heater device 330 lies in the range 60° C. to 80° C. approximately, depending on the nature of the sheet. While travel is interrupted, the flow of air generated by the heater device 330 is about 10° C. below the heating temperature.

The duration of an interruption in the travel of the sheet XIV is about 10 seconds. The air flow rate is adapted to provide a cooling response time of about 2 seconds.

For this purpose, the injection duct 333 must be as short as possible so that the heating or cooling response of the device can be as short as possible.

The heater device may have an additional temperature probe for safety purposes for corroborating the measurements from the regulator probe or for taking over therefrom in the event of the regulator probe no longer functioning.

The strips 3322 and 3323 calibrate the height of the window gaps through which the sheet passes. Adjusting the height of the windows enables the renewal air flow rate into the heater device 330 to be adjusted.

The entire heater device 330 is covered in thermal lagging (e.g. a quilted insulating fabric of silicone woven glass) in such a manner as to limit heat loses which would overheat the overall device for making storage assemblies. The lagging of the heater device ensures that the windings made are reproducible and consequently ensures constant quality in the windings produced.

An opening side panel can be provided in order to give access to the segment 332 in order to position sheet XIV therein.

FIG. 65 shows another possible embodiment of the heater module 330.

In this figure, the heater module 330 comprises a tubular air circulation duct 331 that is closed and generally rectangular in shape. This duct 331 has a segment 332 formed by a long side of the rectangle, with the multilayer sheet XIV traveling therealong. The segment 332 is open at both ends via windows allowing the sheet to pass through and of height that is adjustable by means of strips 3321 and 3323.

The two segments 333 and 335 forming the two short sides of the rectangle constitute respectively the injection segment and a suction segment.

Air driver means in the form of a fan 334 are placed in the other long side of the rectangle between the injection and suction segments 333 and 335. The fan 334 is suitable for being controlled to establish a flow of air circulating around the loop in the duct 331 in the direction shown by continuous-line arrows.

Like the module of FIG. 64, the heater module 330 of FIG. 65 has a heater element 336 in the form of bare-wire resistances, positioned downstream from the fan 334, together with a temperature probe 337 enabling the temperature of the air flow leaving the heater element to be measured.

This heater module 330 further comprises a branch duct 3310 having one end connected to the injection segment 333 and its other end connected to the suction segment 335 via valves 3313 and 3315, this duct extending parallel to the segment 332 in which the sheet XIV travels.

The heater module 330 includes means for blowing in cold compressed air. These means comprise a compressor 338 connected to a lateral blow-in duct 339 opening out directly into the segment 332 in which the sheet XIV travels.

While the sheet XIV is being driven, the valves 3313 and 3315 are controlled to allow air flow to circulate in a loop around the duct 331 following the path represented by continuous-line arrows. The heater element 336 is in operation so the sheet XIV is subjected to a flow of hot air. The temperature of the air flow is measured by the probe 337 and the heater element is regulated dynamically by regulator means 3300 as a function of the measured temperature.

As soon as travel of the sheet XIV is interrupted, the heater element 336 can be switched OFF and the compressor 338 set into operation. The compressor blows cold air into the segment 332 in which the sheet XIV is stationary.

The valve 3313 is controlled so that the air flow injected by the fan is directed to the bypass duct 3310. The valve 3315 is controlled so as to enable the air circulating in the bypass duct 3310 to be ejected to the outside of the heater module 330. The air driven by the fan 334 is thus no longer sent to the sheet XIV. The circulation of the air flow driven by the fan 334 in the bypass duct 3310 produces suction that entrains the cold air flow likewise towards the outside as shown by dashed-line arrows.

The heater module 330 enables the hot air flow to be diverted and consequently increases the efficiency of the cold air flow. It also makes it possible to avoid stopping the heater element 336. Thus, when the hot air flow is again delivered to the segment 332, the hot air is already at the desired heating temperature.

There follows a description in greater detail of the unwinder and alignment means that enable the sheets to be laterally positioned relative to one another in the manner shown in FIGS. 17 to 20.

These means seek to solve the following problem.

A concern in the field of energy storage assemblies in the form of windings is making electrical connections that enable series and parallel connections to be made between the assemblies. These connections must enable connections to be made with certain thin layers of a winding while avoiding short circuits between the layers of the various sheets.

In order to facilitate making such connections, one solution that can be used while making the winding, consists in controlling the lateral positioning of the wound sheets relative to one another. Thus, in the final winding, certain layers are positioned so that one of their edges projects to a greater or lesser extent relative to the edges of the other layers.

By way of example, that technique makes it possible to place a metal on the side faces of the winding, the metal being placed solely on the spiral-wound longitudinal edge of one or some of the layers. The lateral offset between the layers also enables them to be distinguished from one another as a function of their positioning when connections are made thereto.

In the context of an automatic machine for making energy storage cells, this positioning of the sheets relative to one another is made possible by using specific positioning systems. Position sensors for identifying the positioning of one of the longitudinal edges of a sheet are placed on the travel paths of the sheets. An unwinder and aligner system serves to adjust the position of the edge of the sheet dynamically as a function of the information provided by the sensors.

However, the drawback of existing unwinder and aligner systems for the applications under consideration herein is that they are rather bulky. This drawback is particularly inconvenient in an automatic machine for making energy storage cells. The machine needs to be placed in an anhydrous environment such as an anhydrous room of small dimensions. Consequently, the parts of the machine need to be as compact as possible in order to minimize the final overall size of the machine.

Furthermore, the unwinder and aligner systems in use in the automatic machine for making energy storage cells needs to function with lengths of sheet that are as short as possible. The sheets used in the machine do not have any rigidity of their own, so the longer they are the more likely they are to be damaged, becoming crumpled or twisted.

Another secondary object of the invention is thus to propose a compact aligner device compatible with the constraints of automatically making energy storage cells in the form of windings.

In the context of the present invention, this object is achieved by a device for making a laminated sheet structure, the device comprising a plurality of means for feeding single-layer or multilayer sheets, means for driving the sheets, and means for superposing the sheets coming from the various feed means so as to form a laminate, the device being characterized in that it includes a movable support on which at least one of the feed means for at least one of the sheets is mounted, the movable support being suitable for oscillating about an axis for modifying the lateral positioning of said sheet relative to the other sheets of the laminate.

Such a device makes it possible advantageously to integrate the unwinding and aligning functions. The feed means form the unwinder system and also the aligner system, in combination with the moving support.

As a result, the device of the invention is compact compared with prior art systems.

More precisely, the oscillation axis of the moving support is defined in the following manner:

- the oscillation axis extends parallel to the travel direction of the film leaving the components mounted on the moving support;
- the oscillation axis extends in a plane containing the middle of the sheet; and
- when the feed means fastened to the moving support comprises a feed reel from which the sheet is unwound, the oscillation axis of the support intersects the axis of rotation of the feed reel.

The invention also provides a device for making electric energy storage assemblies in the form of multilayer windings, the device being characterized in that it comprises the above device for making a laminated sheet structure together with means for winding the resulting laminate.

The unwinder and aligner means comprise in particular supports on which the feed means 100, 200, and 300 are mounted, which supports are in the form of moving plates.

As shown in FIG. 66, the device for making storage assemblies has three moving plates 190, 290, and 390 on which the feed means 100, 200, and 300 are mounted.

The plate 190 supports the unwinder 104 of the laminate 90, the rollers 110 and 112, and also the film-remover assembly 120 including the film winder 124 and the scraper system 122.

The plate 290 supports the lithium unwinder 204, the rollers 210 and 212, the film feed rollers 240 and 250, and the presser rollers 262 and 264.

The plate 390 supports the unwinder 304 for unwinding the laminate 92, the rollers 310 and 312, and also the film-remover assembly 320 including the film winder 324 and the scraper system 322.

The plates 190, 290, and 390 are mounted to oscillate about respective axes 101, 201, and 301. Each axis 101, 201, and 301 extends in a plane containing the middle of the film. In addition, each axis 101, 201, and 301 intersects the axis of rotation 102, 202, or 302 of the associated unwinder 104, 204, or 304.

As a result, the axes 101, 201, and 301 are parallel to the plates 190, 290, and 390 and they pass through the centers of the unwinders 104, 204, and 304.

In FIG. 67, the unwinder and aligner shown comprises the plate 190 supporting the reel 104 of laminate 90 and acting as an unwinder, the film-remover roll 124 (shown in dashed lines), and the roller 114 mounted to rotate relative to the plate 190. The travel direction of the sheet leaving the components mounted on the plate 190 is shown by arrows. The plate 190 is suitable for oscillating relative to the frame about an axis 101. As can be seen in this figure, the axis 101 intersects the axis of rotation 102 of the unwinder 104 at a point O and it extends parallel to the travel direction of the film in the plane containing the middle of the film.

As shown in FIG. 66, the axes 101, 201, and 301 are parallel to the travel directions of the segments of sheet coming from the feed means 100, 200, and 300, which means that:

the oscillation axis 101 is parallel to the direction of the sheet segment (laminate 50, 60, 80) that extends between the outlet roller 114 and the pinch rollers 400 & 410;

the oscillation axis 210 is parallel to the direction of the sheet segment (lithium 40) extending between the outlet rollers 262 & 264 and the pinch rollers 400 & 410; and the oscillation axis 310 is parallel to the direction of the sheet segment (laminates 83, 10, 20, 30) extending between the outlet roller 314 and the pinch rollers 400 & 410.

The detector means 140, 280, and 340 placed on the travel path of these sheets coming respectively from the feed means 100, 200, and 300 continuously measure the lateral positioning of the longitudinal edges of these films. The plates 190, 290, and 390 are turned about the axes 101, 201, and 301 by drive means that are servo-controlled as a function of the measurements provided by the detector means 140, 280, and 340. The drive means need to present a response time of about 0.005 seconds. By way of example, these drive means may comprise electrical, hydraulic, or pneumatic actuators, electromagnets, or any other type of actuator suitable for the specified response time.

As a result, the lateral positions of the sheets relative to one another while they are being assembled together in a laminate in the presser rollers 400 & 410 can be accurately controlled.

By means of this device, the stresses applied to the various sheets are similar to those generated by a conventional frame aligner. In particular, this device does not generate lateral forces which would lead to deformations in the plane of a sheet. The sheets are subjected only to a small amount of twisting about their longitudinal neutral fibers, thereby minimizing the stresses generated in the sheets leaving the plates.

As can be seen, the film-remover assemblies 120 and 320 are mounted respectively on the plates 190 and 390 together with the feed reels 104 and 304. The rollers 114 and 314 serve both as outlet rollers from the unwinder and aligner system and as positioning rollers so that the sheets are kept permanently flush with the film-remover scrapers 122 and 322.

It can also be seen that the lithium reel 204 is mounted on the plate 290 with the film feed rollers 240 and 250. The presser rollers 262 and 264 drive the lithium sheet 40 sandwiched between its two films 84 and 85.

The plate 290 also includes "slack take-up" means for taking up slack in the sheet, said means comprising a rotary arm 292 mounted on the lithium unwinder 204, carrying the roller 210 and a slack take-up spring 294 placed between the plate 290 and the arm 292.

The presser rollers 262 & 264 pulling on the lithium sheet cause the arm 292 to turn in the unwinding direction of the unwinder 204. If there is slack sheet, the slack take-up spring 294 drives the arm 292 in the opposite direction, so that the sheet drive force and the return force from the spring 294 reach equilibrium and keep the sheet under tension.

The plates 190 and 390 may have equivalent slack take-up means associated with the reels 104 and 304.

There follows a description in greater detail of the operation of the sectioner module 270 as shown in FIGS. 68 to 71.

This module is intended to solve the following problem.

The flat shape of the winding makes it easy to stack storage assemblies and connect a plurality of assemblies together in a series and/or parallel configuration.

Nevertheless, it has been found that the step of cutting the final laminate with a conventional cutting tool generally leads to the layers being pinched together, and that is particularly harmful for the final storage cell.

This pinching puts the various layers into contact with one another and generates short circuits. This phenomenon is made worse when the cut end is heated and pressed against the winding in order to finish off the winding and prevent said end from flapping.

A secondary object of the invention is thus to enable multilayer electric energy storage assemblies to be manufactured automatically and continuously while avoiding creating short circuits during the cutting step.

In the context of the present invention this object is achieved by a device for making energy storage assemblies comprising means for feeding single-layer or multilayer sheets, drive means for causing said sheets to travel, means for uniting these sheets in a laminate, and a mandrel adapted to wind these sheets in the form of a multilayer winding, the device being characterized in that it includes first cutter means for sectioning one or more layers making up the laminate transversely to the laminate travel direction, and second cutter means for sectioning the other layers transversely to the laminate travel direction so that the layer(s) sectioned by the first means is/are set back relative to the other layers at an end of the laminate winding.

By previously sectioning certain layers in the lamination, the method of the invention avoids cutting simultaneously through all of the layers making up the final lamination. This method thus avoids pinching all of the layers together.

In FIGS. 68 to 71, the sectioner module 270 comprises a movable hammer 272 and a stationary anvil 274 positioned on either side of the travel path of the laminate formed by a central lithium anode layer 40 sandwiched between two protective films 84 and 85.

The hammer 272 is constituted by an arm which presents at its end a thicker striker portion 2725. This thicker striker portion also acts as a film-remover ridge.

The anvil 274 has a striker edge 2740 extending in a direction that is generally transverse to the travel direction of the laminate 84, 40, 85 and in register with the thicker striker portion 2725 of the hammer 272. The striker edge 2740 is not sharp, but rather it is dull so that it cannot slice through the lamination merely by coming into contact therewith. The anvil 274 is extended by a film-remover ridge 2744.

In FIG. 68, the laminate 84, 40, 85 travels at constant speed and the sectioner module 270 is at rest. The hammer 272 and the anvil 274 extend parallel to the laminate 84, 40, 85. As the laminate 84, 40, 85 travels, the films 84 and 85 are entrained and guided respectively along the surface of the film-remover ridges 2744 and 2725. These surfaces form an angle of more than 90° relative to the laminate 84, 40, 85 so that the films are folded back while they are being peeled off.

In FIG. 69, the hammer 272 is actuated. It moves downwards and its thick portion strikes the laminate 84, 40, 85 against the striker edge 2740 of the anvil 274. The films 84 and 85 are made of a material suitable for withstanding being struck by the hammer 274, while the more fragile lithium layer is broken along the edge 2740. Simultaneously with the sectioner module 270 being actuated, travel of the laminate 84, 40, 85 upstream from the module 270 is stopped by the pinch rollers 262 & 264 (see FIG. 7). The lithium downstream from the sectioner module, entrained by the laminator means continues to travel.

In FIG. 70, once a desired gap of length l has been obtained in the lithium layer, the hammer 272 is raised and the laminate 84, 40, 85 is again driven by the rollers 262 & 264 acting in drive mode.

The sectioner module 270 enables a gap of length l to be obtained in the laminate 10, 20, 30, 40, 50, 60, in which there is no lithium.

As shown diagrammatically in FIG. 71, the cutter means 550 subsequently section the entire laminate transversely substantially in the middle of the gap of length l formed in the lithium layer 40 (shaded layer in this figure).

As a result, the anode layer 40 is set back from the other layers making up the final winding, both at the leading end and at the trailing end of the winding (see FIG. 21).

A sectioner module is described above comprising a hammer and an anvil in which the anvil carries a striker edge. Naturally, the edge could equally well be carried by the hammer or by the anvil.

The invention claimed is:

1. A method of making electric energy storage assemblies, the method comprising the steps of feeding multiple sheet structures (90, 40, 92) from distinct feed means (104, 204, 304), the feed means comprising motor-driven unwinders (104, 204, 304) and associated motors, laminating (400, 410) the film structures (90, 40, 92) received from the various feed means (104, 204, 304), winding (610) the resulting laminate, and continuously and with controlled synchronism controlling the feed means (104, 204, 304), the laminator means (400, 410), and the winder means (610) and sequentially controlling the unwinders in a brake mode by the associated motors.

2. The method according to claim 1, wherein the laminating and winding steps are performed continuously.

3. The method according to claim 1, wherein at least one of the feed means is itself formed by means for in situ lamination of at least two initially separate sheets.

4. The method according to claim 1 for fabricating an energy storage cell, constituted by a flat winding with minimized internal stresses formed of a superposed assembly of sheets comprising at least one current collector (10), a cathode (20) based on filled polymers, a solid electrolyte (30) based on filled polymers, a metal anode (40), preferably based on lithium, these various items being made in the form of thin sheets, the method comprising the steps of laminating said sheets together and then winding and preforming them on an almost flat mandrel (610) having a section that is timezone-shaped, and finally pressing and flattening the winding on a low-thrust press.

5. A device for making electric energy storage assemblies (En), the device comprising multiple feed means (100, 200, 300) for feeding sheet structures, means (400, 410) for laminating the sheet structures received from the various feed means, winder means (610) for winding the resulting laminate, and control means for controlling continuously and in controlled synchronism the feed means, the laminator means, and the winder means, wherein the feed means comprises motor driven unwinders (104, 204, 304) and associated motors for sequentially controlling the unwinders in a brake mode.

6. The device according to claim 5, characterized by the fact that it includes laminator means (C, 400, 410) formed by a pair of presser rollers (400, 410).

7. The device according to claim 5, comprising a mandrel (610) of generally timezone-shaped section.

8. The device according to 5, wherein the mandrel (610) is of length greater than the width of the laminates for winding.

9. The device according to claim 5, including a mandrel (610) presenting a section that is not circularly symmetrical, and including means for rotating the mandrel (610) at a controlled non-constant angular speed so as to obtain a constant linear speed for feeding said sheets.

10. The device according to claim 5, the angular speed of rotation of the winder mandrel (610) presents two peaks per revolution.

11. The device according to claim 5, wherein the speed of rotation of the winder mandrel (610) is determined by the relationship:

$$\omega = V/(2 \cdot \pi \cdot r)$$

in which:
V represents the desired constant linear speed for the laminate; and
r represents a winding radius itself calculated on the basis of the following relationship:

$$r = r_0 + (F \cdot n \cdot e)$$

in which:
$r_0$ represents the radius of the mandrel (610) when bare;
F represents a correction factor;
n represents the number of the current turn; and
e represents the thickness of the laminate wound on the mandrel (610).

12. The device according to claim 5, wherein a presser roller (620) is associated with the winder mandrel (610).

13. The device according to claim 12, wherein the presser roller (620) is carried by rotary equipment (624) mounted to rotate about an axis (625) that is eccentric relative to the axis of the presser roller (620).

14. The device according to claim 13, wherein the rotary equipment (624) that carries the presser roller (620) is rotated at an angular speed that is twice that of the mandrel (610).

15. The device according to claim 14, wherein the rotary equipment (624) is mechanically driven by rotation of the mandrel (610) with a velocity ratio of 2.

16. The device according to claim 5, wherein the mandrel (610) is made up of two adjacent jaws (612, 614).

17. The device according to claim 16, wherein the two jaws (612, 614) are symmetrical and their plane of symmetry contains the axis of rotation (611) of the mandrel (610).

18. The device according to claim 16, including drive means suitable for moving the two jaws (612, 614) making up the mandrel (610) into an open relative position.

19. The device according to claim 16, including drive means suitable for moving the two jaws (612, 614) making up the mandrel (610) relative to each other parallel to their interface plane.

20. The device according to claim 5, including a press (710) suitable for finishing off flattening the windings formed on the mandrel (610) after said windings have been extracted to a position separate from the mandrel.

21. The device according to claim 5, including at least three sheet feed means (104, 204, 304) and laminator means (C, 400, 410) for laminating sheets coming from the three feed means.

22. The device according to claim 5, including three sheet feed means (104, 204, 304) serving respectively to feed: an assembly (90) comprising a cathode (60) and an electrolyte (50); an assembly (40) comprising an anode sheet (40); and an assembly (92) comprising a collector (10), a cathode (20), and an electrolyte (30).

23. The device according to claim 5, including heater means (130, 330) disposed upstream from said laminator means (C, 400, 410).

24. The device according to claim 23, wherein the heater means comprise ovens (130, 330).

25. The device according to claim 23, wherein the heater means comprise heater rollers.

26. The device according to claim 23, wherein the heater means comprise means suitable for sequentially cooling treated sheets.

27. The device according to claim 5, including means (104, 304) suitable for feeding at least one assembly (90, 92) comprising at least one sheet covered by at least one protective film.

28. The device according to claim 5, including film-remover means (122, 322, 220, 225, 541, 543) suitable for removing at least one film placed on an assembly.

29. The device according to claim 28, wherein the film-remover means comprise means suitable for abruptly diverting a protective film through at least 60° relative to the assembly carrying it.

30. The device according to claim 28, wherein the film-remover means comprise a dull edge (232) close to the plane of displacement of a film to be removed, and upstream from the point of remover, with the convex side of the edge facing downstream in the displacement direction, suitable for microstretching a protective film covering said sheet when the film is deflected by being pulled over the edge.

31. The device according to claims 28, that it including means suitable for adjusting the traction force exerted on the film.

32. The device according to claim 28, wherein the film-remover means comprise means for applying a jet of solvent.

33. The device according to claim 28, wherein the film-remover means comprise means for applying a jet of air to the zone where the film and the assembly from which it is being removed diverge.

34. The device according to claim 5, including applicator means (262, 264) suitable for applying at least one protective film on at least one outside face of an anode sheet (40).

35. The device according to claim 5, wherein the anode sheet (40) is a lithium sheet.

36. The device according to claim 5, it including means (240) suitable for applying a film (84) to the periphery of an anode reel (40) over a winding arc of not less than 90°.

37. The device according to claim 5, it including means (220, 225) suitable for removing at least one film (84, 85) upstream from a laminator station (400, 410).

38. The device according to claim 5, it including means (541, 543) suitable for removing at least one film (80, 83) upstream from a winder station (610).

39. The device according to claim 5, it including means (240, 250) suitable for placing protective films (84, 85) on at least some of the sheets involved.

40. The device according to claim 5, using films (80, 81, 82, 83, 84, 85) covering at least some of the sheets involved and forming a drive function thereon.

41. The device according to claim 5, using films (80, 81, 82, 83, 84, 85) covering at least some of the sheets involved and performing an anti-stick protection function for the sheets relative to rollers on their paths.

42. The device according to claim 5, it including means for adjusting the relative positioning of the longitudinal edges of the sheets involved.

43. The device according to claim 42, wherein the adjustment means comprise position sensors (140, 280, 340) and displacement means for moving the feed unwinders.

44. The device according to claim 43, wherein the displacement means are adapted to pivot support plates carrying feed unwinders.

45. The device according to claim 43, wherein the displacement means are adapted to pivot support plates carrying feed unwinders about axes (102, 202, 302) that are parallel to the segments of sheet conveyed upstream from the laminator means (400, 410).

46. The device according to claims 43, wherein the displacement means are adapted to pivot the support plates supporting feed unwinders about axes. (102, 202, 302) intersecting the axes of rotation of the feed unwinders (104, 204, 304) and contained in a plane halfway across the width of the feed reel.

47. The device according to claim 5, including sectioner means (272, 274, 552) for sectioning the sheets involved.

48. The device according to claim 47, including sectioner means (272, 274) for sectioning an anode sheet (40).

49. The device according to claim 48, including sectioner means (272, 274) for sectioning an anode sheet (40) between two films (84, 85) without breaking the films.

50. The device according to claims 47, including sectioner means (272, 274) for sectioning an anode sheet (40), the sectioner means being constituted by a hammer (272) and an anvil (274).

51. The device according to the claim 50, wherein at least one of the hammer (272) and the anvil (274) includes at least one striker edge.

52. The device according to claim 5, including sectioner means (272, 274) for sectioning a sheet and drive means for driving the segment situated downstream from the break in order to produce a gap in the sheet.

53. The device according to claim 52, wherein the sectioned sheet is the anode sheet (40).

54. The device according to claim 5, including sectioner means (552) for completely sectioning a laminate.

55. The device according to claim 5, including sectioner means (552) formed by a blade having a sharp edge with two slopes forming a convex ridge.

56. The device according to claim 5, including motor-driven unwinders (104, 204, 304) and winders (124, 324, 524, 548).

57. The device according to claim 56, wherein the winders (124, 229, 324, 542, 546) are motor-driven and controlled in torque.

58. The device according claim 56, wherein the unwinders (104, 204, 304) and the winders (124, 324, 542, 546) are controlled by signals that take account of the diameter of the windings.

59. The device according to claim 5, it include means for measuring the delivered length of laminate.

60. The device according to claim 5, including cutter means for making localized interrupted cuts in a current collector sheet (10).

61. The device according to claim 60, wherein the cutter means for localized cutting of a current collector sheet comprise an oscillating blade (524) placed facing a first face of the collector, associated with two rollers (526, 528) placed facing the other face thereof.

62. The device according to claim 60, wherein displacement of the localized cutter means (524) is controlled by the displacement of the mandrel (610).

63. The device according to claim 5, including heating laminator rollers (400, 410).

64. The device according to claim 5, including laminator rollers (400, 410) having a diameter of at least about 20 mm.

65. The device according to claim 5, comprising two compartments separated by a partition (900): a first compartment housing all of the means for moving the sheets and laminates involved, and a second compartment housing all of the control means.

66. The device according to claim 65, wherein the compartment housing the means for ensuring displacement of the sheets is placed under a controlled atmosphere.

67. The device according to claim 5, including means suitable on command for retracting the sheet-treatment means in order to facilitate putting the sheets into place.

68. The device according to claim 5, including a mandrel (610) adapted to wind superposed sheets in the form of a multi-sheet assembly, and means (670, 680, 800) suitable on command for modifying the right section of the mandrel (610).

69. The device according to claim 5, including drive means for driving a laminated sheet and means (610) for winding the laminated sheet, the drive means comprising at least one pair of drive means respectively constituting a master pair and a slave pair (532 & 534 and 400 & 410; 400 & 410 and 262 & 264), the master drive means (532 & 534; 400 & 410) being placed downstream from the slave drive means (400 & 410; 262 & 264) on the travel path of the laminated sheet, and control means for servo-controlling the slave drive means (400 & 410; 262 & 264) on the master drive means (532 & 534; 400 & 410).

70. The device according to claim 5, comprising drive means (532, 534, 610) for driving a laminated sheet, winder means (610) for winding the laminated sheet, and cutter means (550) for sectioning the laminated sheet at the end of winding, and means (562) for heating the laminated sheet and presser means (580) for pressing the end-of-winding end of the sheet against the surface of the wound assembly so that the winding end adheres to said surface.

71. The device according to claim 5, comprising drive means for driving a laminated sheet and winder means (610) for winding the laminated sheet (10, 20, 30, 40, 50, 60), and means (532, 534, 570, 610) for tensioning the laminated sheet over a segment, and moving cutter means (550) suitable for being actuated sequentially to cut the laminated sheet (10, 20, 30, 40, 50, 60) in air through the tensioned segment.

72. The A device according to claim 5, including a segment (332) of duct (331) in which the sheet (XIV) extends, and means for causing a flow of hot air and a flow of cold air to circulate in alternation in said segment (332).

73. The device for making a laminated sheet structure according to claim 5, comprising a plurality of feed means (100, 200, 300) for feeding single-layer or multilayer sheets, drive means for driving travel of the sheets, means (400, 410) for superposing the sheets coming from the various feed means in order to form a laminate, and a movable support (190; 290; 390) on which at least one of the feed means (100; 200; 300) for at least one of the sheets is mounted, the movable support (190; 290; 390) being suitable for oscillating about an axis (101; 201; 301) for modifying the lateral positioning of said sheet relative to the other sheets of the laminate.

74. The device according to claim 5, comprising feed means (100, 200, 300) for feeding single-layer or multilayer sheets (90, 40, 92), drive means (510) for causing said sheet to travel, means (C) for uniting the sheets in a laminate (96), a mandrel (610) adapted to wind the sheets in the form of a multilayer winding (10, 20, 30, 40, 50, 60), first cutter means (270) for sectioning one or more layers (40) making up the laminate (96) transversely to the laminate travel direction, and second cutter means (550) for sectioning the other layers (10, 20, 30, 50, 60) transversely to the laminate travel direction so that the layer(s) (40) sectioned by the first means (270) is/are set back relative to the other layers (10, 20, 30, 50, 60) at an end of the laminate-winding (96).

75. The device according to claim 5, wherein at least three means constituted by the feed means, the laminator means, and the winder means are associated with respective drive means.

* * * * *

UNITED STATES PATENT AND TRADEMARK OFFICE
CERTIFICATE OF CORRECTION

| | |
|---|---|
| PATENT NO. | : 7,578,898 B2 |
| APPLICATION NO. | : 10/541046 |
| DATED | : August 25, 2009 |
| INVENTOR(S) | : Le Gal |

It is certified that error appears in the above-identified patent and that said Letters Patent is hereby corrected as shown below:

Column 48, in the Claims:

Claim 72, line 1, after "The", delete "A"

Signed and Sealed this
Twelfth Day of April, 2011

David J. Kappos
*Director of the United States Patent and Trademark Office*

UNITED STATES PATENT AND TRADEMARK OFFICE
CERTIFICATE OF CORRECTION

PATENT NO. : 7,578,898 B2  Page 1 of 1
APPLICATION NO. : 10/541046
DATED : August 25, 2009
INVENTOR(S) : Le Gal It is certified that error appears in the above-identified patent and that said Letters Patent is hereby corrected as shown below:

Column 48, line 16 in the Claims:

(Claim 72, line 1) after "The", delete "A"

This certificate supersedes the Certificate of Correction issued April 12, 2011.

Signed and Sealed this
Tenth Day of May, 2011

David J. Kappos
*Director of the United States Patent and Trademark Office*